United States Patent
Vandike et al.

(10) Patent No.: US 12,329,148 B2
(45) Date of Patent: Jun. 17, 2025

(54) PREDICTIVE WEED MAP AND MATERIAL APPLICATION MACHINE CONTROL

(71) Applicant: Deere & Company, Moline, IL (US)

(72) Inventors: Nathan R. Vandike, Geneseo, IL (US); Bhanu Kiran Reddy Palla, Bettendorf, IA (US); Federico Pardina-Malbran, Fort Collins, CO (US); David A. Hanson, Urbandale, IA (US); Andrea M. Agarwal, Ankeny, IA (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 385 days.

(21) Appl. No.: 17/716,350

(22) Filed: Apr. 8, 2022

(65) Prior Publication Data

US 2022/0232816 A1 Jul. 28, 2022

Related U.S. Application Data

(63) Continuation-in-part of application No. 17/067,383, filed on Oct. 9, 2020, now Pat. No. 12,035,648, and
(Continued)

(51) Int. Cl.
*A01M 7/00* (2006.01)
*A01M 9/00* (2006.01)
*A01C 7/04* (2006.01)

(52) U.S. Cl.
CPC ........ *A01M 7/0089* (2013.01); *A01M 9/0092* (2013.01); *A01C 7/0443* (2023.05); *A01C 7/0445* (2023.05); *A01C 7/046* (2013.01)

(58) Field of Classification Search
None
See application file for complete search history.

(56) References Cited

U.S. PATENT DOCUMENTS

| 3,568,157 A | 3/1971 | Downing et al. |
| 3,580,257 A | 5/1971 | Teague |

(Continued)

FOREIGN PATENT DOCUMENTS

| AR | 108898 A1 | 10/2018 |
| AU | 20100224431 A1 | 4/2011 |

(Continued)

OTHER PUBLICATIONS

Apan et al., "Predictive Mapping of Blackberry in the Condamine Catchment Using Logistic Regressiona dn Spatial Analysis", Jan. 2008, 12 pages.
(Continued)

*Primary Examiner* — Jelani A Smith
*Assistant Examiner* — Davin Seol
(74) *Attorney, Agent, or Firm* — Kelly, Holt & Christenson; Joseph R. Kelly

(57) ABSTRACT

A predictive map is obtained by an agricultural material application system. The predictive map maps predictive weed values at different geographic locations in a field. A geographic position sensor detects a geographic locations of an agricultural material application machine at the field. A control system generates a control signal to control the agricultural material application machine based on the geographic locations of the agricultural material application machine and the predictive map.

16 Claims, 23 Drawing Sheets

Related U.S. Application Data a continuation-in-part of application No. 17/066,444, filed on Oct. 8, 2020, now Pat. No. 12,225,846, which is a continuation-in-part of application No. 16/783,511, filed on Feb. 6, 2020, now Pat. No. 11,641,800, said application No. 17/067,383 is a continuation-in-part of application No. 16/783,511, filed on Feb. 6, 2020, now Pat. No. 11,641,800, and a continuation-in-part of application No. 16/783,475, filed on Feb. 6, 2020, now Pat. No. 11,957,072, said application No. 17/066,444 is a continuation-in-part of application No. 16/783,475, filed on Feb. 6, 2020, now Pat. No. 11,957,072.

(56) References Cited

U.S. PATENT DOCUMENTS

| | | |
|---|---|---|
| 3,599,543 A | 8/1971 | Kerridge |
| 3,775,019 A | 11/1973 | Konig et al. |
| 3,856,754 A | 12/1974 | Habermeier et al. |
| 4,129,573 A | 12/1978 | Bellus et al. |
| 4,166,735 A | 9/1979 | Pilgram et al. |
| 4,183,742 A | 1/1980 | Sasse et al. |
| 4,268,679 A | 5/1981 | Lavanish |
| 4,349,377 A | 9/1982 | Durr et al. |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann et al. |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A | 12/1995 | Clegg et al. |
| 5,488,817 A | 2/1996 | Paquet et al. |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy |
| 5,849,665 A | 12/1998 | Gut et al. |
| 5,878,821 A | 3/1999 | Flenker et al. |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,859 A | 11/1999 | Takahashi |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale |
| 6,119,531 A | 9/2000 | Wendte et al. |
| 6,128,574 A | 10/2000 | Diekhans |
| 6,141,614 A | 10/2000 | Janzen et al. |
| 6,178,253 B1 | 1/2001 | Hendrickson et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | Diekhans |
| 6,216,071 B1 | 4/2001 | Motz |
| 6,236,924 B1 | 5/2001 | Motz et al. |
| 6,272,819 B1 | 8/2001 | Wendte et al. |
| 6,327,569 B1 | 12/2001 | Reep |
| 6,374,173 B1 | 4/2002 | Ehlbeck |
| 6,380,745 B1 | 4/2002 | Anderson et al. |
| 6,431,790 B1 | 8/2002 | Anderegg et al. |
| 6,451,733 B1 | 9/2002 | Pidskalny et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,591,145 B1 | 7/2003 | Hoskinson et al. |
| 6,591,591 B2 | 7/2003 | Coers et al. |
| 6,592,453 B2 | 7/2003 | Coers et al. |
| 6,604,432 B1 | 8/2003 | Hamblen et al. |
| 6,681,551 B1 | 1/2004 | Sheidler et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,834,550 B2 | 12/2004 | Upadhyaya et al. |
| 6,838,564 B2 | 1/2005 | Edmunds et al. |
| 6,846,128 B2 | 1/2005 | Sick |
| 6,932,554 B2 | 8/2005 | Isfort et al. |
| 6,999,877 B1 | 2/2006 | Dyer et al. |
| 7,073,374 B2 | 7/2006 | Berkman |
| 7,167,797 B2 | 1/2007 | Faivre et al. |
| 7,167,800 B2 | 1/2007 | Faivre et al. |
| 7,191,062 B2 | 3/2007 | Chi et al. |
| 7,194,965 B2 | 3/2007 | Hickey et al. |
| 7,211,994 B1 | 5/2007 | Mergen et al. |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendt |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,557,066 B2 | 7/2009 | Hills et al. |
| 7,628,059 B1 | 12/2009 | Scherbring |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford et al. |
| 8,060,283 B2 | 11/2011 | Mott et al. |
| 8,107,681 B2 | 1/2012 | Gaal |
| 8,145,393 B2 | 3/2012 | Foster et al. |
| 8,147,176 B2 | 4/2012 | Coers et al. |
| 8,152,610 B2 | 4/2012 | Harrington |
| 8,190,335 B2 | 5/2012 | Vik et al. |
| 8,195,342 B2 | 6/2012 | Anderson |
| 8,195,358 B2 | 6/2012 | Anderson |

(56) References Cited

U.S. PATENT DOCUMENTS

| | | |
|---|---|---|
| 8,213,964 B2 | 7/2012 | Fitzner et al. |
| 8,224,500 B2 | 7/2012 | Anderson et al. |
| 8,252,723 B2 | 8/2012 | Jakobi et al. |
| 8,254,351 B2 | 8/2012 | Fitzner et al. |
| 8,321,365 B2 | 11/2012 | Anderson |
| 8,329,717 B2 | 12/2012 | Minn et al. |
| 8,332,105 B2 | 12/2012 | Laux |
| 8,338,332 B1 | 12/2012 | Hacker et al. |
| 8,340,862 B2 | 12/2012 | Baumgarten et al. |
| 8,407,157 B2 | 3/2013 | Anderson et al. |
| 8,428,829 B2 | 4/2013 | Brunnert et al. |
| 8,478,493 B2 | 7/2013 | Anderson |
| 8,488,865 B2 | 7/2013 | Hausmann et al. |
| 8,494,727 B2 | 7/2013 | Green et al. |
| 8,527,157 B2 | 9/2013 | Imhof et al. |
| 8,544,397 B2 | 10/2013 | Bassett |
| 8,577,561 B2 | 11/2013 | Green et al. |
| 8,606,454 B2 | 12/2013 | Wang et al. |
| 8,626,406 B2 | 1/2014 | Schleicher et al. |
| 8,635,903 B2 | 1/2014 | Oetken et al. |
| 8,649,940 B2 | 2/2014 | Bonefas |
| 8,656,693 B2 | 2/2014 | Madsen et al. |
| 8,662,972 B2 | 3/2014 | Behnke et al. |
| 8,671,760 B2 | 3/2014 | Wallrath et al. |
| 8,677,724 B2 | 3/2014 | Chaney et al. |
| 8,738,238 B2 | 5/2014 | Rekow et al. |
| 8,738,244 B2 | 5/2014 | Lenz et al. |
| 8,755,976 B2 | 6/2014 | Peters et al. |
| 8,781,692 B2 | 7/2014 | Kormann |
| 8,789,563 B2 | 7/2014 | Wenzel |
| 8,814,640 B2 | 8/2014 | Behnke et al. |
| 8,843,269 B2 | 9/2014 | Anderson et al. |
| 8,868,304 B2 | 10/2014 | Bonefas |
| 8,909,389 B2 | 12/2014 | Meyer |
| D721,740 S | 1/2015 | Schmaltz et al. |
| 8,942,860 B2 | 1/2015 | Morselli |
| 8,962,523 B2 | 2/2015 | Rosinger et al. |
| 9,002,591 B2 | 4/2015 | Wang et al. |
| 9,008,918 B2 | 4/2015 | Missotten et al. |
| 9,009,087 B1 | 4/2015 | Mewes et al. |
| 9,011,222 B2 | 4/2015 | Johnson et al. |
| 9,014,901 B2 | 4/2015 | Wang et al. |
| 9,043,096 B2 | 5/2015 | Zielke et al. |
| 9,043,129 B2 | 5/2015 | Bonefas et al. |
| 9,066,465 B2 | 6/2015 | Hendrickson et al. |
| 9,072,227 B2 | 7/2015 | Wenzel |
| 9,095,090 B2 | 8/2015 | Casper et al. |
| 9,119,342 B2 | 9/2015 | Bonefas |
| 9,127,428 B2 | 9/2015 | Meier |
| 9,131,644 B2 | 9/2015 | Osborne |
| 9,152,938 B2 | 10/2015 | Lang et al. |
| 9,173,339 B2 | 11/2015 | Sauder et al. |
| 9,179,599 B2 | 11/2015 | Bischoff |
| 9,188,518 B2 | 11/2015 | Snyder et al. |
| 9,188,986 B2 | 11/2015 | Baumann |
| 9,226,449 B2 | 1/2016 | Bischoff |
| 9,234,317 B2 | 1/2016 | Chi et al. |
| 9,235,214 B2 | 1/2016 | Anderson |
| 9,301,447 B2 | 4/2016 | Kormann |
| 9,301,466 B2 | 4/2016 | Kelly |
| 9,313,951 B2 | 4/2016 | Herman et al. |
| 9,326,443 B2 | 5/2016 | Zametzer et al. |
| 9,326,444 B2 | 5/2016 | Bonefas |
| 9,392,746 B2 | 7/2016 | Darr et al. |
| 9,405,039 B2 | 8/2016 | Anderson |
| 9,410,840 B2 | 8/2016 | Acheson et al. |
| 9,439,342 B2 | 9/2016 | Pasquier |
| 9,457,971 B2 | 10/2016 | Bonefas et al. |
| 9,463,939 B2 | 10/2016 | Bonefas et al. |
| 9,485,905 B2 | 11/2016 | Jung et al. |
| 9,489,576 B2 | 11/2016 | Johnson et al. |
| 9,497,898 B2 | 11/2016 | Dillon |
| 9,510,508 B2 | 12/2016 | Jung |
| 9,511,633 B2 | 12/2016 | Anderson et al. |
| 9,511,958 B2 | 12/2016 | Bonefas |
| 9,516,812 B2 | 12/2016 | Baumgarten et al. |
| 9,521,805 B2 | 12/2016 | Muench et al. |
| 9,522,791 B2 | 12/2016 | Bonefas et al. |
| 9,522,792 B2 | 12/2016 | Bonefas et al. |
| 9,523,180 B2 | 12/2016 | Deines |
| 9,529,364 B2 | 12/2016 | Foster et al. |
| 9,532,504 B2 | 1/2017 | Herman et al. |
| 9,538,714 B2 | 1/2017 | Anderson |
| 9,563,492 B2 | 2/2017 | Bell et al. |
| 9,563,848 B1 | 2/2017 | Hunt |
| 9,563,852 B1 | 2/2017 | Wiles et al. |
| 9,578,808 B2 | 2/2017 | Dybro et al. |
| 9,629,308 B2 | 4/2017 | Schøler et al. |
| 9,631,964 B2 | 4/2017 | Gelinske et al. |
| 9,642,305 B2 | 5/2017 | Nykamp et al. |
| 9,648,807 B2 | 5/2017 | Escher et al. |
| 9,675,008 B1 | 6/2017 | Rusciolelli et al. |
| 9,681,605 B2 | 6/2017 | Noonan et al. |
| 9,694,712 B2 | 7/2017 | Healy |
| 9,696,162 B2 | 7/2017 | Anderson |
| 9,699,967 B2 | 7/2017 | Palla et al. |
| 9,714,856 B2 | 7/2017 | Myers |
| 9,717,178 B1 | 8/2017 | Sauder et al. |
| 9,721,181 B2 | 8/2017 | Guan et al. |
| 9,723,790 B2 | 8/2017 | Berry et al. |
| 9,740,208 B2 | 8/2017 | Sugumaran et al. |
| 9,767,521 B2 | 9/2017 | Stuber et al. |
| 9,807,934 B2 | 11/2017 | Rusciolelli et al. |
| 9,807,940 B2 | 11/2017 | Roell et al. |
| 9,810,679 B2 | 11/2017 | Kimmel |
| 9,829,364 B2 | 11/2017 | Wilson et al. |
| 9,848,528 B2 | 12/2017 | Werner et al. |
| 9,856,609 B2 | 1/2018 | Dehmel |
| 9,856,612 B2 | 1/2018 | Oetken |
| 9,861,040 B2 | 1/2018 | Bonefas |
| 9,872,433 B2 | 1/2018 | Acheson et al. |
| 9,903,077 B2 | 2/2018 | Rio |
| 9,903,979 B2 | 2/2018 | Dybro et al. |
| 9,904,963 B2 | 2/2018 | Rupp et al. |
| 9,915,952 B2 | 3/2018 | Dollinger et al. |
| 9,922,405 B2 | 3/2018 | Sauder et al. |
| 9,924,636 B2 | 3/2018 | Lisouski et al. |
| 9,928,584 B2 | 3/2018 | Jens et al. |
| 9,933,787 B2 | 4/2018 | Story |
| 9,974,226 B2 | 5/2018 | Rupp et al. |
| 9,982,397 B2 | 5/2018 | Korb et al. |
| 9,984,455 B1 | 5/2018 | Fox et al. |
| 9,992,931 B2 | 6/2018 | Bonefas et al. |
| 9,992,932 B2 | 6/2018 | Bonefas et al. |
| 10,004,176 B2 | 6/2018 | Mayerle |
| 10,015,928 B2 | 7/2018 | Nykamp et al. |
| 10,019,018 B2 | 7/2018 | Hulin |
| 10,019,790 B2 | 7/2018 | Bonefas et al. |
| 10,025,983 B2 | 7/2018 | Guan et al. |
| 10,028,435 B2 | 7/2018 | Anderson et al. |
| 10,028,451 B2 | 7/2018 | Rowan et al. |
| 10,034,427 B2 | 7/2018 | Krause et al. |
| 10,039,231 B2 | 8/2018 | Anderson et al. |
| 10,064,331 B2 | 9/2018 | Bradley |
| 10,064,335 B2 | 9/2018 | Byttebier et al. |
| 10,078,890 B1 | 9/2018 | Tagestad et al. |
| 10,085,372 B2 | 10/2018 | Noyer et al. |
| 10,091,925 B2 | 10/2018 | Aharoni et al. |
| 10,126,153 B2 | 11/2018 | Bischoff et al. |
| 10,129,528 B2 | 11/2018 | Bonefas et al. |
| 10,143,132 B2 | 12/2018 | Inoue et al. |
| 10,152,035 B2 | 12/2018 | Reid et al. |
| 10,154,624 B2 | 12/2018 | Guan et al. |
| 10,165,725 B2 | 1/2019 | Sugumaran et al. |
| 10,178,823 B2 | 1/2019 | Kovach et al. |
| 10,183,667 B2 | 1/2019 | Anderson et al. |
| 10,188,037 B2 | 1/2019 | Bruns et al. |
| 10,201,121 B1 | 2/2019 | Wilson |
| 10,209,179 B2 | 2/2019 | Hollstein |
| 10,231,371 B2 | 3/2019 | Dillon |
| 10,254,147 B2 | 4/2019 | Vermue et al. |
| 10,254,765 B2 | 4/2019 | Rekow et al. |
| 10,255,670 B1 | 4/2019 | Wu et al. |
| 10,275,550 B2 | 4/2019 | Lee |

(56) References Cited

U.S. PATENT DOCUMENTS

| | | |
|---|---|---|
| 10,295,703 B2 | 5/2019 | Dybro et al. |
| 10,310,455 B2 | 6/2019 | Blank et al. |
| 10,314,232 B2 | 6/2019 | Isaac et al. |
| 10,315,655 B2 | 6/2019 | Blank et al. |
| 10,317,272 B2 | 6/2019 | Bhavsar et al. |
| 10,351,364 B2 | 7/2019 | Green et al. |
| 10,368,488 B2 | 8/2019 | Becker et al. |
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,462,603 B1 | 10/2019 | Tippery et al. |
| 10,477,756 B1 | 11/2019 | Richt et al. |
| 10,485,178 B2 | 11/2019 | Mayerle |
| 10,521,526 B2 | 12/2019 | Haaland et al. |
| 10,537,061 B2 | 1/2020 | Farley et al. |
| 10,568,316 B2 | 2/2020 | Gall et al. |
| 10,631,462 B2 | 4/2020 | Bonefas |
| 10,677,637 B1 | 6/2020 | Von Muenster |
| 10,681,872 B2 | 6/2020 | Viaene et al. |
| 10,703,277 B1 | 7/2020 | Schroeder |
| 10,729,067 B2 | 8/2020 | Hammer et al. |
| 10,740,703 B2 | 8/2020 | Story |
| 10,745,868 B2 | 8/2020 | Laugwitz et al. |
| 10,760,946 B2 | 9/2020 | Meier et al. |
| 10,809,118 B1 | 10/2020 | Von Muenster |
| 10,830,634 B2 | 11/2020 | Blank et al. |
| 10,866,109 B2 | 12/2020 | Madsen et al. |
| 10,890,922 B2 | 1/2021 | Ramm et al. |
| 10,909,368 B2 | 2/2021 | Guo et al. |
| 10,912,249 B1 | 2/2021 | Wilson |
| 11,113,525 B1 * | 9/2021 | Li .......................... G06N 3/088 |
| 11,252,485 B2 | 2/2022 | Celicourt |
| 2002/0011061 A1 | 1/2002 | Lucand et al. |
| 2002/0083695 A1 | 7/2002 | Behnke et al. |
| 2002/0091458 A1 | 7/2002 | Moore |
| 2002/0099471 A1 | 7/2002 | Benneweis |
| 2002/0133309 A1 | 9/2002 | Hardt |
| 2002/0173893 A1 | 11/2002 | Blackmore et al. |
| 2002/0193928 A1 | 12/2002 | Beck |
| 2002/0193929 A1 | 12/2002 | Beck |
| 2002/0198654 A1 | 12/2002 | Lange et al. |
| 2003/0004630 A1 | 1/2003 | Beck |
| 2003/0014171 A1 | 1/2003 | Ma et al. |
| 2003/0015351 A1 | 1/2003 | Goldman et al. |
| 2003/0024450 A1 | 2/2003 | Juptner et al. |
| 2003/0060245 A1 | 3/2003 | Coers et al. |
| 2003/0069680 A1 | 4/2003 | Cohen et al. |
| 2003/0075145 A1 | 4/2003 | Sheidler et al. |
| 2003/0174207 A1 | 9/2003 | Alexia et al. |
| 2003/0182144 A1 | 9/2003 | Pickett et al. |
| 2003/0187560 A1 | 10/2003 | Keller et al. |
| 2003/0216158 A1 | 11/2003 | Bischoff |
| 2003/0229432 A1 | 12/2003 | Ho et al. |
| 2003/0229433 A1 | 12/2003 | van den Berg et al. |
| 2003/0229435 A1 | 12/2003 | Van der Lely |
| 2004/0004544 A1 | 1/2004 | William Knutson |
| 2004/0054457 A1 | 3/2004 | Kormann |
| 2004/0073468 A1 | 4/2004 | Vyas et al. |
| 2004/0141641 A1 | 7/2004 | McDonald et al. |
| 2004/0193348 A1 | 9/2004 | Gray et al. |
| 2005/0059445 A1 | 3/2005 | Niermann et al. |
| 2005/0066738 A1 | 3/2005 | Moore |
| 2005/0149235 A1 | 7/2005 | Seal et al. |
| 2005/0150202 A1 | 7/2005 | Quick |
| 2005/0197175 A1 | 9/2005 | Anderson |
| 2005/0241285 A1 | 11/2005 | Maertens et al. |
| 2005/0283314 A1 | 12/2005 | Hall |
| 2005/0284119 A1 | 12/2005 | Brunnert |
| 2006/0014489 A1 | 1/2006 | Fitzner et al. |
| 2006/0014643 A1 | 1/2006 | Hacker et al. |
| 2006/0047377 A1 | 3/2006 | Ferguson et al. |
| 2006/0058896 A1 | 3/2006 | Pokorny et al. |
| 2006/0074560 A1 | 4/2006 | Dyer et al. |
| 2006/0155449 A1 | 7/2006 | Dammann |
| 2006/0162631 A1 | 7/2006 | Hickey et al. |
| 2006/0196158 A1 | 9/2006 | Faivre et al. |
| 2006/0200334 A1 | 9/2006 | Faivre et al. |
| 2007/0005209 A1 | 1/2007 | Fitzner et al. |
| 2007/0021948 A1 | 1/2007 | Anderson |
| 2007/0056258 A1 | 3/2007 | Behnke |
| 2007/0068238 A1 | 3/2007 | Wendte |
| 2007/0073700 A1 | 3/2007 | Wippersteg et al. |
| 2007/0089390 A1 | 4/2007 | Hendrickson et al. |
| 2007/0135190 A1 | 6/2007 | Diekhans et al. |
| 2007/0185749 A1 | 8/2007 | Anderson et al. |
| 2007/0199903 A1 | 8/2007 | Denny |
| 2007/0208510 A1 | 9/2007 | Anderson et al. |
| 2007/0233348 A1 | 10/2007 | Diekhans et al. |
| 2007/0233374 A1 | 10/2007 | Diekhans et al. |
| 2007/0239337 A1 | 10/2007 | Anderson |
| 2007/0282523 A1 | 12/2007 | Diekhans et al. |
| 2007/0298744 A1 | 12/2007 | Fitzner et al. |
| 2008/0030320 A1 | 2/2008 | Wilcox et al. |
| 2008/0098035 A1 | 4/2008 | Wippersteg et al. |
| 2008/0140431 A1 | 6/2008 | Anderson et al. |
| 2008/0177449 A1 | 7/2008 | Pickett et al. |
| 2008/0248843 A1 | 10/2008 | Birrell et al. |
| 2008/0268927 A1 | 10/2008 | Farley et al. |
| 2008/0269052 A1 | 10/2008 | Rosinger et al. |
| 2008/0289308 A1 | 11/2008 | Brubaker |
| 2008/0312085 A1 | 12/2008 | Kordes et al. |
| 2009/0044505 A1 | 2/2009 | Huster et al. |
| 2009/0074243 A1 | 3/2009 | Missotten et al. |
| 2009/0143941 A1 | 6/2009 | Tarasinski et al. |
| 2009/0192654 A1 | 7/2009 | Wendte et al. |
| 2009/0216410 A1 | 8/2009 | Allen et al. |
| 2009/0226036 A1 | 9/2009 | Gaal |
| 2009/0259483 A1 | 10/2009 | Hendrickson et al. |
| 2009/0265098 A1 | 10/2009 | Dix |
| 2009/0306835 A1 | 12/2009 | Ellermann et al. |
| 2009/0311084 A1 | 12/2009 | Coers et al. |
| 2009/0312919 A1 | 12/2009 | Foster et al. |
| 2009/0312920 A1 | 12/2009 | Boenig et al. |
| 2009/0325658 A1 | 12/2009 | Phelan et al. |
| 2010/0036696 A1 | 2/2010 | Lang et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063664 A1 | 3/2010 | Anderson |
| 2010/0063954 A1 | 3/2010 | Anderson et al. |
| 2010/0070145 A1 | 3/2010 | Foster et al. |
| 2010/0071329 A1 | 3/2010 | Hindryckx et al. |
| 2010/0094481 A1 | 4/2010 | Anderson |
| 2010/0121541 A1 | 5/2010 | Behnke et al. |
| 2010/0137373 A1 | 6/2010 | Hungenberg et al. |
| 2010/0145572 A1 | 6/2010 | Steckel et al. |
| 2010/0152270 A1 | 6/2010 | Suty-Heinze et al. |
| 2010/0152943 A1 | 6/2010 | Matthews |
| 2010/0217474 A1 | 8/2010 | Baumgarten et al. |
| 2010/0268562 A1 | 10/2010 | Anderson |
| 2010/0268679 A1 | 10/2010 | Anderson |
| 2010/0285964 A1 | 11/2010 | Waldraff et al. |
| 2010/0317517 A1 | 12/2010 | Rosinger et al. |
| 2010/0319941 A1 | 12/2010 | Peterson |
| 2010/0332051 A1 | 12/2010 | Kormann |
| 2011/0056178 A1 | 3/2011 | Sauerwein et al. |
| 2011/0059782 A1 | 3/2011 | Harrington |
| 2011/0072773 A1 | 3/2011 | Schroeder et al. |
| 2011/0084851 A1 | 4/2011 | Peterson et al. |
| 2011/0086684 A1 | 4/2011 | Luellen et al. |
| 2011/0160961 A1 | 6/2011 | Wollenhaupt et al. |
| 2011/0213531 A1 | 9/2011 | Farley et al. |
| 2011/0224873 A1 | 9/2011 | Reeve et al. |
| 2011/0227745 A1 | 9/2011 | Kikuchi et al. |
| 2011/0257850 A1 | 10/2011 | Reeve et al. |
| 2011/0270494 A1 | 11/2011 | Imhof et al. |
| 2011/0270495 A1 | 11/2011 | Knapp |
| 2011/0295460 A1 | 12/2011 | Hunt et al. |
| 2011/0307149 A1 | 12/2011 | Pighi et al. |
| 2012/0004813 A1 | 1/2012 | Baumgarten et al. |
| 2012/0029732 A1 | 2/2012 | Meyer |

(56) References Cited

U.S. PATENT DOCUMENTS

| | | |
|---|---|---|
| 2012/0087771 A1 | 4/2012 | Wenzel |
| 2012/0096827 A1 | 4/2012 | Chaney et al. |
| 2012/0143642 A1 | 6/2012 | O'Neil |
| 2012/0215378 A1 | 8/2012 | Sprock et al. |
| 2012/0215379 A1 | 8/2012 | Sprock et al. |
| 2012/0253611 A1 | 10/2012 | Zielke et al. |
| 2012/0263560 A1 | 10/2012 | Diekhans et al. |
| 2012/0265412 A1 | 10/2012 | Diekhans et al. |
| 2012/0271489 A1 | 10/2012 | Roberts et al. |
| 2012/0323452 A1 | 12/2012 | Green et al. |
| 2013/0019580 A1 | 1/2013 | Anderson et al. |
| 2013/0022430 A1 | 1/2013 | Anderson et al. |
| 2013/0046419 A1 | 2/2013 | Anderson et al. |
| 2013/0046439 A1 | 2/2013 | Anderson et al. |
| 2013/0046525 A1 | 2/2013 | Ali et al. |
| 2013/0103269 A1 | 4/2013 | Meyer Zu Hellgen et al. |
| 2013/0124239 A1 | 5/2013 | Rosa et al. |
| 2013/0126399 A1 | 5/2013 | Wolff |
| 2013/0184944 A1 | 7/2013 | Missotten et al. |
| 2013/0185104 A1 | 7/2013 | Klavins |
| 2013/0197767 A1 | 8/2013 | Lenz |
| 2013/0205733 A1 | 8/2013 | Peters et al. |
| 2013/0210505 A1 | 8/2013 | Bischoff |
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0332003 A1 | 12/2013 | Murray et al. |
| 2014/0002489 A1 | 1/2014 | Sauder et al. |
| 2014/0019017 A1 | 1/2014 | Wilken et al. |
| 2014/0021598 A1 | 1/2014 | Sutardja et al. |
| 2014/0050364 A1 | 2/2014 | Brueckner et al. |
| 2014/0067745 A1 | 3/2014 | Avey |
| 2014/0121882 A1 | 5/2014 | Gilmore et al. |
| 2014/0129048 A1 | 5/2014 | Baumgarten et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0208870 A1 | 7/2014 | Quaderer et al. |
| 2014/0215984 A1 | 8/2014 | Bischoff et al. |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson et al. |
| 2014/0277960 A1 | 9/2014 | Blank et al. |
| 2014/0297242 A1 | 10/2014 | Sauder et al. |
| 2014/0303814 A1 | 10/2014 | Burema et al. |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2015/0049088 A1 | 2/2015 | Snyder et al. |
| 2015/0088785 A1 | 3/2015 | Chi |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers et al. |
| 2015/0211199 A1 | 7/2015 | Corcoran et al. |
| 2015/0230403 A1 | 8/2015 | Jung et al. |
| 2015/0240939 A1 | 8/2015 | Ge |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson et al. |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0373913 A1 | 12/2015 | Berry et al. |
| 2015/0379785 A1 | 12/2015 | Brown, Jr. et al. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0066505 A1 | 3/2016 | Bakke et al. |
| 2016/0073573 A1 | 3/2016 | Ethington et al. |
| 2016/0078375 A1 | 3/2016 | Ethington et al. |
| 2016/0078570 A1 | 3/2016 | Ethington et al. |
| 2016/0084813 A1 | 3/2016 | Anderson et al. |
| 2016/0088794 A1 | 3/2016 | Baumgarten et al. |
| 2016/0106038 A1 | 4/2016 | Boyd et al. |
| 2016/0146611 A1 | 5/2016 | Matthews |
| 2016/0202227 A1 | 7/2016 | Mathur et al. |
| 2016/0203657 A1 | 7/2016 | Bell et al. |
| 2016/0205918 A1 | 7/2016 | Chan et al. |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling |
| 2016/0260021 A1 | 9/2016 | Marek |
| 2016/0285416 A1 | 9/2016 | Tiwari et al. |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1 | 11/2016 | Cotton et al. |
| 2016/0330906 A1 | 11/2016 | Acheson et al. |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0049045 A1 | 2/2017 | Wilken et al. |
| 2017/0055433 A1 | 3/2017 | Jamison |
| 2017/0082442 A1 | 3/2017 | Anderson |
| 2017/0083024 A1 | 3/2017 | Reijersen Van Buuren |
| 2017/0086381 A1 | 3/2017 | Roell et al. |
| 2017/0089741 A1 | 3/2017 | Takahashi et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0208742 A1 | 7/2017 | Ingibergsson et al. |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Scholer et al. |
| 2017/0245434 A1 | 8/2017 | Jung et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0316692 A1 | 11/2017 | Rusciolelli et al. |
| 2017/0318743 A1 | 11/2017 | Sauder et al. |
| 2017/0322550 A1 | 11/2017 | Yokoyama |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |

(56) References Cited

U.S. PATENT DOCUMENTS

| | | |
|---|---|---|
| 2018/0022559 A1 | 1/2018 | Knutson |
| 2018/0024549 A1 | 1/2018 | Hurd |
| 2018/0035622 A1 | 2/2018 | Gresch et al. |
| 2018/0054955 A1 | 3/2018 | Oliver |
| 2018/0060975 A1 | 3/2018 | Hassanzadeh |
| 2018/0070534 A1 | 3/2018 | Mayerle |
| 2018/0077865 A1 | 3/2018 | Gallmeier et al. |
| 2018/0084709 A1 | 3/2018 | Wieckhorst et al. |
| 2018/0084722 A1 | 3/2018 | Wieckhorst et al. |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120133 A1 | 5/2018 | Blank et al. |
| 2018/0121821 A1 | 5/2018 | Parsons et al. |
| 2018/0124992 A1 | 5/2018 | Koch et al. |
| 2018/0128933 A1 | 5/2018 | Koch et al. |
| 2018/0129879 A1 | 5/2018 | Achtelik et al. |
| 2018/0132422 A1 | 5/2018 | Hassanzadeh et al. |
| 2018/0136664 A1 | 5/2018 | Tomita et al. |
| 2018/0146612 A1 | 5/2018 | Sauder et al. |
| 2018/0146624 A1 | 5/2018 | Chen et al. |
| 2018/0153084 A1 | 6/2018 | Calleija et al. |
| 2018/0177125 A1 | 6/2018 | Takahara et al. |
| 2018/0177136 A1 | 6/2018 | Reimann et al. |
| 2018/0181893 A1 | 6/2018 | Basso |
| 2018/0196438 A1 | 7/2018 | Newlin et al. |
| 2018/0196441 A1 | 7/2018 | Muench et al. |
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |
| 2018/0325014 A1 | 11/2018 | Debbaut |
| 2018/0325015 A1 | 11/2018 | Wolters et al. |
| 2018/0332767 A1 | 11/2018 | Muench et al. |
| 2018/0338422 A1 | 11/2018 | Brubaker |
| 2018/0340845 A1 | 11/2018 | Rhodes et al. |
| 2018/0359917 A1 | 12/2018 | Blank et al. |
| 2018/0359919 A1 | 12/2018 | Blank et al. |
| 2018/0364726 A1 | 12/2018 | Foster et al. |
| 2019/0021226 A1 | 1/2019 | Dima et al. |
| 2019/0025175 A1 | 1/2019 | Laugwitz |
| 2019/0041813 A1 | 2/2019 | Horn et al. |
| 2019/0050948 A1 | 2/2019 | Perry et al. |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0150357 A1 | 5/2019 | Wu et al. |
| 2019/0156255 A1 | 5/2019 | Carroll |
| 2019/0174667 A1 | 6/2019 | Gresch et al. |
| 2019/0183047 A1 | 6/2019 | Dybro et al. |
| 2019/0200522 A1 | 7/2019 | Hansen et al. |
| 2019/0230855 A1 | 8/2019 | Reed et al. |
| 2019/0239416 A1 | 8/2019 | Green et al. |
| 2019/0261550 A1 | 8/2019 | Damme et al. |
| 2019/0261559 A1 | 8/2019 | Heitmann et al. |
| 2019/0261560 A1 | 8/2019 | Jelenkovic |
| 2019/0313570 A1 | 10/2019 | Owechko |
| 2019/0327889 A1 | 10/2019 | Borgstadt et al. |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2020/0000006 A1 | 1/2020 | McDonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |
| 2020/0117173 A1 | 4/2020 | Terres et al. |
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1 | 4/2020 | Brammeier et al. |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0141784 A1 | 5/2020 | Lange et al. |
| 2020/0146203 A1 | 5/2020 | Deng |
| 2020/0150631 A1 | 5/2020 | Frieberg et al. |
| 2020/0154639 A1 | 5/2020 | Takahara et al. |
| 2020/0163277 A1 | 5/2020 | Cooksey et al. |
| 2020/0183406 A1 | 6/2020 | Borgstadt |
| 2020/0187409 A1 | 6/2020 | Meyer Zu Helligen |
| 2020/0193589 A1* | 6/2020 | Peshlov .................. G06V 10/82 |
| 2020/0196526 A1 | 6/2020 | Koch et al. |
| 2020/0202127 A1 | 6/2020 | Chen et al. |
| 2020/0202596 A1 | 6/2020 | Kitahara et al. |
| 2020/0214231 A1 | 7/2020 | Beeri et al. |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0250360 A1 | 8/2020 | Hoffmann et al. |
| 2020/0250593 A1 | 8/2020 | Peters et al. |
| 2020/0265527 A1 | 8/2020 | Rose et al. |
| 2020/0278680 A1 | 9/2020 | Schultz et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0323133 A1 | 10/2020 | Anderson et al. |
| 2020/0323134 A1 | 10/2020 | Darr et al. |
| 2020/0326674 A1 | 10/2020 | Palla et al. |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0342225 A1 | 10/2020 | Schumann et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0363256 A1 | 11/2020 | Meier et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |

(56) References Cited

U.S. PATENT DOCUMENTS

| | | | |
|---|---|---|---|
| 2021/0015041 A1 | 1/2021 | Bormann et al. | |
| 2021/0056338 A1* | 2/2021 | Padwick | G06V 20/38 |
| 2021/0129853 A1 | 5/2021 | Appleton et al. | |
| 2021/0149406 A1* | 5/2021 | Javault | A01C 21/005 |
| 2021/0176916 A1 | 6/2021 | Sidon et al. | |
| 2021/0176918 A1 | 6/2021 | Franzen et al. | |
| 2021/0243936 A1 | 8/2021 | Vandike et al. | |
| 2021/0243938 A1 | 8/2021 | Blank et al. | |
| 2021/0289687 A1 | 9/2021 | Heinold et al. | |
| 2021/0315163 A1 | 10/2021 | Brewin | |
| 2021/0321554 A1 | 10/2021 | Liu et al. | |
| 2021/0321567 A1 | 10/2021 | Sidon et al. | |
| 2022/0151156 A1 | 5/2022 | Bidram et al. | |
| 2022/0327815 A1 | 10/2022 | Picon Ruiz et al. | |
| 2023/0368312 A1* | 11/2023 | Gorry | A01M 21/00 |

FOREIGN PATENT DOCUMENTS

| | | |
|---|---|---|
| BR | MU6800140 U | 12/1989 |
| BR | PI0502658 A | 2/2007 |
| BR | PI0802384 A2 | 3/2010 |
| BR | PI1100258 A2 | 3/2014 |
| BR | 102014007178 A2 | 8/2016 |
| CA | 1165300 A | 4/1984 |
| CA | 2283767 A1 | 3/2001 |
| CA | 2330979 A1 | 8/2001 |
| CA | 2629555 A1 | 11/2009 |
| CA | 135611 S | 5/2011 |
| CN | 2451633 Y | 10/2001 |
| CN | 101236188 A | 8/2008 |
| CN | 100416590 C | 9/2008 |
| CN | 101303338 A | 11/2008 |
| CN | 101363833 A | 2/2009 |
| CN | 201218789 Y | 4/2009 |
| CN | 101839906 A | 9/2010 |
| CN | 101929166 A | 12/2010 |
| CN | 102080373 A | 6/2011 |
| CN | 102138383 A | 8/2011 |
| CN | 102277867 B | 12/2011 |
| CN | 202110103 U | 1/2012 |
| CN | 202119772 U | 1/2012 |
| CN | 202340435 U | 7/2012 |
| CN | 103088807 A | 5/2013 |
| CN | 103181263 A | 7/2013 |
| CN | 203053961 U | 7/2013 |
| CN | 203055121 U | 7/2013 |
| CN | 203206739 U | 9/2013 |
| CN | 203275401 U | 11/2013 |
| CN | 203613525 U | 5/2014 |
| CN | 203658201 U | 6/2014 |
| CN | 103954738 A | 7/2014 |
| CN | 203741803 U | 7/2014 |
| CN | 204000818 U | 12/2014 |
| CN | 204435344 U | 7/2015 |
| CN | 204475304 U | 7/2015 |
| CN | 105205248 A | 12/2015 |
| CN | 204989174 U | 1/2016 |
| CN | 105432228 A | 3/2016 |
| CN | 105741180 A | 7/2016 |
| CN | 106053330 A | 10/2016 |
| CN | 106198877 A | 12/2016 |
| CN | 106198879 A | 12/2016 |
| CN | 106226470 A | 12/2016 |
| CN | 106248873 A | 12/2016 |
| CN | 106290800 A | 1/2017 |
| CN | 106327349 A | 1/2017 |
| CN | 106644663 A | 5/2017 |
| CN | 206330815 U | 7/2017 |
| CN | 206515118 U | 9/2017 |
| CN | 206515119 U | 9/2017 |
| CN | 206616118 U | 11/2017 |
| CN | 206696107 | 12/2017 |
| CN | 206696107 U | 12/2017 |
| CN | 107576674 | 1/2018 |
| CN | 107576674 A | 1/2018 |
| CN | 206906093 U | 1/2018 |
| CN | 206941558 | 1/2018 |
| CN | 206941558 U | 1/2018 |
| CN | 107736088 A | 2/2018 |
| CN | 107795095 A | 3/2018 |
| CN | 207079558 | 3/2018 |
| CN | 107941286 A | 4/2018 |
| CN | 107957408 A | 4/2018 |
| CN | 108009542 A | 5/2018 |
| CN | 108304796 A | 7/2018 |
| CN | 207567744 U | 7/2018 |
| CN | 108614089 A | 10/2018 |
| CN | 208013131 U | 10/2018 |
| CN | 108881825 A | 11/2018 |
| CN | 208047351 U | 11/2018 |
| CN | 109357804 A | 2/2019 |
| CN | 109485353 A | 3/2019 |
| CN | 109633127 A | 4/2019 |
| CN | 109763476 A | 5/2019 |
| CN | 109961024 A | 7/2019 |
| CN | 110262287 A | 9/2019 |
| CN | 110720302 A | 1/2020 |
| CN | 111201879 A | 5/2020 |
| CN | 210585958 U | 5/2020 |
| CN | 111406505 A | 7/2020 |
| CS | 247426 B1 | 12/1986 |
| CS | 248318 B1 | 2/1987 |
| CZ | 17266 U1 | 2/2007 |
| CZ | 20252 U1 | 11/2009 |
| DE | 441597 C | 3/1927 |
| DE | 504035 C | 7/1930 |
| DE | 2354828 A1 | 5/1975 |
| DE | 152380 A1 | 11/1981 |
| DE | 3728669 A1 | 3/1989 |
| DE | 4431824 C1 | 5/1996 |
| DE | 19509496 A1 | 9/1996 |
| DE | 19528663 A1 | 2/1997 |
| DE | 19718455 A1 | 11/1997 |
| DE | 19705842 A1 | 8/1998 |
| DE | 19828355 A1 | 1/2000 |
| DE | 10050224 A1 | 4/2002 |
| DE | 10120173 A1 | 10/2002 |
| DE | 202004015141 U1 | 12/2004 |
| DE | 102005000770 B3 | 7/2006 |
| DE | 102005000771 A1 | 8/2006 |
| DE | 102008021785 A1 | 11/2009 |
| DE | 102009041646 A1 | 3/2011 |
| DE | 102010004648 A1 | 7/2011 |
| DE | 102010038661 A1 | 2/2012 |
| DE | 102011005400 A1 | 9/2012 |
| DE | 202012103730 U1 | 10/2012 |
| DE | 102011052688 A1 | 2/2013 |
| DE | 102012211001 A1 | 1/2014 |
| DE | 102012220109 | 5/2014 |
| DE | 102012223768 | 6/2014 |
| DE | 102013212151 A1 | 12/2014 |
| DE | 102013019098 B3 | 1/2015 |
| DE | 102014108449 A1 | 2/2015 |
| DE | 2014201203 A1 | 7/2015 |
| DE | 102014208068 A1 | 10/2015 |
| DE | 102015006398 B3 | 5/2016 |
| DE | 102015109799 A1 | 12/2016 |
| DE | 112015002194 T5 | 1/2017 |
| DE | 102017204511 A1 | 9/2018 |
| DE | 102019206734 A1 | 11/2020 |
| DE | 102019114872 A1 | 12/2020 |
| EP | 0070219 B1 | 10/1984 |
| EP | 0355049 A2 | 2/1990 |
| EP | 845198 B2 | 6/1998 |
| EP | 0532146 B1 | 8/1998 |
| EP | 1444879 A1 | 8/2004 |
| EP | 1219159 B1 | 6/2005 |
| EP | 1219153 B1 | 2/2006 |
| EP | 1692928 A2 | 8/2006 |
| EP | 1574122 B1 | 2/2008 |
| EP | 1943877 A2 | 7/2008 |
| EP | 1598586 B1 | 9/2009 |
| EP | 1731983 B1 | 9/2009 |
| EP | 2146307 A2 | 1/2010 |

(56) References Cited

FOREIGN PATENT DOCUMENTS

| | | |
|---|---|---|
| EP | 2186389 A1 | 5/2010 |
| EP | 2267566 A2 | 12/2010 |
| EP | 3491192 A2 | 12/2010 |
| EP | 2057884 B1 | 1/2011 |
| EP | 2146307 B1 | 5/2012 |
| EP | 2446732 A1 | 5/2012 |
| EP | 2524586 A2 | 11/2012 |
| EP | 2529610 A1 | 12/2012 |
| EP | 2243353 B1 | 3/2013 |
| EP | 2174537 B1 | 5/2013 |
| EP | 2592919 A1 | 5/2013 |
| EP | 1674324 B2 | 5/2014 |
| EP | 2759829 A1 | 7/2014 |
| EP | 2764764 B1 | 8/2014 |
| EP | 2267566 A3 | 12/2014 |
| EP | 2191439 B1 | 3/2015 |
| EP | 2586286 B1 | 3/2015 |
| EP | 2592919 B1 | 9/2015 |
| EP | 2921042 A1 | 9/2015 |
| EP | 2944725 A1 | 11/2015 |
| EP | 2510777 B1 | 3/2016 |
| EP | 2997805 A1 | 3/2016 |
| EP | 3000302 A1 | 3/2016 |
| EP | 2868806 B1 | 7/2016 |
| EP | 3085221 A1 | 10/2016 |
| EP | 3095310 A1 | 11/2016 |
| EP | 3097759 A1 | 11/2016 |
| EP | 2452551 B1 | 5/2017 |
| EP | 3175691 A1 | 6/2017 |
| EP | 3195719 A1 | 7/2017 |
| EP | 3195720 A1 | 7/2017 |
| EP | 3259976 A1 | 12/2017 |
| EP | 3262934 A1 | 1/2018 |
| EP | 3287007 A1 | 2/2018 |
| EP | 3298876 A1 | 3/2018 |
| EP | 3300579 A1 | 4/2018 |
| EP | 3315005 A1 | 5/2018 |
| EP | 3316208 A1 | 5/2018 |
| EP | 2829171 B1 | 6/2018 |
| EP | 2508057 | 7/2018 |
| EP | 2508057 B1 | 7/2018 |
| EP | 3378298 A1 | 9/2018 |
| EP | 3378299 A1 | 9/2018 |
| EP | 3384754 A1 | 10/2018 |
| EP | 3289853 B1 | 3/2019 |
| EP | 3456167 A1 | 3/2019 |
| EP | 3466239 A1 | 4/2019 |
| EP | 3469878 A1 | 4/2019 |
| EP | 3289852 B1 | 6/2019 |
| EP | 3491192 A1 | 6/2019 |
| EP | 3494770 A1 | 6/2019 |
| EP | 3498074 A1 | 6/2019 |
| EP | 3000302 B1 | 8/2019 |
| EP | 3533314 A1 | 9/2019 |
| EP | 3569049 A1 | 11/2019 |
| EP | 3000307 B1 | 12/2019 |
| EP | 3586592 A2 | 1/2020 |
| EP | 3593613 A1 | 1/2020 |
| EP | 3593620 A1 | 1/2020 |
| EP | 3613272 A1 | 2/2020 |
| EP | 3243374 B1 | 3/2020 |
| EP | 3626038 A1 | 3/2020 |
| EP | 3259976 B1 | 4/2020 |
| EP | 3635647 A1 | 4/2020 |
| EP | 3378298 B1 | 5/2020 |
| EP | 3646699 A1 | 5/2020 |
| EP | 3662741 A1 | 6/2020 |
| EP | 3685648 A1 | 7/2020 |
| EP | 2995191 B2 | 10/2020 |
| ES | 2116215 A1 | 7/1998 |
| ES | 2311322 A1 | 2/2009 |
| FI | 5533 A | 11/1913 |
| FR | 1451480 A | 1/1966 |
| FR | 2817344 A1 | 5/2002 |
| FR | 2901291 A | 11/2007 |
| FR | 2901291 A1 | 11/2007 |
| GB | 901081 A | 7/1962 |
| GB | 201519517 A1 | 5/2017 |
| IN | 1632DE2014 A | 8/2016 |
| IN | 201641027017 A | 10/2016 |
| IN | 202041039250 A | 9/2020 |
| JP | 7079681 A | 11/1982 |
| JP | S60253617 A | 12/1985 |
| JP | S63308110 A | 12/1988 |
| JP | H02196960 A | 8/1990 |
| JP | H02215311 A | 8/1990 |
| JP | H0779681 A | 3/1995 |
| JP | H1066436 A | 3/1998 |
| JP | H10191762 A | 7/1998 |
| JP | 2000352044 A | 12/2000 |
| JP | 2001057809 A | 3/2001 |
| JP | 2002186348 A | 7/2002 |
| JP | 2005227233 A | 8/2005 |
| JP | 2006166871 A | 6/2006 |
| JP | 2011205967 A | 10/2011 |
| JP | 2015070812 A | 4/2015 |
| JP | 2015151826 A | 8/2015 |
| JP | 2015219651 A | 12/2015 |
| JP | 2016071726 A | 5/2016 |
| JP | 2016160808 A | 9/2016 |
| JP | 6087258 B2 | 3/2017 |
| JP | 2017136035 A | 8/2017 |
| JP | 2017137729 A | 8/2017 |
| JP | 2017195804 A | 11/2017 |
| JP | 2018068284 A | 5/2018 |
| JP | 2018102154 A | 7/2018 |
| JP | 2018151388 A | 9/2018 |
| JP | 2019004796 A | 1/2019 |
| JP | 2019129744 A | 8/2019 |
| JP | 2019146506 A | 9/2019 |
| JP | 2019216744 A | 12/2019 |
| JP | 2020018255 A | 2/2020 |
| JP | 2020031607 A | 3/2020 |
| JP | 2020113062 A | 7/2020 |
| JP | 2020127405 A | 8/2020 |
| KR | 100974892 | 8/2010 |
| KR | 100974892 B1 | 8/2010 |
| KR | 20110018582 A | 2/2011 |
| KR | 101067576 B | 9/2011 |
| KR | 101067576 B1 | 9/2011 |
| KR | 101134075 B1 | 4/2012 |
| KR | 101447197 B1 | 10/2014 |
| KR | 101653750 | 9/2016 |
| KR | 20170041377 A | 4/2017 |
| KR | 200485051 Y | 11/2017 |
| KR | 200485051 Y1 | 11/2017 |
| KR | 101873657 B | 8/2018 |
| MX | GT06000012 A | 1/2008 |
| PL | 178299 B1 | 4/2000 |
| RO | 130713 | 11/2015 |
| RU | 1791767 C | 1/1993 |
| RU | 2005102554 A | 7/2006 |
| RU | 2421744 C | 6/2011 |
| RU | 2421744 C1 | 6/2011 |
| RU | 2447640 C1 | 4/2012 |
| RU | 2502047 C | 12/2013 |
| RU | 2502047 C1 | 12/2013 |
| RU | 164128 | 8/2016 |
| RU | 2017114139 A | 10/2018 |
| RU | 2017114139 A3 | 5/2019 |
| SU | 834514 A1 | 5/1981 |
| SU | 887717 A1 | 12/1981 |
| SU | 1052940 A1 | 11/1983 |
| SU | 1134669 A1 | 1/1985 |
| SU | 1526588 A1 | 12/1989 |
| SU | 1540053 A1 | 1/1991 |
| SU | 1761864 A1 | 9/1992 |
| WO | 1986005353 A1 | 9/1986 |
| WO | 2001052160 A1 | 7/2001 |
| WO | 2002015673 A1 | 2/2002 |
| WO | 2003005803 A1 | 1/2003 |

(56) References Cited

FOREIGN PATENT DOCUMENTS

| | | |
|---|---|---|
| WO | 2007050192 A2 | 5/2007 |
| WO | 2009156542 A1 | 12/2009 |
| WO | 2010003421 A1 | 1/2010 |
| WO | 2011104085 A1 | 9/2011 |
| WO | 2012041621 A1 | 4/2012 |
| WO | 2012110508 A1 | 8/2012 |
| WO | 2012110544 A1 | 8/2012 |
| WO | 2013063106 A2 | 5/2013 |
| WO | 2013079247 A1 | 6/2013 |
| WO | 2013086351 A1 | 6/2013 |
| WO | 2013087275 A1 | 6/2013 |
| WO | 2014046685 A1 | 3/2014 |
| WO | 2014093814 A1 | 6/2014 |
| WO | 2014195302 A1 | 12/2014 |
| WO | 2015038751 A1 | 3/2015 |
| WO | 2015153809 A1 | 10/2015 |
| WO | 16020595 A1 | 2/2016 |
| WO | 2016020595 A1 | 2/2016 |
| WO | 2016118686 A1 | 7/2016 |
| WO | 2017008161 A1 | 1/2017 |
| WO | 2017060168 A1 | 4/2017 |
| WO | 2017077113 A1 | 5/2017 |
| WO | 2017096489 A1 | 6/2017 |
| WO | 2017099570 A1 | 6/2017 |
| WO | 2017116913 A1 | 7/2017 |
| WO | 2017170507 A1 | 10/2017 |
| WO | 2017205406 A1 | 11/2017 |
| WO | 2017205410 A1 | 11/2017 |
| WO | 2018043336 A1 | 3/2018 |
| WO | 2018073060 A1 | 4/2018 |
| WO | 2018081043 A1 | 5/2018 |
| WO | 2018081759 A1 | 5/2018 |
| WO | 2018086764 A1 | 5/2018 |
| WO | 2018112615 | 6/2018 |
| WO | 2018116772 A1 | 6/2018 |
| WO | 2018142768 A1 | 8/2018 |
| WO | 2018200870 A1 | 11/2018 |
| WO | 2018206587 A1 | 11/2018 |
| WO | 2018220159 A1 | 12/2018 |
| WO | 2018226139 A1 | 12/2018 |
| WO | 2018235486 A1 | 12/2018 |
| WO | 2018235942 A1 | 12/2018 |
| WO | WO18235486 A1 | 12/2018 |
| WO | 2019034213 A1 | 2/2019 |
| WO | 2019079205 A1 | 4/2019 |
| WO | 2019081349 A1 | 5/2019 |
| WO | 2019091535 A1 | 5/2019 |
| WO | 2019109191 A1 | 6/2019 |
| WO | 2019124174 A1 | 6/2019 |
| WO | 2019124217 A1 | 6/2019 |
| WO | 2019124225 A1 | 6/2019 |
| WO | 2019124273 A1 | 6/2019 |
| WO | 2019129333 A1 | 7/2019 |
| WO | 2019129334 A1 | 7/2019 |
| WO | 2019129335 A1 | 7/2019 |
| WO | 2019215185 A1 | 11/2019 |
| WO | 2019230358 A1 | 12/2019 |
| WO | 2020026578 A1 | 2/2020 |
| WO | 2020026650 A1 | 2/2020 |
| WO | 2020026651 A1 | 2/2020 |
| WO | 2020031473 A1 | 2/2020 |
| WO | 2020038810 A1 | 2/2020 |
| WO | 2020039312 A1 | 2/2020 |
| WO | 2020039671 A1 | 2/2020 |
| WO | 2020044726 A1 | 3/2020 |
| WO | 2020082182 A1 | 4/2020 |
| WO | 2020100810 A1 | 5/2020 |
| WO | 2020110920 A1 | 6/2020 |
| WO | 2020195007 A1 | 10/2020 |
| WO | 2020206941 A1 | 10/2020 |
| WO | 2020206942 A1 | 10/2020 |
| WO | 2020210607 A1 | 10/2020 |
| WO | WO 2020201046 A1 | 10/2020 |
| WO | 2020221981 A1 | 11/2020 |
| WO | 2021262500 A1 | 12/2021 |

OTHER PUBLICATIONS

Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Martinez-Feria et al., "Evaluating Maize and Soybean Grain Dry-Down in the Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.
Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Ma et al., Identification of Fusarium Head Blight in Winter Wheat Ears Using Continuous Wavelet Analysis, Dec. 19, 2019, 15 pages.
Morrison, "Should You Use Tillage to Control Resistant Weeds", Aug. 29, 2014, 9 pages.
Morrison, "Snow Trapping Snars Water", Oct. 13, 2005, 3 pages.
"Soil Zone Index", https://www.satimagingcorp.com/applications/natural-resources/agricultu . . . , Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed to Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (© 2001 American Society of Agricultural Engineers ), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery for Detection of European Corn Borer Infestation in Iowa Corn Plots", Nov. 2008, 11 pages.
Agriculture, "Using drones in agriculture and capturing actionable data", Retrieved Dec. 11, 2020, 18 pages.

(56) References Cited

OTHER PUBLICATIONS

Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (Spodoptera frugiperda) in maize at a regional scale", Apr. 10, 2015, 14 pages.
Booker, "Video: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University—Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.
Mathyam et al., "Remote Sensing of Biotic Stress in Crop Plants and Its Applications for Pest Stress", Dec. 2011, 30 pages.
"Four Helpful Weed-Management Tips for Harvest Time", 2 pages, Sep. 4, 2019.
Franz et al., "The role of topography, soil, and remotely sensed vegetation condition towards predicting crop yield", University of Nebraska-Lincoln, Mar. 23, 2020, 44 pages.
Peiffer et al., The Genetic Architecture of Maize Stalk Strength:, Jun. 20, 2013, 14 pages.
Non Final Office Action from U.S. Appl. No. 18/158,005 dated Sep. 14, 2023, 11 pages.
Application and Drawings for U.S. Appl. No. 16/171,978, filed Oct. 26, 2018, 53 pages.
Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.
Feng-jie, X., Er-da, W. and Feng-yuan, X., Crop area yield risk evaluation and premium rates calculation—Based on nonparametric kernel density estimation. In 2009 International Conference on Management Science and Engineering, 7 pages.
Liu, R. and Bai, X., May 2014. Random fuzzy production and distribution plan of agricultural products and its PSO algorithm. In 2014 IEEE International Conference on Progress in Informatics and Computing (pp. 32-36). IEEE.
Notice of Allowance for U.S. Appl. No. 16/171,978 dated Mar. 31, 2021, 6 pages.
Application and Drawings for U.S. Appl. No. 17/067,383, filed Oct. 9, 2020, 61 pages.
Non-Final Office Action for U.S. Appl. No. 17/067,383 dated Nov. 2, 2022, 38 pages.
Benvenuti, S., 2007. Weed seed movement and dispersal strategies in the agricultural environment. Weed biology and management, 7, pp. 141-157.
Chantre, G.R., Vigna, M.R., Renzi, J.P. and Blanco, A.M., 2018. A flexible and practical approach for real-time weed emergence prediction based on Artificial Neural Networks, Biosystems engineering, 170, pp. 51-60.
Final Office Action for U.S. Appl. No. 16/783,511 dated Nov. 4, 2022, 19 pages.
Martin et al., "Breakage Susceptibility and Harness of Corn Kernels of Various Sizes and Shapes", May 1987, 10 pages.
Jones et al., "Brief history of agricultural systems modeling" Jun. 21, 2016, 15 pages.
Dan Anderson, "Brief history of agricultural systems modeling" 1 pages. Aug. 13, 2019.
A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.
John Deere S-Series Combines S760, S770, S780, S790 Brochure, 44 pages, Nov. 15, 2017.
Sekhon et al., "Stalk Bending Strength is Strongly Assoicated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding corn hybrid characteristics and properties can impact your seed decisions", 8 pages, Sep. 21, 2018.
TraCI/Change Vehicle State—SUMO Documentation, 10 pages, Retrieved Dec. 11, 2020.
Arnold, et al., Chapter 8. "Plant Growth Component", Jul. 1995, 41 pages.
Humburg, Chapter: 37 "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Corn Agronomy, Originally written Feb. 1, 2006 | Last updated Oct. 18, 2018, 2 pages.
University of Nebraska-Lincoln, "Combine Adjustments for Downed Corn—Crop Watch", Oct. 27, 2017, 5 pages.
"Combine Cleaning: Quick Guide to Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.
Bendig et al., "Estimating Biomass of Barley Using Crop Surface Models (CSMs) Derived from UAV-Based RGB Imaging", Oct. 21, 2014, 18 pages.

(56) References Cited

OTHER PUBLICATIONS

Robertson, et al., "Maize Stalk Lodging: Morphological Determinants of Stalk Strength", Mar. 3, 2017, 10 pages.
MacGowan et al. Purdue University, Corn and Soybean Crop Deprediation by Wildlife, Jun. 2006, 14 pages.
Martinez-Feria et al., Iowa State University, "Corn Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does an Adaptive Gearbox Really Learn How You Drive?", Oct. 30, 2019, 8 pages.
Eggerl, "Optimization of Combine Processes Using Expert Knowledge and Methods of Artificial Intelligence", Oct. 7, 1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1-pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture" Yield Monitors University of Missouri-System, 4 pages, 1998.
Apan et al., "Predicting Grain Protein Content in Wheat Using Hyperspectral Sensing of In-season Crop Canopies and Partial Least Squares Regression" 18 pages, 2006.
Xu et al., "Prediction of Wheat Grain Protein by Coupling Multisource Remote Sensing Imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, Video: Canadian cage mill teams up with JD (https://www.producer.com/2019/12/video-canadian-cage-mill-teams-up-with-jd/), 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGI4&list=PL1KGsSJ4CWk4rShNb3-sTMOliL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.
Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component_Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
Notice of Allowance for U.S. Appl. No. 16/783,511 dated Jan. 19, 2023, 7 pages.
Application and Drawings for U.S. Appl. No. 18/158,005, filed Jan. 23, 2023, 62 pages.
Notice of Allowance for U.S. Appl. No. 17/066,999 dated Jan. 26, 2023, 6 pages.
Leu et al., Grazing Corn Residue Using Resources and Reducing Costs, Aug. 2009, 4 pages.
"No-Till Soils", Soil Heath Brochure, 2 pages, last accessed Jul. 14, 2020.
Strickland et al., "Nitrate Toxicity in Livestock" Oklahoma State University, Feb. 2017, 2 pages.
Strickland et al., "Nitrate Toxicity in Livestock" Oklahoma State University, 8 pages, Feb. 2017.
Brownlee, "Neural Networks are Function Approximation Algorithms", Mar. 18, 2020, 13 pages.
Thompson, "Morning glory can make it impossible to harvest corn", Feb. 19, 2015, 3 pages.
Tumlison, "Monitoring Growth Development and Yield Estimation of Maize Using Very High-Resolution Uavimages in Gronau, Germany", Feb. 2017, 63 pages.
Hunt, "Mapping Weed Infestations Using Remote Sensing", 8 pages, Jul. 19, 2005.
Wright, et al., "Managing Grain Protein in Wheat Using Remote Sensing", 12 pages, 2003.
"Malting Barley in Pennsylvania", Agronomy Facts 77, 6 pages, Code EE0179 Jul. 2016.
"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.

(56) References Cited

OTHER PUBLICATIONS

Licht, "Influence of Corn Seeding Rate, Soil Attributes, and Topographic Characteristics on Grain Yield, Yield Components, and Grain Composition", 2015, 107 pages.
"Notice of Retraction Virtual simulation of plant with individual stem based on crop growth model", Mar. 5, 2017, 7 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
Hanna, "Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.
"Grazing Corn Residues" (http://www.ca.uky.edu), 3 pages, Aug. 24, 2009.
Jarnevich et al., Forecasting Weed Distributions Using Climate Data: A GIS Early Warning Tool, Downloaded on Jul. 13, 2020, 12 pages.
Combine Cutting and Feeding Mechanisms in the Southeast, by J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.
S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) by Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.
Extended European Search Report and Written Opinion issued in European Patent Application No. 23154796.9, dated Sep. 12, 2023, in 10 pages.
Wang et al., A real-time, embedded, weed-detection system for use in wheat fields, Biosystems Engineering, Elsevier, Amsterdam, NL, vol. 98, No. 3, Oct. 23, 2007, pp. 276-285, XP022332194, ISSN: 1537-5110.
Somerville, G.J., Jørgensen, R.N., Bojer, O.M., Rydahl, P., Dyrmann, M., Andersen, P., Jensen, N.P. and Green, O., 2019. Marrying futuristic weed mapping with current herbicide sprayer capacities. In Precision agriculture'19. Wageningen Academic Publishers. 7 Pages.
Martin et al. Breakage Susceptibiltiy and Hardness of Corn Kernels of Various Sizes and Shapes, vol. 3(): May 1087, 10 pages.
https://pdfs.semanticscholar.org/e579/1b5363b6a78efd44adfb97755a0cdd14f7ca.pdf.
Hoff, "Combine Adjustments" (https://smallfarmersjournal.com/combine-adjustments/), Mar. 1943, 9 pages.
Optimizing Crop Profit Across Multiple Grain Attributes and Stover, Electronic Publication Date May 26, 2009, 17 pages.
Unglesbee, Soybean Pod Shatter—Bad Enough to Scout Before Harvest—DTN, Oct. 17, 2018, 11 pages. Susceptibility to shatter (https://agfax.com/2018/10/17/soybean-pod-shatter-bad-enough-to-scout-before-harvest-dtn/).
GIS Maps for Agricultural, accessed on May 10, 2022, 7 pages. https://www.satimagingcorp.com/services/geographic-information-systems/gis-maps-agriculture-mapping.
https://wingtra.com/drone-mapping-applications/use-of-drones-in-agriculture, accessed on May 10, 2022, 19 pages.
Energy Requirement Model for a Combine Harvester: Part 1: Development of Component Models, Published online Dec. 22, 2004, 17 pages.
Energy Requirement Model for a Combine Harvester, Part 2: Integration of Component Models, Published online Jan. 18, 2005, 11 pages.
Pioneer on reducing soybean harvest losses including combine adjustments (last accessed Jul. 23, 2020) (https://www.pioneer.com/us/agronomy/reducing_harvest_losses_in_soybeans.html), 5 pages.
Non-Final Office Action for U.S. Appl. No. 16/783,511, dated Jun. 8, 2022, 21 pages.
Colbach, N., Busset, H., Roger-Estrade, J. and Caneill, J., 2014. Predictive modelling of weed seed movement in response to superficial tillage tools. Soil and tillage research, 138, pp. 1-8.
Application and Drawings for U.S. Appl. No. 16/175,993, filed Oct. 31, 2018, 28 pages.
Application and Drawings for U.S. Appl. No. 16/380,623, filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells ,N., Reardon-Smith, K, Richardson, L, McDougall, K, and Basnet, B.B., 2008. Predictive mapping of blackberry in the Condamine Catchment using logistic regression and spatial analysis. In Proceedings of the 2008 Queensland Spatial Conference: Global Warning: What's Happening in Paradise. Spatial Sciences Institute, 11 pages.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Provisional Application and Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings as filed on Oct. 9, 2020, 63 pages.
U.S. Appl. No. 17/066,442 Application and Drawings as filed on Oct. 8, 2020, 65 pages.
U.S. Appl. No. 16/380,550, filed Apr. 10, 2019, Application and Drawings, 47 pages.

(56) References Cited

OTHER PUBLICATIONS

U.S. Appl. No. 17/066,999 Application and Drawings as filed on Oct. 9, 2020, 67 pages.
U.S. Appl. No. 17/066,444 Application and Drawings as filed on Oct. 8, 2020, 102 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Fuzzy Algorithm," 2010, Publisher: IEEE, 5 pages.
Dan et al., "On-the-go Throughput Prediction in a Combine Harvester Using Sensor Fusion," 2017, Publisher: IEEE, 6 pages.
Fernandez-Quintanilla et al., "Is the current state of the art of weed monitoring sutible for site-specific weed management in arable crops?", First Published May 1, 2018, 4 pages.
Dionysis Bochtis et al. "Field Operations Planning for Agricultural Vehicles: A Hierarchical Modeling Framework." Agricultural Engineering International: the CIGR Ejournal. Manuscript PM 06 021. vol. IX. Feb. 2007, pp. 1-11.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6, 9 pages.
Yi et al., "An Efficient MAC Protocol With Adaptive Energy Harvesting for Machine-to-Machine Networks," 2015, vol. 3, Publisher: IEEE, 10 pages.
European Search Report issued in European Patent Application No. 19203883.4 dated Mar. 23, 2020 (10 pages).
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
U.S. Appl. No. 16/380,564 Application and Drawings as filed on Apr. 10, 2019, 55 pages.
S. Veenadhari et al., "Machine Learning Approach for Forecasting Crop Yield Based on Climatic Parameters", 2014 International Conference on Computer Communication and Informatics (ICCCI-2014) Jan. 3-6, 2014, Coimbatore, India, 5 pages.
Non-Final Office Action for U.S. Appl. No. 16/380,531 dated Oct. 21, 2020, 10 pages.
U.S. Appl. No. 16/380,531 Application and Drawings as filed on Apr. 10, 2019, 46 pages.
Prosecution History for U.S. Appl. No. 16/380,691 including: Notice of Allowance dated Mar. 10, 2021 and Application and Drawings filed Apr. 10, 2019, 46 pages.
U.S. Appl. No. 16/831,216 Application and Drawings filed Mar. 26, 2020, 56 pages.
Notice of Allowance for U.S. Appl. No. 16/380,531 dated Apr. 5, 2021, 5 pages.
U.S. Appl. No. 17/067,383 Final Office Action dated Feb. 21, 2023, 40 pages.
Extended European Search Report and Written Opinion issued in European Patent Application No. 20208171.7, dated May 11, 2021, in 05 pages.
Cordoba, M.A., Bruno, C.I. Costa, J.L. Peralta, N.R. and Balzarini, M.G., 2016, Protocol for multivariate homegeneous zone delineation in precision agriculture, biosystems engineering, 143, pp. 95-107.
Pioneer Estimator, "Corn Yield Estimator" accessed on Feb. 13, 2018, 1 page. retrieved from: https://www.pioneer.com/home/site/us/tools-apps/growing-tools/corn-yield-estimator/.
Guindin, N. "Estimating Maize Grain Yield From Crop Biophysical Parameters Using Remote Sensing", Nov. 4, 2013, 19 pages.
EP Application No. 19203883.4-1004 Office Action dated May 3, 2021, 4 pages.
Iowa State University Extension and Outreach, "Harvest Weed Seed Control", Dec. 13, 2018, 6 pages. https://crops.extension.iastate.edu/blog/bob-hartzler/harvest-weed-seed-control.
Getting Rid of WeedsThrough Integrated Weed Management, accessed on Jun. 25, 2021, 10 pages. https://integratedweedmanagement.org/index.php/iwm-toolbox/the-harrington-seed-destructor.
The Importance of Reducing Weed Seeds, Jul. 2018, 2 pages. https://www.aphis.usda.gov/plant_health/soybeans/soybean-handouts.pdf.
Alternative Crop Guide, Published by the Jefferson Institute, "Buckwheat", Revised Jul. 2002. 4 pages.
Lamsal et al. "Sugarcane Harvest Logistics in Brazil" Iowa Research Online, Sep. 11, 2013, 27 pages.
Jensen, "Algorithms for Operational Planning of Agricultural Field Operations", Mechanical Engineering Technical Report ME-TR-3, Nov. 9, 2012, 23 pages.
Chauhan, "Remote Sensing of Crop Lodging", Nov. 16, 2020, 16 pages.
U.S. Appl. No. 17/066,444 Office Action dated Nov. 27, 2023, 34 pages.
U.S. Appl. No. 17/067,383 Office Action dated Nov. 27, 2023, 36 pages.
U.S. Appl. No. 16/783,475 Final Office Action dated Nov. 16, 2023, 20 pages.
Gayle, J. Somerville,et al. "Modelling Annual Grass Weed Seed Dispersal in Winter Wheat, When Influenced by Hedges and Directional Wind, Ecological Modeling", vol. 410, Aug. 7, 2019, pp. 1-12.
Thompson SE, et al. Seconary Dispersal Driven by Overland Flow in Drylands: Review and Mechanistic Model Development. Mov Ecol. Apr. 17, 2014, pp. 1-13.
Gayle J. Somerville, et al. How Do Spatial Heterogeneity and Dispersal in Weed Population Models Affect Predictions of Herbicide Resistance Eveolution?, Ecological Modelling, 2017, pp. 37-53.

\* cited by examiner

US 12,329,148 B2

PREDICTIVE WEED MAP AND MATERIAL APPLICATION MACHINE CONTROL

CROSS-REFERENCE TO RELATED APPLICATIONS

The present application is a continuation-in-part of and claims priority of U.S. patent application Ser. No. 17/067,383, filed Oct. 9, 2020, which is a continuation-in-part of and claims priority of U.S. patent application Ser. No. 16/783,475, filed Feb. 6, 2020, and Ser. No. 16/783,511, filed Feb. 6, 2020, the present application is a continuation-in-part of and claims priority of U.S. patent application Ser. No. 17/066,444, filed Oct. 8, 2020, which is a continuation-in part of and claims priority of U.S. patent application Ser. No. 16/783,475, filed Feb. 6, 2020, and Ser. No. 16/783,511, filed Feb. 6, 2020. The contents of all of the above applications are hereby incorporated by reference in their entirety.

FIELD OF THE DESCRIPTION

The present description relates to agriculture. More specifically, the present description relates to agricultural machines and operations which deliver material to a worksite.

BACKGROUND

There are a wide variety of different types of agricultural machines. Some agricultural machines apply material, such as fluid or solid material, to a field. For instance, some machines, such as sprayers or dry spreaders, can deliver fluid or solid material, such as fertilizer, herbicide, pesticide, as well as variety of other materials to a field. Some machines, such as agricultural planting machines, can deliver material such as seeds, as well as other material, such as liquid or solid material, for instance, fertilizer.

The discussion above is merely provided for general background information and is not intended to be used as an aid in determining the scope of the claimed subject matter.

SUMMARY

A predictive map is obtained by an agricultural material application system. The predictive map maps predictive weed values at different geographic locations in a field. A geographic position sensor detects a geographic locations of an agricultural material application machine at the field. A control system generates a control signal to control the agricultural material application machine based on the geographic locations of the agricultural material application machine and the predictive map.

Example 1 is an agricultural material application system comprising:
 a geographic position sensor that detects a geographic location of a mobile material application machine at a field;
 a control system that:
 receives a predictive map that maps predictive weed values to different geographic locations in the field; and
 generates a control signal to control a controllable subsystem of the mobile material application machine based on the geographic location of the mobile material application machine and the predictive map.

Example 2 is the agricultural material application system of any or all previous examples and further comprising:
 an in-situ sensor that detects a weed value corresponding to a geographic location;
 a predictive model generator that:
 receives an information map that maps values of a characteristic corresponding to different geographic locations in the field; and
 generates a predictive model indicative of a relationship between values of the characteristic and weed values based on the weed value detected by the in-situ sensor corresponding to the geographic location and a value of the characteristic in the information map corresponding to the geographic location; and
 a predictive map generator that generates, as the predictive map, a functional predictive map of the field that maps predictive weed values to the different geographic locations in the field based on the values of the characteristic in the information map and based on the predictive model.

Example 3 is the agricultural material application system of any or all previous examples wherein the weed value is indicative of one or more of weed presence, weed type, weed size, and weed intensity.

Example 4 is the agricultural material application system of any or all previous examples, wherein the information map comprises a vegetative index map that maps vegetative index values to the different geographic locations in the field;
 wherein the predictive model generator generates, as the predictive model, a predictive weed model that models a relationship between vegetative index values and weed values based on the weed value detected by the in-situ sensor corresponding to the geographic location and a vegetative index value in the vegetative index map at the geographic location to which the detected weed values corresponds, the predictive weed model being configured to receive a vegetative index value as a model input and generate a predictive weed value as a model output; and
 wherein the predictive map generator generates, as the functional predictive map, a functional predictive weed map that maps predictive weed values to the different geographic locations in the field based on the vegetative index values in the information map and based on the predictive weed model.

Example 5 is the agricultural material application system of any or all previous examples, wherein the information map comprises an optical map that maps optical characteristic values to the different geographic locations in the field;
 wherein the predictive model generator generates, as the predictive model, a predictive weed model that models a relationship between optical characteristic values and weed values based on the weed value detected by the in-situ sensor corresponding to the geographic location and an optical characteristic value in the optical map at the geographic location to which the detected weed values corresponds, the predictive weed model being configured to receive an optical characteristic value as a model input and generate a predictive weed value as a model output; and
 wherein the predictive map generator generates, as the functional predictive map, a functional predictive weed map that maps predictive weed values to the different geographic locations in the field based on the optical characteristic values in the information map and based on the predictive weed model.

Example 6 is the agricultural material application system of any or all previous examples, wherein the information map comprises a weed map that maps weed values to the different geographic locations in the field;
  wherein the predictive model generator generates, as the predictive model, a predictive weed model that models a relationship between weed values and weed values based on the weed value detected by the in-situ sensor corresponding to the geographic location and a weed value in the weed map at the geographic location to which the detected weed values corresponds, the predictive weed model being configured to receive a weed value as a model input and generate a predictive weed value as a model output; and
  wherein the predictive map generator generates, as the functional predictive map, a functional predictive weed map that maps predictive weed values to the different geographic locations in the field based on the weed values in the information map and based on the predictive weed model.

Example 7 is the agricultural material application system of any or all previous examples, wherein the information map comprises two or more information maps, each of the two or more information maps mapping values of a respective characteristic to the different geographic locations in the field;
  wherein the predictive model generator generates, as the predictive model, a predictive weed model indicative of a relationship between values of the two or more respective characteristics and weed values based on the weed value detected by the in-situ sensor corresponding to the geographic location and values of the two or more respective characteristics in the two or more information maps corresponding to the geographic location, the predictive weed model being configured to receives a value of each of the two or more respective characteristics as model inputs and generate a predictive weed value as a model output; and
  wherein the predictive map generator generates, as the functional predictive map, a functional predictive weed map that maps predictive weed values to the different geographic locations in the field based on the values of the two more respective characteristics in the two or more information maps and the predictive weed model.

Example 8 is the agricultural material application system of any or all previous examples, wherein the controllable subsystem comprises a material application actuator and wherein the control signal controls the material application actuator to increase an amount of material applied by the material application machine based on the functional predictive weed map.

Example 9 is the agricultural material application system of any or all previous examples, wherein the controllable subsystem comprises a material application actuator and wherein the control signal controls the material application actuator to decrease an amount of material applied by the material application machine based on the functional predictive weed map.

Example 10 is the agricultural material application system of any or all previous examples, wherein the controllable subsystem comprises a material application actuator and wherein the control signal controls the material application actuator to deactivate or activate a component of the material application machine based on the functional predictive weed map.

Example 11 is a method of controlling a mobile agricultural material application machine comprising:

receiving a predictive map of a field that maps predictive weed values corresponding to different geographic locations in the field;
  detecting a geographic location of the mobile agricultural material application machine at the field;
  controlling a controllable subsystem of the mobile agricultural material application machine based on the geographic location of the mobile agricultural material application machine and the predictive map.

Example 12 is the method of any or all previous examples and further comprising:
  receiving an information map that maps values of a characteristic to different geographic locations in a field;
  obtaining in-situ sensor data indicative of a weed value corresponding to a geographic location at the field;
  generating a predictive weed model indicative of a relationship between values of the characteristic and weed values; and
  generating, as the predictive map, a functional predictive weed map of the field, that maps predictive weed values to the different geographic locations in the field based on the values of the characteristic in the information map and the predictive model.

Example 13 is the method of any or all previous examples, wherein controlling a controllable subsystem comprises controlling a material application actuator of the mobile agricultural material application machine based on the geographic location of the mobile agricultural material application machine and the functional predictive weed map.

Example 14 is the method of any or all previous examples, wherein controlling the material application actuator comprises controlling the material application actuator of the mobile agricultural material application machine to adjust a rate at which material is applied to the field based on the geographic location of the mobile agricultural material application machine and the functional predictive weed map.

Example 15 is the method of any or all previous examples, wherein controlling the material application actuator comprises controlling the material application actuator of the mobile agricultural material application machine to activate or deactivate a component of the mobile agricultural material application machine based on the geographic location of the mobile agricultural material application machine and the functional predictive weed map.

Example 16 is a mobile agricultural material application machine, comprising:
  a geographic position sensor that detects a geographic location of the mobile agricultural material application machine at a field; and
  a control system that:
  receives a predictive map that maps predictive weed values to different geographic locations in the field; and
  generates a control signal based on the geographic location of the mobile agricultural material application machine at the field and the predictive map.

Example 17 is the mobile agricultural material application machine of any or all previous examples and further comprising:
  a communication system that receives an information map that maps values of a characteristic to different geographic locations in the field;
  an in-situ sensor that detects a weed value corresponding to the geographic location;

a predictive model generator that generates a predictive weed model indicative of a relationship between values of the characteristic and weed values based on the weed value detected by the in-situ sensor corresponding to the geographic location and a value of the characteristic in the information map at the geographic location; and a predictive map generator that generates, as the predictive map, a functional predictive weed map of the field that maps predictive weed values to the different geographic locations in the field based on the values of the characteristic in the information map at those different geographic locations and based on the predictive weed model.

Example 18 is the mobile agricultural machine of any or all previous examples, wherein the control system generates the control signal to control a controllable subsystem of the mobile agricultural material application machine.

Example 19 is the mobile agricultural material application machine of any or all previous examples, wherein the control system generates the control signal to control an actuator that is controllably actuatable to adjust a rate at which material is applied to the field.

Example 20 is the mobile agricultural material application machine of any or all previous examples, wherein the control system generates the control signal to control an actuator to activate or deactivate a component of the mobile agricultural material application machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
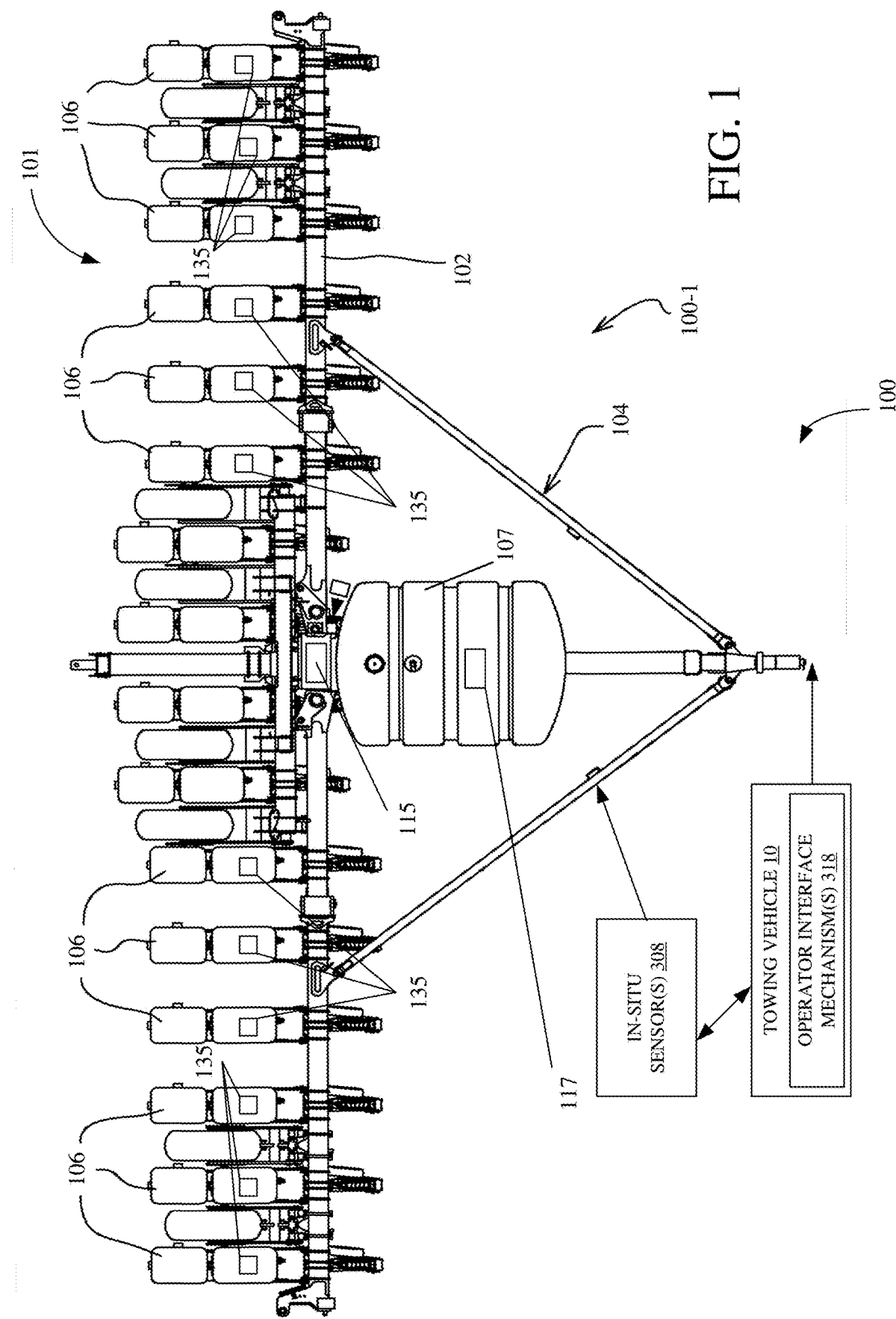
FIG. 1 is a partial pictorial, partial block diagram showing one example of a mobile agricultural material application machine as a mobile agricultural planting machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In some examples, the present description relates to using in-situ data taken concurrently with an operation, such as an agricultural material application operation, in combination with prior or predicted data, such as prior or predicted data represented in a map, to generate a predictive model and a predictive map. In some examples, the predictive map can be used to control a mobile machine, such as a mobile agricultural material application machine or a material delivery machine, or both.

During an agricultural material application operation material, such as seed, fertilizer, herbicide, pesticide, etc., is delivered to the field. The application of material can be controlled, such as by an operator or user, or by an automated control system, or both. It may be desirable to controllably (e.g., variably) apply material, based on the characteristics of the field. For example, it may be desirable to vary the amount of material applied at a given locations, based on the nutrient levels at those locations. For instance, some locations of the field may have adequate or near adequate nutrient levels, such that no fertilizer or relatively less fertilizer need be applied. In other examples, some locations of the field may have nutrient levels that require the application of more material than expected. In other examples, it may be desirable to vary the amount of material applied at given locations, based on the weed characteristics at those locations. For instance, herbicide may not be required at given location due to lack of weeds at those location, or additional herbicide may be needed where the weeds are particularly intense.

Applying material as needed based on the field conditions at the time of the operation, as opposed to a blanket application or a prescribed application determined ahead of the operation in the field, may save cost, may reduce environmental impact, as well as result in more effective material use, which may result in higher yields.

Some current systems may include sensors that detect characteristics indicative of nutrient levels of the field which can be used in the control of material application. However, such systems often include latency, such as due to the sensor feedback delay or due to the machine control delay, which may result in suboptimal material application.

The present description thus relates to a system that can predict characteristic values, such as nutrient values or weed values, or both, at different locations across the worksite, such that a mobile agricultural material application machine can be proactively controlled.

In some examples, it may be desirable to know when a material application machine will run out of material. As the operator or user or control system may vary the application throughout the operation it can be difficult to know, a priori, where the machine will run out of material.

Knowing when and where the machine will run out of material can be useful in planning logistics of the material application operation, such as scheduling or meeting a material delivery vehicle. Efficient scheduling can reduce downtime, as well as provide various other benefits.

The present description thus relates to a system that can predict material consumption values at different locations across the worksite, such that the material application operation can be proactively controlled.

In one example, the present description relates to obtaining an information map, such as a soil property map. A soil property map illustratively maps soil property values (which may be indicative of soil type, soil moisture, soil structure, soil salinity, soil pH, soil organic matter, soil contaminant concentration, soil nutrient levels, as well as various other soil properties) across different geographic locations in a field of interest. The soil property maps thus provide georeferenced soil properties across a field of interest. Soil type can refer to taxonomic units in soil science, wherein each soil type includes defined sets of shared properties. Soil types can include, for example, sandy soil, clay soil, silt soil, peat soil, chalk soil, loam soil, and various other soil types. Soil moisture can refer to the amount of water that is held or otherwise contained in the soil. Soil moisture can also be referred to as soil wetness. Soil structure can refer to the arrangement of solid parts of the soil and the pore space located between the solid parts of the soil. Soil structure can include the way in which individual particles, such as individual particles of sand, silt, and clay, are assembled. Soil structure can be described in terms of grade (degree of aggregation), class (average size of aggregates), and form (types of aggregates), as well as a variety of other descriptions. Soil salinity refers to the amount (e.g., concentration) of salt in the soil. Soil nutrient levels refers to the amounts (e.g., concentrations) of various nutrients of the soil, such as nitrogen. These are merely examples. Various other characteristics and properties of the soil can be mapped as soil property values on a soil property map. The soil property map can be derived in a variety of ways, such as from sensor readings during previous operations at the field of interest, from surveys of the field, such as soil sampling surveys, as well as surveys by aerial machines (e.g., satellites, drones, etc.) that includes sensors that capture sensor information of the field. The soil property map can be generated based on data from remote sources, such as third-party service providers or government agencies, for instance, the USDA Natural Resources Conservation Service (NRCS), the United States Geological Survey (USGS), as well as from various other remote sources. These are merely some examples. The soil property map can be generated in a variety of other ways.

In one example, the present description relates to obtaining an information map, such as a yield map. A yield map illustratively maps yield values across different geographic locations in a field of interest. The yield map may be based on sensor readings taken during an aerial survey of the field of interest or during a previous operation on the field of interest, or derived from other values, such as vegetative index values. In some examples, the yield map may be a historical yield map that includes historical yield values from a previous harvesting operation, such as the harvesting operation from a prior year or a prior season. These are merely some examples. The yield map can be generated in a variety of other ways.

In one example, the present description relates to obtaining an information map, such as a residue map. A residue map illustratively maps residue values (which may be indicative of residue amount and residue distribution) across different geographic locations in a field of interest. Residue illustratively refers to vegetation residue, such as remaining vegetation material at the field of interest, such as remaining crop material, as well as material of other plants, such as weeds. The residue map may be derived from sensor readings during a previous operation at the field. For example, the machine performing the previous operation may be outfitted with sensors that detect residue values at different geographic locations in the field. The residue map may be derived from sensor readings from sensors on aerial machine (e.g., satellites, drones, etc.) that survey the field of interest. The sensors may read one or more bands of electromagnetic radiation reflected from the residue material at the field. These are merely some examples. The residue map can be generated in a variety of other ways.

In one example, the present description relates to obtaining an information map, such as a constituents map. A constituents map illustratively maps constituent values (which may be indicative of constituent levels (e.g., concentrations) of constituents, such as, sugar, starch, fiber, water/moisture, etc., of crop plants) across different geographic locations in a field of interest. The constituent map may be derived from sensor readings during a previous operation at the field. The constituent map may be derived from sensor readings from sensors on aerial machine (e.g., satellites, drones, etc.) that survey the field of interest. The sensors may read one or more bands of electromagnetic radiation reflected from the residue material at the field. These are merely some examples. The constituent map can be generated in a variety of other ways.

In one example, the present description relates to obtaining an information map, such as a topographic map. A topographic map illustratively maps topographic characteristic values across different geographic locations in a field of interest, such as elevations of the ground across different geographic locations in a field of interest. Since ground slope is indicative of a change in elevation, having two or more elevation values allows for calculation of slope across the areas having known elevation values. Greater granularity of slope can be accomplished by having more areas with known elevation values. As an agricultural machine travels across the terrain in known directions, the pitch and roll of the agricultural machine can be determined based on the slope of the ground (i.e., areas of changing elevation). Topographic characteristics, when referred to below, can include, but are not limited to, the elevation, slope (e.g., including the machine orientation relative to the slope), and ground profile (e.g., roughness). The topographic map can be derived from sensor readings taken during a previous operation on the field of interest or from an aerial survey of the field (such as a plane, drone, or satellite equipped with lidar or other distance measuring devices). In some examples, the topographic map can be obtained from third parties. These are merely some examples. The topographic map can be generated in a variety of other ways.

In one example, the present description relates to obtaining an information map, such as a seeding map. A seeding map illustratively maps values of seeding characteristics (e.g., seed location, seed spacing, seed population, seed genotype, etc.) across different geographic locations in a field of interest. The seeding map may be derived from control signals used by a planting machine when planting seeds or from sensors on the planting machine that confirm that a seed was metered or planted. The seeding map can be generated based on a prescriptive seeding map that was used in the control of a planting operation. These are merely some examples. The seeding map can be generated in a variety of other ways.

In one example, the present description relates to obtaining an information map such as a vegetative index map. A vegetative index map illustratively maps georeferenced vegetative index values (which may be indicative of vegetative growth or plant health) across different geographic locations in a field of interest. One example of a vegetive index includes a normalized difference vegetation index (NDVI). There are many other vegetative indices that are within the scope of the present disclosure. In some examples, a vegetive index map be derived from sensor readings of one or more bands of electromagnetic radiation reflected by the plants. Without limitations, these bands may be in the microwave, infrared, visible or ultraviolet portions of the electromagnetic spectrum. A vegetative index map can be used to identify the presence and location of vegetation. In some examples, these maps enable vegetation to be identified and georeferenced in the presence of bare soil, crop residue, or other plants, including crop or other weeds. The sensor readings can be taken at various times, such as during satellite observation of the field of interest, a fly over operation (e.g., manned or unmanned aerial vehicles), sensor readings during a prior operation) at the field of interest, as well as during a human scouting operation. These are merely some examples. The vegetative index map can be generated in a variety of other ways.

In one example, the present description relates to obtaining a map, such as an optical map. An optical map illustratively maps electromagnetic radiation values (or optical characteristic values) across different geographic locations in a field of interest. Electromagnetic radiation values can be from across the electromagnetic spectrum. This disclosure uses electromagnetic radiation values from infrared, visible light and ultraviolet portions of the electromagnetic spectrum as examples only and other portions of the spectrum are also envisioned. An optical map may map datapoints by wavelength (e.g., a vegetative index). In other examples, an optical map identifies textures, patterns, color, shape, or other relations of data points. Textures, patterns, or other relations of data points can be indicative of presence or identification of vegetation on the field (e.g., crops, weeds, plant matter, such as residue, etc.). Additionally, or alternatively, an optical map may identify the presence of standing water or wet spots on the field. The optical map can be derived using satellite images, optical sensors on flying vehicles such as UAVS, or optical sensors on a ground-based system, such as another machine operating in the field prior to the current operation. In some examples, optical maps may map three-dimensional values as well such as vegetation height when a stereo camera or lidar system is used to generate the map. These are merely some examples. The optical map can be generated in a variety of other ways.

In one example, the present description relates to obtaining an information map, such as a weed map. A weed map illustratively maps weed values (which may be indicative of weed location, weed presence, weed type, and weed intensity (e.g., density)) across different geographic locations in a field of interest. The weed map may be derived from sensor readings during a previous operation at the field. The weed map may be derived from sensor readings from sensors on aerial machine (e.g., satellites, drones, etc.) that survey the field of interest. The sensors may read one or more bands of electromagnetic radiation reflected from the weed material at the field. The weed map may be derived from various other data, such as optical characteristic data or vegetative index data of the field of interest. These are merely some examples. The weed map can be generated in a variety of other ways.

In one example, the present description relates to obtaining an information map, such as a contamination map. A contamination map illustratively maps contamination values (which may be indicative of pest presence, pest type, pest intensity (e.g., population), disease presence, disease type, and disease intensity (e.g., prevalence)) across different geographic locations in a field of interest. The contamination map may be derived from sensor readings during a previous operation at the field. The contamination map may be derived from sensor readings from sensors on aerial machine (e.g., satellites, drones, etc.) that survey the field of interest. The sensors may read one or more bands of electromagnetic radiation reflected from the vegetation material (or from the contaminants) at the field. The contamination map may be derived from various other data, such as optical characteristic data or vegetative index data of the field of interest. These are merely some examples. The contamination map can be generated in a variety of other ways.

In other examples, one or more other types of information maps can be obtained. The various other types of information maps illustratively map values of various other characteristics across different geographic locations in a field of interest.

The present discussion proceeds, in some examples, with respect to systems that obtain one or more information maps of a worksite (e.g., field) and also use an in-situ sensor to detect a characteristic. The systems generate a model that models a relationship between the values on the one or more obtained maps and the output values from the in-situ sensor. The model is used to generate a predictive map that predicts, for example, values of the characteristic detected by the in-situ sensor to different geographic locations in the worksite. The predictive map, generated during an operation, can be presented to an operator or other user or can be used in automatically controlling a mobile machine, such as a mobile agricultural material application machine or a material delivery machine, or both, during a material application operation.

FIG. 1 shows one example of a mobile agricultural material application machine 100 as a mobile agricultural planting machine 100-1 that includes a towing vehicle 10 and a planting implement 101. FIG. 1 also illustrates that mobile agricultural planting machine 100-1 can include one or more in-situ sensors 308, some of which are shown in FIG. 1 as well as below. For example, FIG. 1 shows that planting machine 100-1 can include one or more fill level sensors 107 that detect a fill level of material in tanks 107. Fill level sensors can include float gauges, weight sensors that detect a weight of material in tanks 107, emitter sensors that detect a level to which the material is filled, as well as various other types of sensors. Various components of agricultural planting machine 100-1 can be on individual parts of planting implement 101, towing vehicle 10, or can be distributed in various ways across both the planting implement 101 and towing vehicle 10. FIG. 1, also illustrates that towing vehicle can include, among other things, operator interface mechanisms 318 which can be used by an operator to manipulate and control agricultural planting machine 100-1.

As shown, planting implement 101 is a row crop planter. In other examples, other types of planting machines can be used, such as air seeders. Planting implement 101 illustratively includes a toolbar 102 that is part of a frame 104. FIG. 1 also shows that a plurality of planting row units 106 are mounted to the toolbar 102. Planting implement 101 can be towed behind towing vehicle 10, such as a tractor. FIG. 1 shows that material, such as seed, fertilizer, etc. can be stored in a tank 107 and pumped, using one or more pumps 115, through supply lines to the row units 106. The seed, fertilizer, etc., can also be stored on the row units 106 themselves. As shown in the illustrated example of FIG. 1, each row unit can include a respective controller(s) 135 which can be used to control operating parameters of each row unit 106. In other examples, centralized controllers can control the row units 106.

Figure 2:
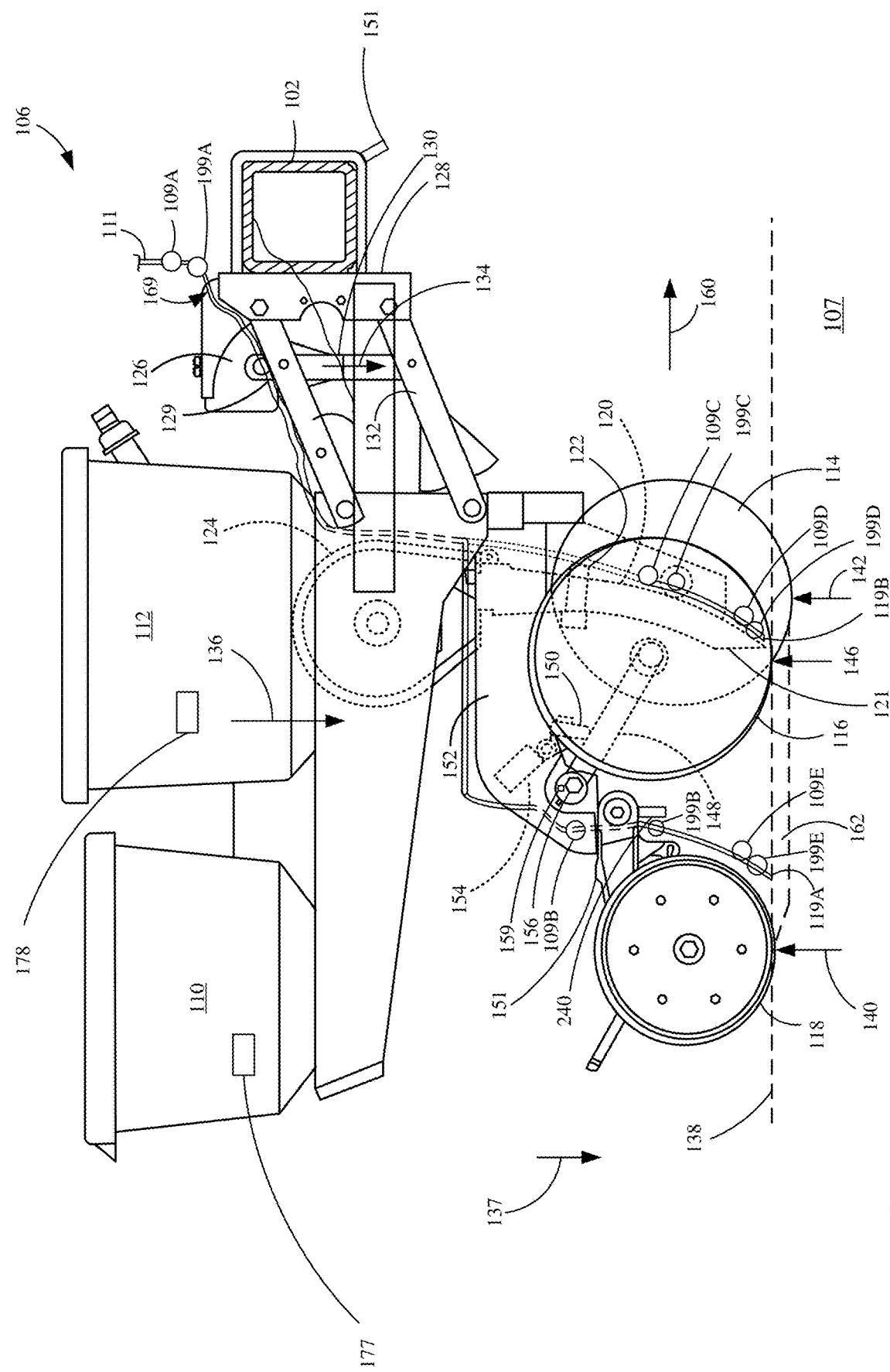
FIG. 2 is a side view showing one example of a row unit of the mobile agricultural planting machine shown in FIG. 1

FIG. 2 is a side view showing one example of a row unit 106. In the example shown in FIG. 2, row unit 106 illustratively includes a chemical tank 110 and a seed storage tank 112. It also illustratively includes a furrow opener 114 (e.g., opening disks) that opens a furrow in field 107, a set of gauge wheels 116, and a furrow closer 118 (e.g., closing wheels) that close furrow 162. Seeds from tank 112 are fed by gravity into a seed meter 124. The seed meter 124 controls the rate which seeds are dropped into a seed tube 120 or other seed delivery system, such as a brush belt or flighted brush belt (both shown below) from seed storage tank 112. The seeds can be sensed by a seed sensor 122. An actuator, such as motor, can be used to control the speed of seed meter 124 to control the rate at which seeds are delivered to the furrow 162.

Some parts of the row unit 106 will now be discussed in more detail. First, it will be noted that there are different types of seed meters 124, and the one that is shown is shown for the sake of example only and is described in greater detail below. For instance, in one example, each row unit 106 need not have its own seed meter. Instead, metering or other singulation or seed dividing techniques can be performed at a central location, for groups of row units 106. The metering systems can include rotatable disks, rotatable concave or bowl-shaped devices, among others. The seed delivery system can be a gravity drop system (such as seed tube 120 shown in FIG. 2) in which seeds are dropped through the seed tube 120 and fall (via gravitational force) through the seed tube and out the outlet end 121 into the furrow (or seed trench) 162. Other types of seed delivery systems are assistive systems, in that they do not simply rely on gravity to move the seed from the metering system into the ground. Instead, such systems actively capture the seeds from the seed meter and physically move the seeds from the meter to a lower opening where the exit into the ground or trench. Some examples of these assistive systems are described in greater detail below.

FIG. 2 also shows an actuator 109 in a plurality of possible locations (109A, 109B, 109C, 109D, and 109E). Actuator 109 (e.g., pump) pumps material (such as fertilizer) from tank 107 through supply line 111 so the material can be dispensed in or near the furrows. In such an example, a controller can generate a control signal to control the actuation of pump 109. In other examples, actuators 109 are controllable valves and one or more pumps 115 pump the material from tank(s) 107 to actuators 109 through supply line 111. In other examples, actuators control the delivery of material from other tanks, such as tank 110. In such an example, a controller controls the actuator by generating valve or actuator control signals. The control signal for each valve or actuator 109 can, in one example, be a pulse width modulated control signal. The flow rate through the corresponding actuator 109 can be based on the duty cycle of the control signal (which controls the amount of time the valve is open and closed). It can be based on multiple duty cycles of multiple valves or based on other criteria. Further, the material can be applied in varying rates on a per-seed or per-plant basis. For example, material may be applied at one rate when it is being applied at a location spaced from a seed location and at a second, higher, rate when it is being applied closer to the seed location. In other examples, the material may be applied based on various characteristics of the field, such as the nutrient levels, weed characteristics, as well as various other characteristics. These are examples only.

Additionally, FIG. 2 shows a flow rate sensor 199 in a plurality of possible locations (199A, 199B, 199C, 199D, and 199E). Flow rate sensor 199 can detect a volumetric flow rate of material flowing through supply line 111.

Additionally, FIG. 2 shows that row unit 106 can include one or more fill level sensors, such as a fill level sensor 177 and a fill level sensor 178. Fill level sensor 177 illustratively detects a fill level of tank 110. Fill level sensor 178 illustratively detects a fill level of tank 112. Fill level sensors 177 and 178 can include float gauges, weight sensors that detect a weight of material in tanks 110 and 112, emitter sensors that detect a level to which the material is filled, as well as various other types of sensors.

In the example of shown in FIG. 2, material is passed, e.g., pumped or otherwise forced, through supply line 111 to an inlet end of actuator 109. Actuator 109 is controlled by a controller (e.g., 135) to allow the liquid to pass from the inlet end of actuator 109 to an outlet end. As material passes through actuator 109, it travels through an application assembly 169 from a proximal end (which is attached to an outlet end of actuator 109) to a distal tip (or application tip) 119, where the liquid is discharged into a trench, or proximate a trench or furrow 162 (e.g., on the surface of field 107 next to trench or furrow 162 but not in trench or furrow 162), opened by disc opener 114.

A downforce generator or actuator 126 is mounted on a coupling assembly 128 that couples row unit 106 to toolbar 102. Downforce actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on the row unit 106, and indicated by arrow 136) is offset by upwardly directed forces acting on closing wheels 118 (from ground 138 and indicated by arrow 140) and double disk opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as downforce margin. The force indicated by arrow 146 acts on the gauge wheels 116. This load can be sensed by a gauge wheel load sensor 159 which may located anywhere on row unit 106 where it can sense that load. It can also be placed where may not sense the load directly, but a characteristic indicative of that load. For example, it can be disposed near a set of gauge wheel control arms (or gauge wheel arm) 148 that movably mount gauge wheels to shank 152 and control an offset between gauge wheels 116 and the disks in double disk opener 114 to control planting depth. Percent ground contact is a measure of a percentage of time that the load (downforce margin) on the gauge wheels 116 is zero (indicating that the gauge wheels are out of contact with the ground). The percent ground contact is calculated on the basis of sensor data provided by the gauge wheel load sensor 159.

In addition, there may be other separate and controllable downforce actuators, such as one or more of a closing wheel downforce actuator 153 that controls the downforce exerted on closing wheels 118. Closing wheel downforce actuator 153 can be a hydraulic actuator, a pneumatic actuator, a spring-based mechanical actuator or a wide variety of other actuators. The downforce exerted by closing wheel downforce actuator 153 is represented by arrow 137. It will be understood that each row unit 106 can include the various components described with reference to FIGS. 2-6.

In the illustrated example, arms (or gauge wheel arms) 148 illustratively abut a mechanical stop (or arm contact member or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disk opener 114, changes, to change the depth at which seeds are planted.

In operation, row unit 106 travels generally in the direction indicated by arrow 160. The double disk opener 114 opens the furrow 162 in the soil 138, and the depth of the furrow 162 is set by planting depth actuator assembly 154, which, itself, controls the offset between the lowest parts of gauge wheels 116 and disk opener 114. Seeds are dropped through seed tube 120 into the furrow 162 and closing wheels 118 close the soil.

As the seeds are dropped through seed tube 120, they can be sensed by seed sensor 122. Some examples of seed sensor 122 are an optical sensor or a reflective sensor, and can include a radiation transmitter and a receiver. The transmitter emits electromagnetic radiation and the receiver the detects the radiation and generates a signal indicative of the presences or absences of a seed adjacent to the sensor. These are just some examples of seed sensors. Row unit controller 335 may control the actuators 109 and/or pumps 115 based on the seed sensor signal to controllably apply material relative to the seed locations in the furrow 162.

Also, as shown in FIG. 2, row unit 106 can include, as in-situ sensors 308, one or more observation sensor systems 151. Observation sensor systems 151 may include one or more sensors that detect one or more characteristics such as soil nutrient levels, weed characteristics, as well as various other characteristics. In one example, an observation sensor system 151, such as the observation sensor system 151 disposed between opener 114 and closer 118 can detect characteristic of the furrow as well as of the field proximate the furrow. Observation sensor systems 151 may include one or more of an imaging system (e.g., stereo or mono camera), optical sensors, radar, lidar, ultrasonic sensors, infrared or thermal sensors, as well as a variety of other sensors. In some examples, an observation sensor system 151 may detects seeds in furrow 162. Planting implement 101 can also include an observation sensor system 151 disposed to observe in front of opener 114, such as the observation sensor system 151 shown mounted to toolbar 102. In other examples, observation sensor systems 151 can be mounted to various other locations of agricultural planting machine 100-1, such as various other locations on planting implement 101 or towing vehicle 10, or both.

Figure 3:
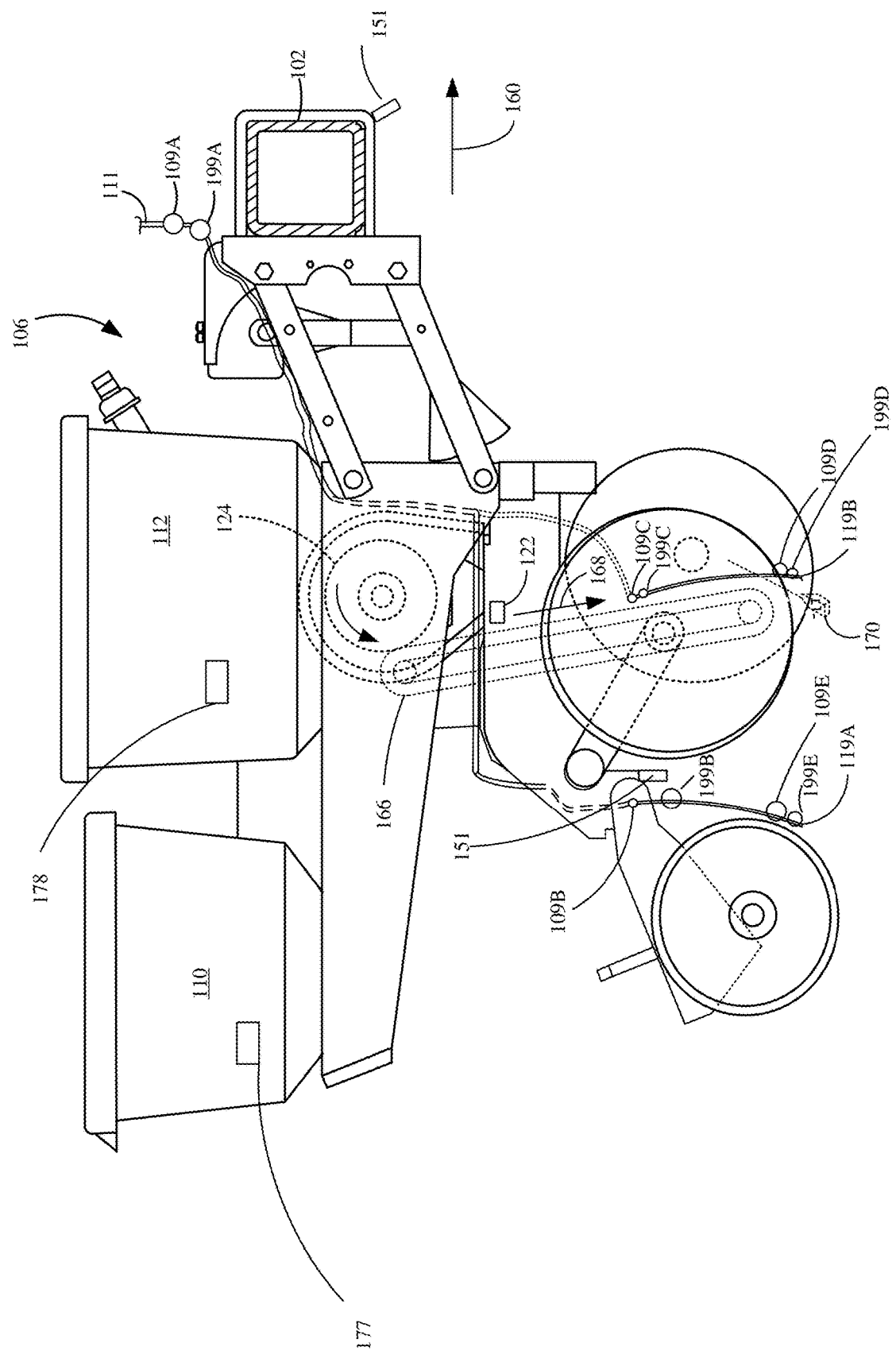
FIG. 3 is a side view showing another example of a row unit of the mobile agricultural planting machine shown in FIG. 1.
Figure 4:
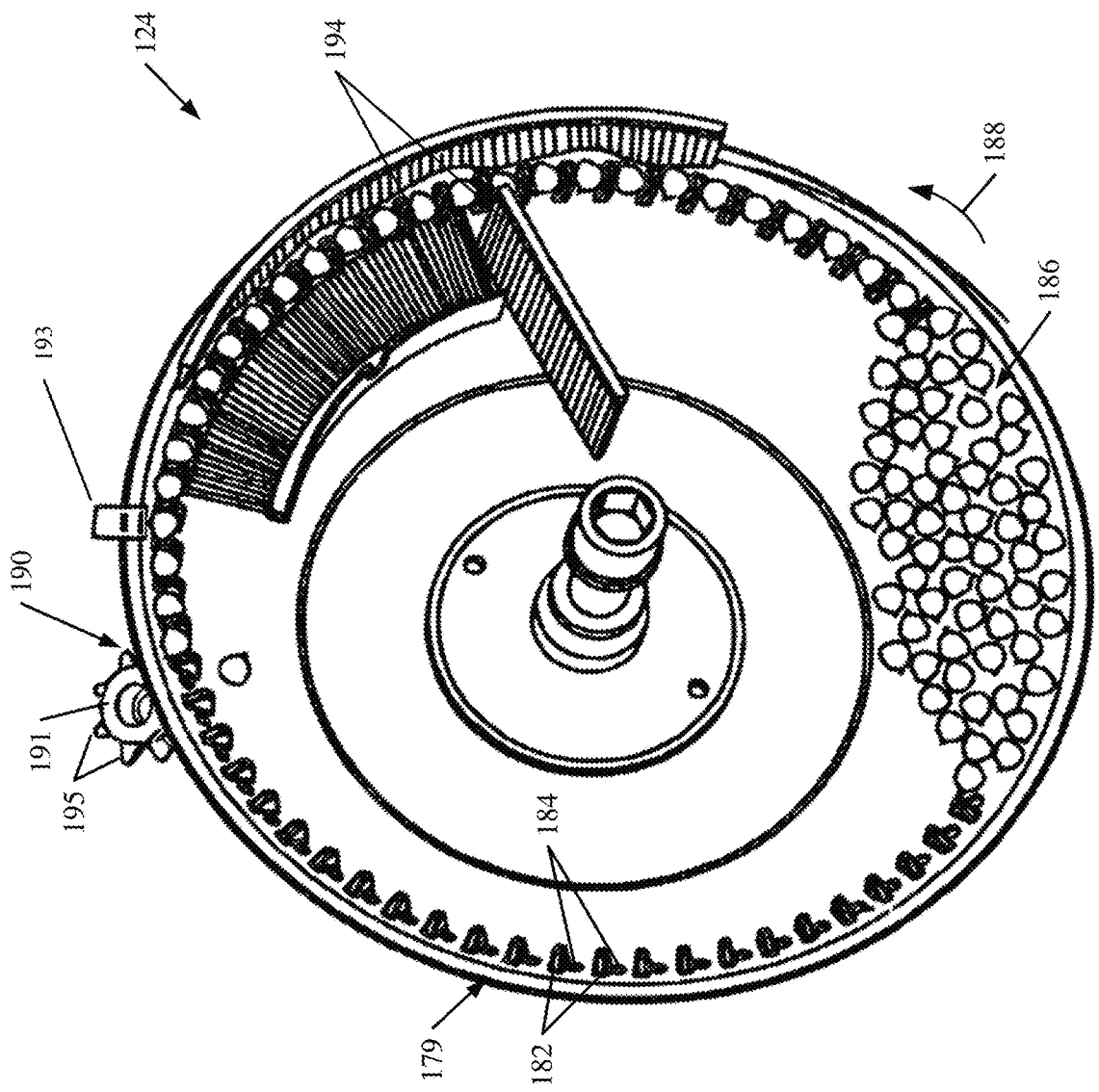
FIG. 4 shows an example of a seed metering system.

FIG. 3 is similar to FIG. 2, and similar items are similarly numbered. However, instead of the seed delivery system being a seed tube 120 which relies on gravity to move the seed to the furrow 162, the seed delivery system shown in FIG. 4 is an assistive seed delivery system 166. Assistive seed delivery system 166 also illustratively has a seed sensor 122 disposed therein. Assistive seed delivery system 166 captures the seeds as they leave seed meter 124 and moves them in a direction indicated by arrow 168 toward furrow 162. System 166 has an outlet end 170 where the seeds exit system 166 into furrow 162 where they again reach their final seed position. System 166 may driven at variable speeds by an actuator, such as a variable motor, which can be controlled by a controller (e.g., 135). The controller may control the speed of system 166 based on various characteristics, such as nutrient levels, weed characteristics, etc. The controller may control the actuator 109 to dispense material based on the seed sensor signal from seed sensor 122 as well as the speed at which system 166 is driven. The controller may control the actuator 109 based on various other characteristics, such as nutrient levels, weed characteristics, etc.

FIG. 3 also shows that row unit 106 can include a sensor 170 that interacts with the soil to detect various characteristics, such as nutrient levels of the soil. For instance, sensor 172 can be in the form of a probe that detects nutrient levels of the soil (such as the amount, or concentration, of various nutrients such as nitrogen, phosphorus, potassium, organic matter, etc.). In another example, sensor 172 can be in the form of an electromagnetic sensor that detects the capability of the soil to conduct or accumulate electrical charge, such as a capacitive sensor.

FIG. 4 shows one example of a rotatable mechanism that can be used as part of the seed metering system (or seed meter) 124. The rotatable mechanism includes a rotatable disc, or concave element, 179. Concave element 179 has a cover (not shown) and is rotatably mounted relative to the frame of row unit 106. Rotatable concave element 179 is driven by an actuator, such as a motor (not shown in FIG. 4), and has a plurality of projections or tabs 182 that are closely proximate corresponding apertures 184. A seed pool 186 is disposed generally in a lower portions of an enclosure formed by rotating concave element 179 and its corresponding cover. Rotatable concave element 179 is rotatably driven by its motor (such as an electric motor, a pneumatic motor, a hydraulic motor, etc.) for rotation generally in the direction indicated by arrow 188, about a hub. A pressure differential is introduced into the interior of the metering mechanism so that the pressure differential influences seeds from seed pool 186 to be drawn to apertures 184. For instance, a vacuum can be applied to draw the seeds from seed pool 186 so that they come to rest in apertures 184, where the vacuum holds them in place. Alternatively, a positive pressure can be introduced into the interior of the metering mechanism to create a pressure differential across apertures 184 to perform the same function.

Once a seed comes to rest in (or proximate) an aperture 184, the vacuum or positive pressure differential acts to hold the seed within the aperture 184 such that the seed is carried upwardly generally in the direction indicated by arrow 188, from seed pool 186, to a seed discharge area 190. It may happen that multiple seeds are residing in an individual seed cell. In that case, a set of brushes or other members 194 that are located closely adjacent the rotating seed cells tend to remove the multiple seeds so that only a single seed is carried by each individual cell. Additionally, a seed sensor 193 can also illustratively be mounted adjacent to rotating element 181. Seed sensor 193 detects and generates a signal indicative of seed presence.

Once the seeds reach the seed discharge area 190, the vacuum or other pressure differential is illustratively removed, and a positive seed removal wheel or knock-out wheel 191, can act to remove the seed from the seed cell. Wheel 191 illustratively has a set of projections 195 that protrude at least partially into apertures 184 to actively dislodge the seed from those apertures. When the seed is dislodged (such as seed 171), it is illustratively moved by the seed tube 120, seed delivery system 166 (some examples of which are shown above and below) to the furrow 162 in the ground.

Figure 5:
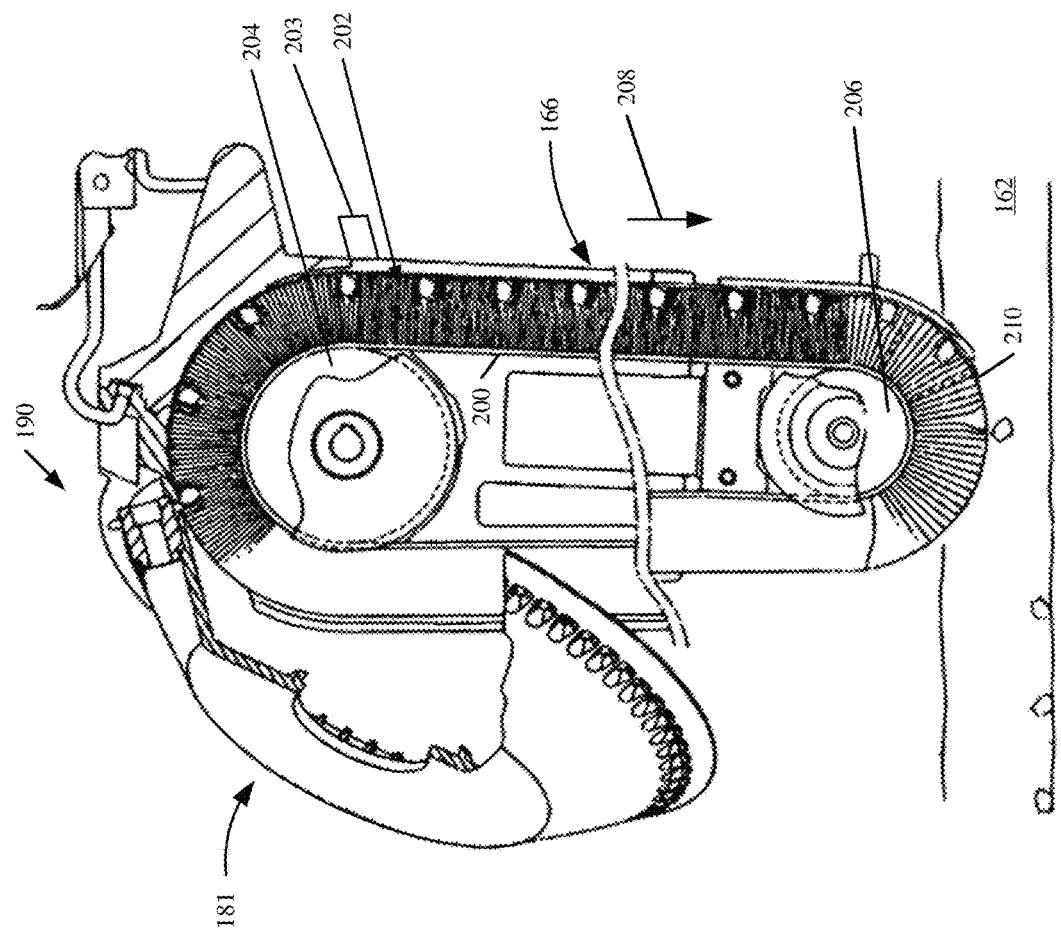
FIG. 5 shows an example of a seed delivery system that can be used with a seed metering system.

FIG. 5 shows an example where the rotating element 181 is positioned so that its seed discharge area 190 is above, and closely proximate, assistive seed delivery system 166. In the example shown in FIG. 5, assistive seed delivery system 166 includes a transport mechanism such as a belt 200 with a brush that is formed of distally extending bristles 202 attached to belt 200 that act as a receiver for the seeds. Belt 200 is mounted about pulleys 204 and 206. One of pulleys 204 and 206 is illustratively a drive pulley while the other is illustratively an idler pulley. The drive pulley is illustratively rotatably driven by an actuator, such a conveyance motor (not shown in FIG. 5), which can be an electric motor, a pneumatic motor, a hydraulic motor, etc. Belt 200 is driven generally in the direction indicated by arrow 208

Therefore, when seeds are moved by rotating element 181 to the seed discharge area 190, where they are discharged from the seed cells in rotating element 181, they are illustratively positioned within the bristles 202 by the projections 182 that push the seed into the bristles. Assistive seed delivery system 166 illustratively includes walls that form an enclosure around the bristles, so that, as the bristles move in the direction indicated by arrow 208, the seeds are carried along with them from the seed discharge area 190 of the metering mechanism, to a discharge area 210 either at ground level, or below ground level within a trench or furrow 162 that is generated by the furrow opener 114 on the row unit 106.

Additionally, a seed sensor 203 is also illustratively coupled to assistive seed delivery system 166. As the seeds are moved in bristles 202 past sensor 203, sensor 203 can detect the presence or absence of a seed. Some examples of seed sensor 203 includes an optical sensor or reflective sensor.

Figure 6:
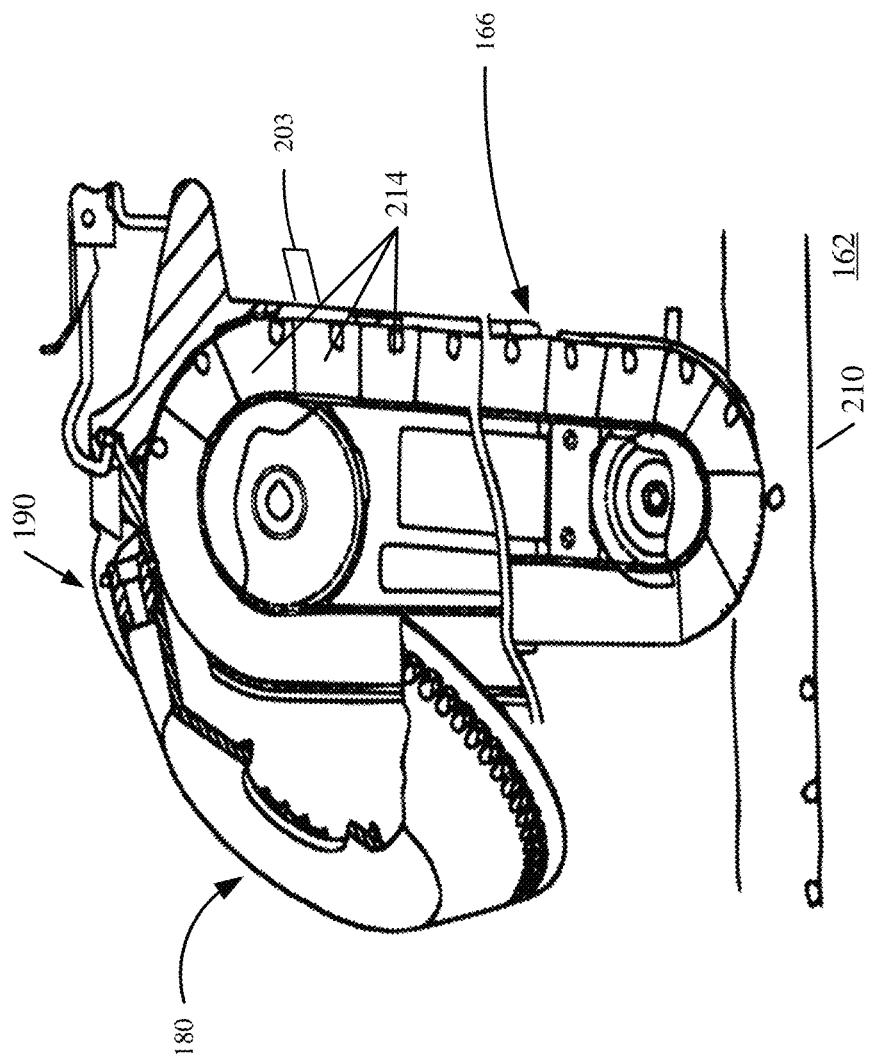
FIG. 6 shows another example of a seed delivery system that can be used with a seed metering system.

FIG. 6 is similar to FIG. 5, except that seed delivery system 166 is not formed by a belt with distally extending bristles. Instead, it is formed by a flighted belt (transport mechanism) in which a set of paddles 214 form individual chambers (or receivers), into which the seeds are dropped, from the seed discharge area 190 of the metering mechanism. The flighted belt moves the seeds from the seed discharge area 190 to the exit end 210 of the flighted belt, within the trench or furrow 162.

There are a wide variety of other types of seed delivery systems as well, that include a transport mechanism and a receiver that receives a seed. For instance, they include dual belt delivery systems in which opposing belts receive, hold and move seeds to the furrow, a rotatable wheel that has sprockets which catch seeds from the metering system and move them to the furrow, multiple transport wheels that operate to transport the seed to the furrow, an auger, among others.

Figure 7:
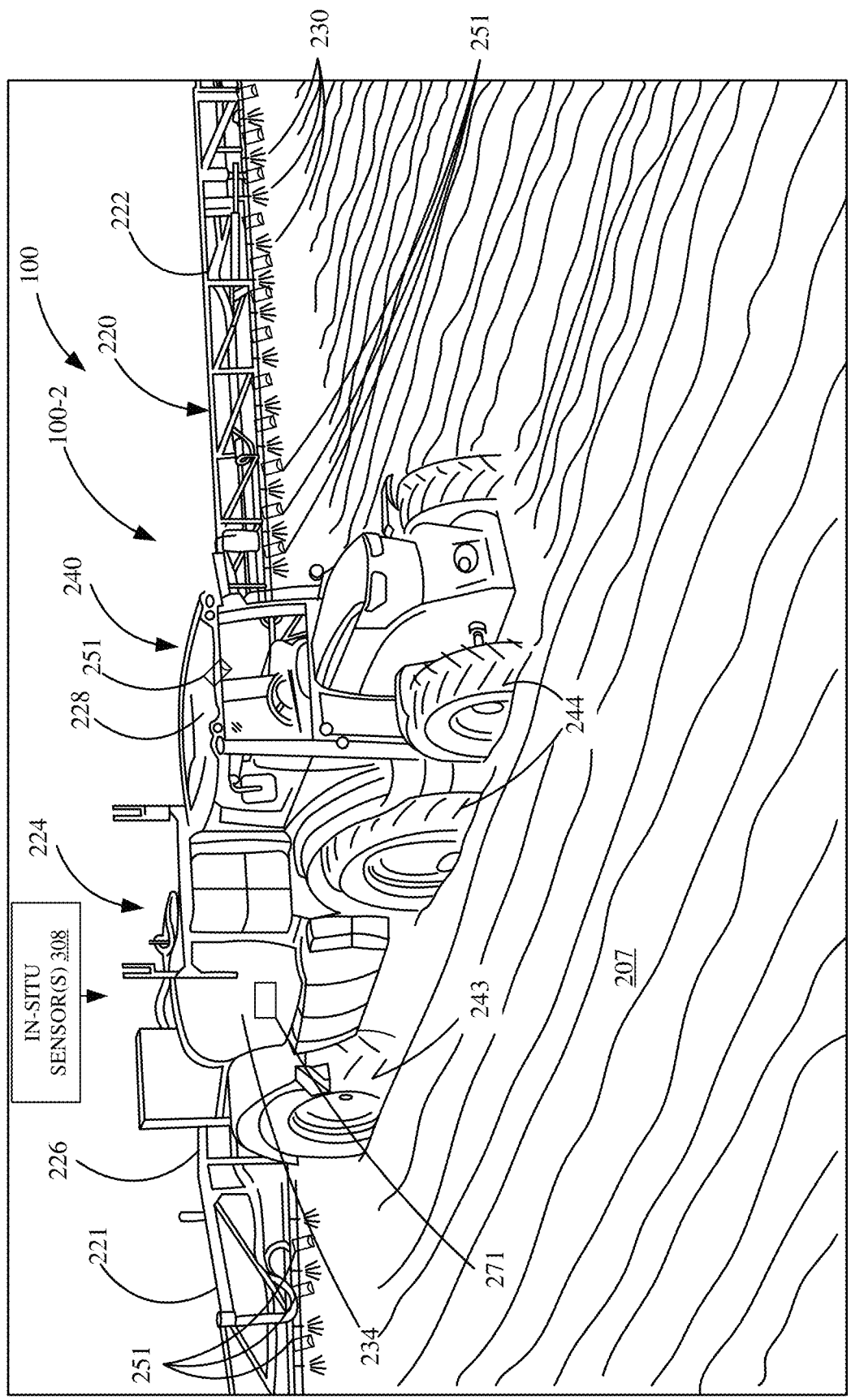
FIG. 7 is a partial pictorial, partial block diagram showing one example of a mobile agricultural material application machine as a mobile agricultural sprayer.

FIG. 7 shows one example of a mobile agricultural material application machine 100 as a mobile agricultural sprayer 100-2 that includes a towing vehicle 240 and a towed spraying implement 224. Though, in other examples, such as the example shown in FIG. 8, sprayer 100-2 can be self-propelled. Additionally, other types of material application machines are contemplated, such as dry material spreaders. FIG. 7 also shows that mobile agricultural sprayer 100-2 can include one or more in-situ sensors 308, some of which are shown in FIG. 7 as well as below. For example, FIG. 7 shows that sprayer 100-2 can include one or more fill level sensors 271 that detect a fill level of material in tanks 234. Fill level sensors can include float gauges, weight sensors that detect a weight of material in tanks 234, emitter sensors that detect a level to which the material is filled, as well as various other types of sensors.

Sprayer 100-2 includes a spraying system having one or more tanks 234 containing one or more materials, such as a liquid materials (e.g., fertilizer, herbicide, pesticide, etc.), that is to be applied to field 207. Tanks 234 are fluidically coupled to spray nozzles 230 by a delivery system comprising a set of conduits. One or more pumps are configured to pump the product from the tanks 234 through the conduits and through nozzles 230 to apply the product to the field 207. In some examples, the fluid pumps are actuated by operation of one or more motors, such as electric motors, pneumatic motors, or hydraulic motors, that drive the pumps.

Spray nozzles 230 are coupled to, and spaced apart along, boom 220. Boom 220 includes arms 221 and 222 which can articulate or pivot relative to a center frame 226. Thus, arms 221 and 222 are movable between a storage or transport position and an extended or deployed position (shown in FIG. 7). The boom 220, including each arm 221 and 222, can include multiple discrete and controllable sections which are supplied product from tanks 234 by the fluid pumps through a respective conduit of each section.

Each section can include a respective set of one or more spray nozzles 230. Each section can be activated or deactivated through the actuation of a corresponding controllable actuator, such as a valve, for instance, a section can be deactivated, that is the section or the nozzles of the section, or both, are prevented from receiving fluid, by actuation of a controllable actuator that is upstream of the section or the nozzles, or both. In some examples, the nozzles of the section may each have an associated controllable actuator which can be actuated to activate or deactivate the nozzles. The application rate of product is the rate (volumetric rate) at which product is applied to the field over which sprayer 100-2 travels. The application rate corresponds to a volumetric flow rate of the product from the tanks 234 through the spray nozzles 230. The volumetric flow rate is controlled by operation of actuators (such as fluid pumps or valves), such as by varying the speed of actuation of the pump with an associated motor or by controllably opening and closing a vale. In some examples, a controllable valve that corresponds to each section or to each nozzle, can be operable to reciprocate (e.g., pulse) between a closed state and an open state at variable frequency (e.g., pulse width modulation control) to control the rate at which the product is discharged from the set of spray nozzles 230 of the respective section or from the respective individual spray nozzle 230.

In the example illustrated in FIG. 7, agricultural sprayer 100-2 comprises a towed implement 224 that carries the spraying system, and a towing or support machine 240 (illustratively a tractor, which may be similar to towing vehicle 10) that tows the towed spraying implement 224. Towed implement 224 includes a set of ground engaging elements 243, such as wheels or tracks. Towing machine 240 includes a set of ground engaging elements 244, such as wheels or tracks. In the example illustrated, towing machine 240 includes an operator compartment or cab 228, which can include a variety of different operator interface mechanisms (e.g., 318 shown in FIG. 10) for controlling sprayer 110-2.

Figure 8:
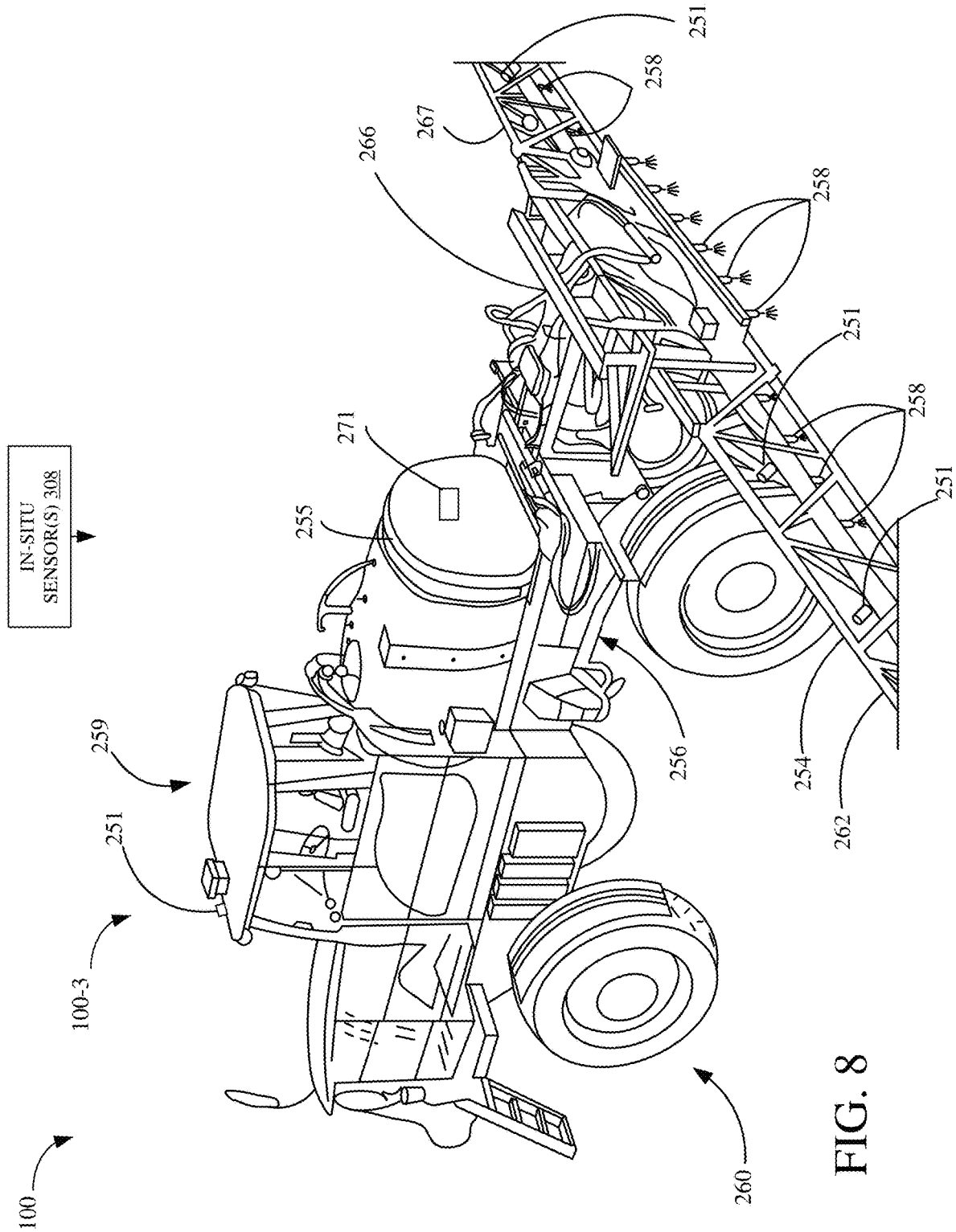
FIG. 8 is a partial pictorial, partial block diagram showing one example of a mobile agricultural material application machine as a mobile agricultural sprayer.

As will be shown in FIG. 8, an agricultural sprayer can be self-propelled. That is, rather than being towed by a towing machine, the machine that carries the spraying system also includes propulsion and steering systems.

FIG. 7 also illustrates that agricultural sprayer 100-2 can include one or more observation sensor systems 251. Observation sensors systems 251 can be located at various locations on sprayer 100-2, such as on towing vehicle 240 or implement 224, or both. As illustrated, sprayer 100-2 includes an observation sensor system 251 on towing vehicle 240 as well as a plurality of observation sensor systems disposed on each of arm 221 and arm 222 of boom 220. Observation sensor systems 251 can detect a variety of characteristic at the field, for example, soil nutrients, weed characteristics, as well as a variety of other characteristics. Observation sensor systems 251 may include one or more of an imaging system (e.g., stereo or mono camera), optical sensors, radar, lidar, ultrasonic sensors, infrared or thermal sensors, as well as a variety of other sensors.

FIG. 8 illustrates one example of an agricultural sprayer 100-3 that is self-propelled as an example mobile material application machine 100. In FIG. 8, sprayer 100-3 has an on-board spraying system, including, among other things, one or more tanks 255 containing one or more materials (e.g., fertilizer, herbicide, pesticide, etc.) a boom 254, that is carried on a machine frame 256 having an operator compartment 259, and a set of ground engaging elements 260, such as wheels or tracks. Operator compartment 259 can include a variety of different operator interface mechanisms (e.g., 318 shown in FIG. 10) for controlling agricultural sprayer 100-3. Tank(s) 255 are fluidically coupled to spray nozzles 258 by a delivery system comprising a set of conduits. One or more fluid pumps are configured to pump the material from tank(s) 255 through the conduits and through nozzles 258 to apply the material to the field over which agricultural sprayer 100-3 travels. In some examples, the fluid pumps are actuated by operation of one or more motors, such as electric motors, pneumatic motors, or hydraulic motors, that drive the pumps.

Spray nozzles 258 are coupled to, and spaced apart along, boom 254. Boom 254 includes arms 262 and 267 which can articulate or pivot relative to a center frame 266. Thus, arms 262 and 264 are movable between a storage or transport position and an extended or deployed position (shown in FIG. 8). The boom 254, including each arm 262 and 267, can include multiple discrete and controllable sections which are supplied product from tank(s) 255 by the fluid pump(s) through a respective conduit of each section.

Each section can include a respective set of one or more spray nozzles 258. Each section can be activated or deactivated through the actuation of a corresponding controllable actuator, such as a valve, for instance, a section can be deactivated, that is the section or the nozzles of the section, or both, are prevented from receiving fluid, by actuation of a controllable actuator that is upstream of the section or the nozzles, or both. In some examples, the nozzles of the section may each have an associated controllable actuator which can be actuated to activate or deactivate the nozzles. The application rate of product is the rate (volumetric rate) at which product is applied to the field over which sprayer 100-3 travels. The application rate corresponds to a volumetric flow rate of the product from the tanks 255 through the spray nozzles 258. The volumetric flow rate is controlled by operation of actuators (such as fluid pumps or valves), such as by varying the speed of actuation of the pump with an associated motor or by controllably opening and closing a valve. In some examples, a controllable valve that corresponds to each section or to each nozzle, can be operable to reciprocate (e.g., pulse) between a closed state and an open state at variable frequency (e.g., pulse width modulation control) to control the rate at which the product is discharged from the set of spray nozzles 258 of the respective section or from the respective individual spray nozzle 258.

FIG. 8 also shows that agricultural sprayer 100-3 can include one or more in-situ sensors 308, some of which are shown in FIG. 8 as well as below. For example, FIG. 8 shows that sprayer 100-3 can include one or more fill level sensors 271 that detect a fill level of material in tanks 255. Fill level sensors can include float gauges, weight sensors that detect a weight of material in tanks 255, emitter sensors that detect a level to which the material is filled, as well as various other types of sensors.

Additionally, FIG. 8 shows that sprayer 100-3 can include one or more observation sensor systems 251. Observation sensors systems 251 can be located at various locations on sprayer 100-3. As illustrated, sprayer 100-3 includes an observation sensor system 251 coupled to the roof (or frame) of operator compartment 259 as well as a plurality of observation sensor systems 251 disposed on each of arm 262 and arm 267 of boom 254. Observation sensor systems 251 can detect a variety of characteristic at the field, for example, soil nutrients, weed characteristics, as well as a variety of other characteristics. Observation sensor systems 251 may include one or more of an imaging system (e.g., stereo or mono camera), optical sensors, radar, lidar, ultrasonic sensors, infrared or thermal sensors, as well as a variety of other sensors.

It will be noted that while various examples of in-situ sensors 308 are shown in FIGS. 1-8, a mobile agricultural material application machine 100 (e.g., 100-1, 100-2, 100-3) can include various other types of sensors, some of which will be discussed in FIG. 10.

Figure 9:
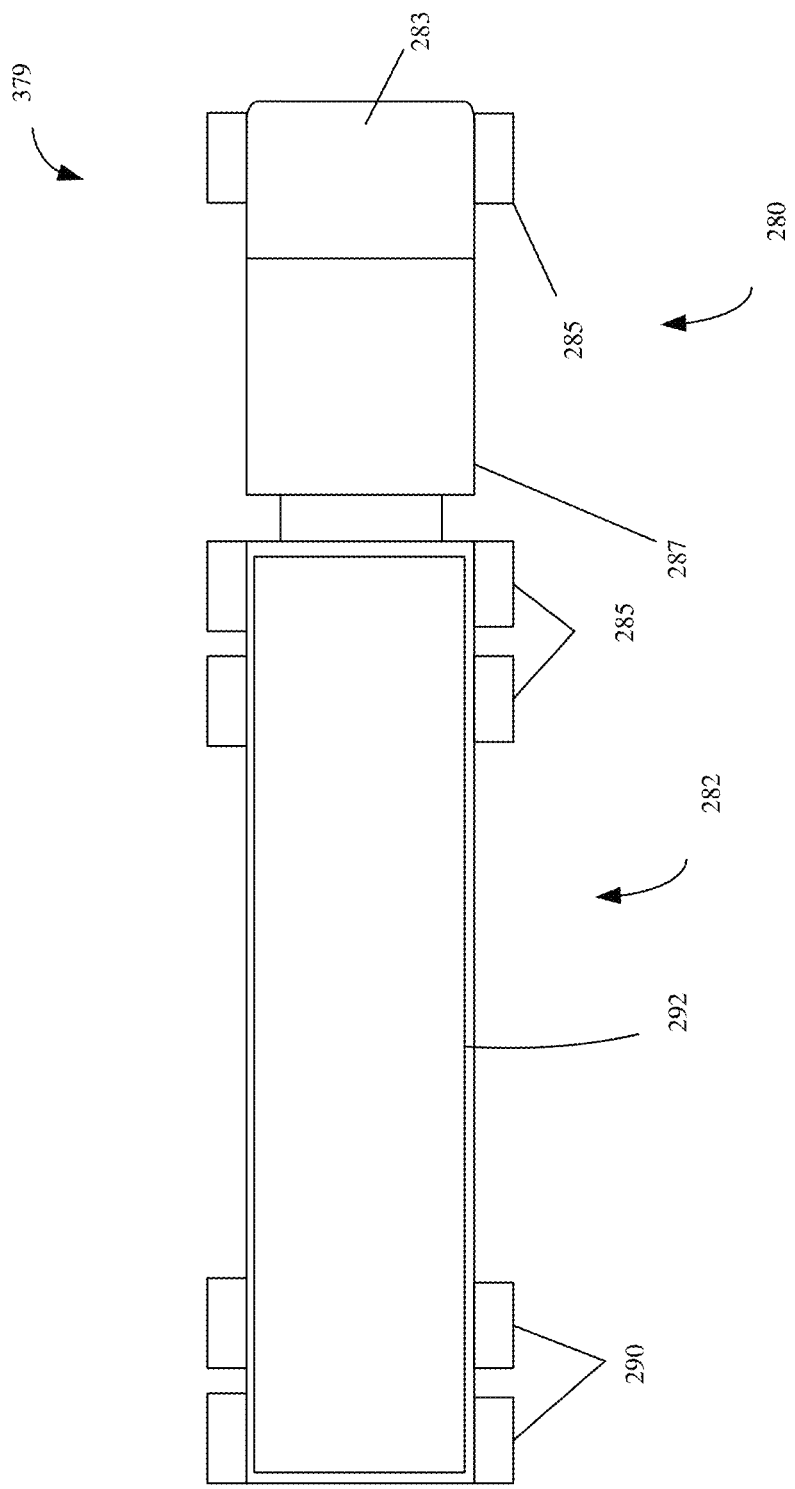
FIG. 9 shows an example of a material delivery machine.

FIG. 9 shows one example of a material delivery machine 379. FIG. 9 shows that a material delivery machine 379 can include a towing vehicle and towed implement, such as a truck (e.g., semi-truck) 280 and trailer (e.g., semi-trailer) 282. Various other forms of material delivery machines are contemplated herein. For instance, in other examples, the material delivery machine 379 may not include a towed implement, instead, the material container may be integrated on the frame (e.g., chassis) of the vehicle.

Truck 280, as illustrated, includes a power plant 283 (e.g., internal combustion engine, battery and electric motors, etc.), ground engaging elements 285 (e.g., wheels or tracks), and an operator compartment 287. The operator compartment can include a variety of operator interface mechanisms, which can be similar to operator interface mechanisms 318 shown in FIG. 10. In some examples, truck 280 may be autonomous or semi-autonomous. Trailer 282 is coupled to track by way of a connection assembly (e.g., one or more of a hitch, electrical coupling, hydraulic coupling, pneumatic coupling, etc.) and, as illustrated, includes ground engaging elements 290, such as wheels or tracks, and a material container 292 which includes a volume to store or hold one or more materials (dry or liquid), such as seed, fertilizer, herbicide, pesticide, etc.

In some examples, material delivery machine 379 can also include a material transfer subsystem (not shown) which can include a conduit (e.g., a chute, a hose, a line, a pipe, etc.) through which material can be conveyed by an actuator such as an auger, a pump, a motor, etc. In other examples, the material transfer subsystem may comprise an actuatable door disposed on the bottom side of the material container 292 that is actuatable between an open position and a closed position. These are merely some examples.

Figure 10:
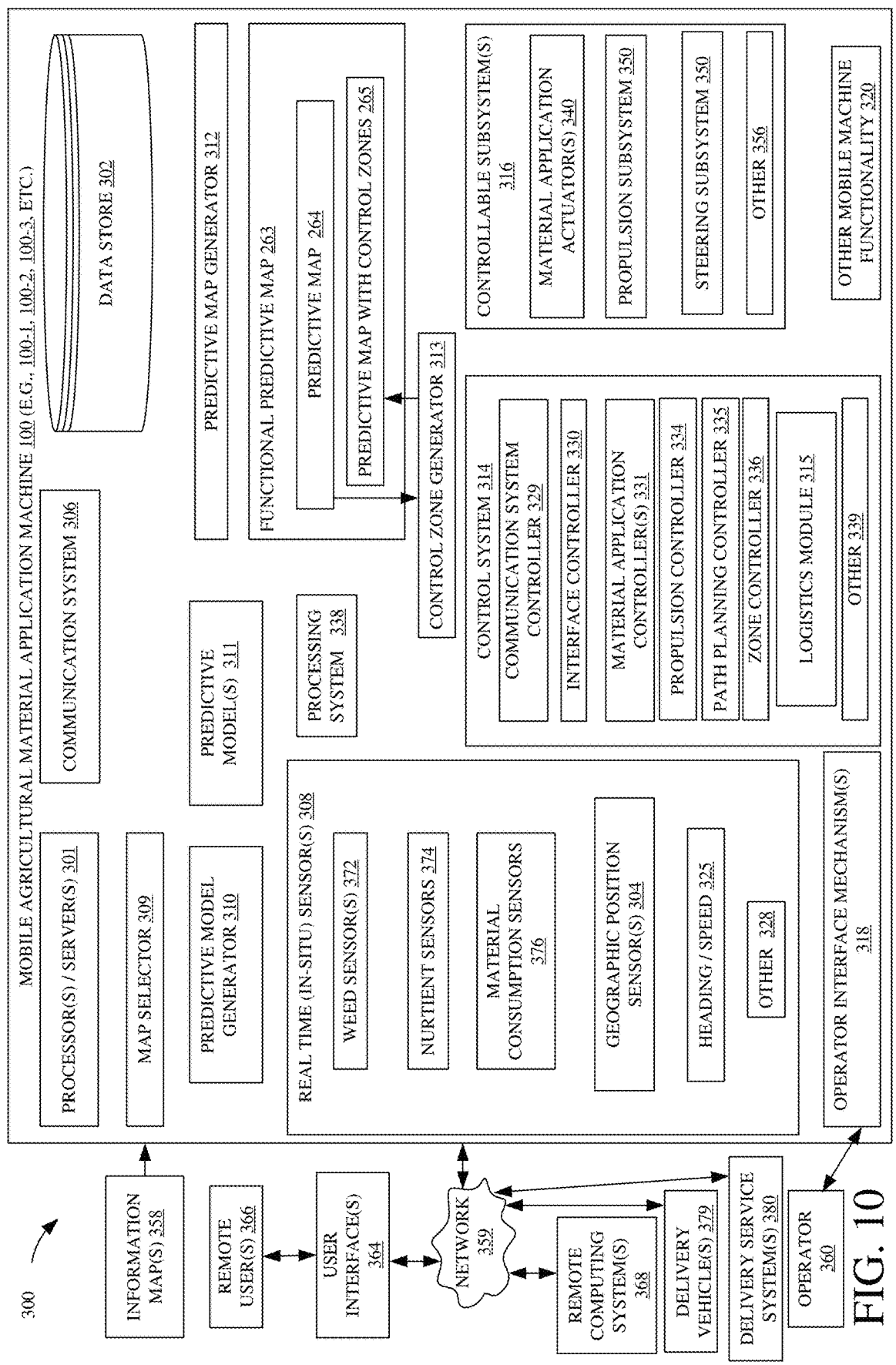
FIG. 10 is a block diagram showing some portions of an agricultural material application system, including a mobile agricultural material application machine, in more detail, according to some examples of the present disclosure.

FIG. 10 is a block diagram showing some portions of an agricultural material application system architecture 300. FIG. 3 shows that agricultural material application system architecture 300 includes mobile agricultural material application machine 100 (e.g., 100-1, 100-2, 100-3, etc.). Agricultural material application system 300 also includes one or more remote computing systems 368, one or more remote user interfaces 364, network 359, delivery vehicle(s) 379, delivery service system(s) 377, and one or more information maps 358. Mobile agricultural material application machine 100, itself, illustratively includes one or more processors or servers 301, data store 302, communication system 306, one or more in-situ sensors 308 that sense one or more characteristics at a field concurrent with an operation, and a processing system 338 that processes the sensor data (e.g., sensor signals, images, etc.) generated by in-situ sensors 308 to generate processed sensor data. The in-situ sensors 308 generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine can also include a wide variety of other machine functionality 320.

The in-situ sensors 308 can be on-board mobile machine 100, remote from mobile machine 100, such as deployed at fixed locations on the worksite or on another machine operating in concert with mobile machine 100, such as an aerial vehicle, and other types of sensors, or a combination thereof. In-situ sensors 308 sense characteristics at the worksite during the course of an operation. In-situ sensors 308 illustratively include one or more weed sensors 372, one or more nutrient sensors 374, one or more material consumption sensors 376, geographic position sensors 304, heading/speed sensors 325, and can include various other sensors 328, such as the various other sensors described above.

Weed sensors 372 illustratively detect values of weed characteristics which can be indicative of weed presence, weed location, weed type, weed intensity, as well as various other weed characteristics. Weed sensors 372 can be located at various locations on material application machine 100 and can be configured to detect weed characteristics at the field ahead of material application machine 100 or ahead of a given component of material application machine 100, or both. Weed sensors 372 may include one or more of an imaging system (e.g., stereo or mono camera), optical sensors, radar, lidar, ultrasonic sensors, infrared or thermal sensors, as well as a variety of other sensors. In some examples, weed sensors 372 can be similar to observation sensors systems 151 or 251. These are merely some examples. Weed sensors 372 can be any of a variety of different types of sensors.

Nutrient sensors 374 illustratively detect nutrient values. Nutrient values can be indicative of an amount (e.g., concentration) of one or more nutrients in the soil of the field, such as the amount of nitrogen, the amount of potassium, the amount of phosphate, the amount of organic matter, the amount of one or more micronutrients, etc. Thus, in some examples, nutrient values are or include soil nutrient values. Alternatively, or additionally, nutrient values can be indicative of an amount (e.g., concentration) of one or more nutrients in the plants at the field. Nutrients of the plant can include various types of nutrients, such as boron, sulphur, manganese, zinc, magnesium, phosphorus, calcium, iron, copper, molybdenum, potassium, nitrogen, etc., as well as constituents of the crop such as protein, sugar, starch, ligan, etc. Thus, in some examples, nutrient values are or include plant nutrient values. As can be seen, nutrient values may be soil nutrient values or plant nutrient values, or both. In some examples, the nutrient values may be binary in that they indicate sufficient or deficient levels (e.g., relative to a threshold) rather than a valued amount. Nutrient sensors 374 can be located at various locations on material application machine 100 and can be configured to detect nutrient characteristics (e.g., soil nutrient characteristics or plant nutrient characteristics, or both) at the field ahead of material application machine 100 or ahead of a given component of material application machine 100, or both. In some examples, nutrient sensors 374 detect the soil or a characteristic of the soil to detect nutrient values. For instance, nutrient sensors 374 may detect the color of the soil, the thermal characteristics of the soil, the emissivity or absorption of electromagnetic radiation, the capability of the soil to conduct or accumulate electrical charge, as well as various other characteristics. In some examples, nutrient sensors 374 detect the vegetation (e.g., plants) or a characteristic of the vegetation (e.g., plants) at the field to detect nutrient values. For instance, nutrient sensors 374 may detect the plant size, the plant health, the plant coloration, constituents of the plant (e.g., protein, starch, sugar, lignan, etc.), the emissivity or absorption of electromagnetic radiation, characteristics of the components of the plant (e.g., characteristics of the leaves, characteristics of the leaf buds, characteristics of the stalk, etc.), as well as various other characteristics. Nutrient sensors 374 may include one or more of an imaging system (e.g., stereo or mono camera), optical sensors, radar, lidar, ultrasonic sensors, infrared or thermal sensors, soil probes, electromagnetic sensors that detect the capability of the soil to conduct or accumulate electrical charge, as well as a variety of other sensors. In some examples, nutrient sensors 374 can be similar to observation sensors systems 151 or 251. In some examples, nutrient sensors 374 can be similar to sensor 170. These are merely some examples. Nutrient sensors 374 can be any of a variety of different types of sensors.

Material consumption sensors 376 illustratively detect material consumption values which can be indicative of the amount of material (e.g., seed, dry or liquid material, fertilizer, herbicide, pesticide, etc.) consumed (e.g., used) by material application machine 100 at the field. Material consumption sensors 374 can be located at various locations on material application machine. Material consumption sensors 374 can include fill level sensors (e.g., 117, 177, 178, 271, etc.) that detect a fill level of a material container, such as tanks 107, tanks 110, tanks 112, tanks 234, and tanks 255. In some examples, material consumption sensors 374 can detect a flow rate of material, such as flow sensors (e.g., flow meters) that detect a volumetric flow of material through a delivery line (e.g., 111, or conduits of boom 220, or conduits of boom 254, etc.). In some examples, material consumption sensors 374 can provide a count of the material consumed, for example, seed sensors, such as seed sensors 122, 193, or 203. In some examples, observation sensor systems 151 may detect the material consumed, such as an observation sensor system disposed to observe the trench or furrow 162. In some examples, material consumption sensors 376 can include sensors that detect the operating parameters of one or more actuators, such as the speed (or rate) at which the actuators actuate to control the rate of material. These are merely some examples. Material consumption sensors 376 can be any of a variety of different types of sensors.

Geographic position sensors 304 illustratively sense or detect the geographic position or location of mobile machine 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors.

Heading/speed sensors 325 detect a heading and speed at which mobile machine 100 is traversing the worksite during the operation. This can include sensors that sense the movement of ground-engaging elements (e.g., wheels or tracks), or can utilize signals received from other sources, such as geographic position sensor 304, thus, while heading/speed sensors 325 as described herein are shown as separate from geographic position sensor 304, in some examples, machine heading/speed is derived from signals received from geographic positions sensor 304 and subsequent processing. In other examples, heading/speed sensors 325 are separate sensors and do not utilize signals received from other sources.

Other in-situ sensors 328 may be any of a wide variety of other sensors, including the other sensors described above with respect to FIGS. 1-8. Other in-situ sensors 328 can be on-board mobile machine 100 or can be remote from mobile machine 100, such as other in-situ sensors 328 on-board another mobile machine that capture in-situ data of characteristics at the field or sensors at fixed locations throughout the field. The remote data from remote sensors can be obtained by mobile machine 100 via communication system 306 over network 359.

In-situ data includes data taken from a sensor on-board the mobile machine 100 or taken by any sensor where the data are detected during the operation of mobile machine 100 at a field.

Processing system 338 processes the sensor data (e.g., signals, images, etc.) generated by in-situ sensors 308 to generate processed sensor data indicative of one or more characteristics. For example, processing system generates processed sensor data indicative of characteristic values based on the sensor data generated by in-situ sensors 308, such as weed values based on sensor data generated by weed sensors 372, nutrient values based on sensor data generated by nutrient sensors 374, and material consumption values based on sensor data generated by material consumption sensors 376. Processing system 338 also processes sensor data generated by other in-situ sensors 308 to generate processed sensor data indicative of other characteristic values, such as machine speed characteristic (travel speed, acceleration, deceleration, etc.) values based on sensor data generated by heading/speed sensors 325, machine heading values based on sensor data generated by heading/speed sensors 325, geographic position (or location) values based on sensor data generated by geographic position sensors 304, as well as various other values based on sensors signals generated by various other in-situ sensors 328.

It will be understood that processing system 338 can be implemented by one or more processers or servers, such as processors or servers 301. Additionally, processing system 338 can utilize various sensor signal filtering functionalities, noise filtering functionalities, sensor signal categorization, aggregation, normalization, as well as various other processing functionalities. Similarly, processing system 338 can utilize various image processing functionalities such as, sequential image comparison, RGB, edge detection, black/white analysis, machine learning, neural networks, pixel testing, pixel clustering, shape detection, as well any number of other suitable processing and data extraction functionalities.

FIG. 10 also shows that an operator 360 may operate mobile machine 100. The operator 360 interacts with operator interface mechanisms 318. In some examples, operator interface mechanisms 318 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 360 may interact with operator interface mechanisms 318 using touch gestures. In some examples, at least some operator interface mechanisms 318 may be disposed in an operator compartment of mobile machine 100. In some examples, at least some operator interface mechanisms 318 may be remote (or separable) from mobile machine 100 but are in communication therewith. Thus, the operator 360 may be local or remote. These examples described above are provided as illustrative examples and are not intended to limit the scope of the present disclosure. Consequently, other types of operator interface mechanisms 318 may be used and are within the scope of the present disclosure.

FIG. 10 also shows remote users 366 interacting with mobile machine 100 or remote computing systems 368, or both, through user interfaces mechanisms 364 over network 359. In some examples, user interface mechanisms 364 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, user 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems 368 or by remote users 366, or both. As will be described below, in some examples, one or more of the components shown being disposed on mobile machine 100 in FIG. 10 can be located elsewhere, such as at remote computing systems 368.

FIG. 10 also shows that one or more delivery vehicles 379 can interact with other items in agricultural material application system 300 over network 359. For instance, communication system 306 of mobile agricultural material application machine 100 may communicate with one or more delivery vehicles 379 to provide information such as material delivery locations and material delivery times to schedule material delivery. In another example, material one or more delivery vehicles 379 may be controlled, such as by control system 314, to travel to a material delivery location.

FIG. 10 also shows that one or more delivery service systems 380 can interact with other items in agricultural material application system 300 over network 359. For instance, communication system 306 of mobile agricultural material application machine 100 may communicate with material delivery service systems 380 to provide information such as material delivery locations and material delivery times to schedule material delivery. Material delivery service systems 380 can be a wide variety of different types of systems, or combinations thereof. For example, material delivery service systems 380 can be in a remote server environment. Further, material delivery service systems 380 can be remote computing systems, such as mobile devices, a remote network, a vendor system, or a wide variety of other remote systems.

FIG. 10 also shows that mobile machine 100 can obtain one or more information maps 358. As described herein, the information maps 358 include, for example, a soil property map, a yield map, a residue map, a constituents map, a seeding map, a topographic map, a vegetative index (VI) map, an optical map, a weed map, a contamination map, as well as various other maps. However, information maps 358 may also encompass other types of data, such as other types of data that were obtained prior to a current operation or a map from a prior operation. In other examples, information maps 358 can be generated during a current operation, such a map generated by predictive map generator 312 based on a predictive model 311 generated by predictive model generator 310.

Information maps 358 may be downloaded onto mobile material application machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 359 illustratively represents any or a combination of any of the variety of networks. Communication system 306 may also include a system that facilitates downloads or transfers of information to and from a secure digital (SD) card or a universal serial bus (USB) card or both.

As described above, the present description relates to the use of models to predict one or more characteristics at the field at which mobile material application machine 100 is operating. The models 311 can be generated by predictive model generator 310, during the current operation.

In one example, predictive model generator 310 generates a predictive model 311 that is indicative of a relationship between the values sensed by the in-situ sensors 308 and values mapped to the field by the information maps 358. For example, if the information map 358 maps values of a characteristic to different locations in the worksite, and the in-situ sensor 308 are sensing values indicative of a characteristic (e.g., weed values, nutrient values, material consumption values, or speed characteristic values), then model generator 310 generates a predictive model that models the relationship between the values of the mapped characteristic and the values of the sensed characteristic.

In some examples, the predictive map generator 312 uses the predictive models generated by predictive model generator 310 to generate functional predictive maps that predict the value of a characteristic, sensed by the in-situ sensors 308, at different locations in the field based upon one or more of the information maps 358.

For example, where the predictive model 311 is a predictive nutrient model that models a relationship between nutrient values sensed by in-situ sensors 308 and one or more of soil property values from a soil property map, yield values from a yield map, residue values from a residue map, constituent values from a constituents map, seeding characteristic values from a seeding map, topographic characteristic values from a topographic map, vegetative index values from a vegetative index map, and other characteristic values from another information map 358, then predictive map generator 312 generates a functional predictive nutrient map that predicts nutrient values at different locations at the worksite based on one or more of the mapped values at those locations and the predictive nutrient model.

In another example, where the predictive model 311 is a predictive weed model that models a relationship between weed values sensed by in-situ sensors 308 and one or more of vegetative index values from a vegetative index map, optical characteristic values from an optical map, weed values from a weed map, and other characteristic values from another information map 358, then predictive map generator 312 generates a functional predictive weed map that predicts weed values at different locations at the worksite based on one or more of the mapped values at those locations and the predictive weed model.

In another example, where the predictive model 311 is a predictive material consumption model that models a relationship between material consumption values sensed by in-situ sensors 308 and one or more of soil property values from a soil property map, weed values from a weed map, contamination values from a contamination map, vegetative index values from a vegetative index map, topographic characteristic values from a topographic map, and other characteristic values from another information map 358, then predictive map generator 312 generates a functional predictive material consumption map that predicts material consumption values at different locations at the worksite based on one or more of the mapped values at those locations and the predictive material consumption model.

In another example, where the predictive model 311 is a predictive speed model that models a relationship between speed characteristic values sensed by in-situ sensors 308 and values of one or more characteristics from one or more information maps 358, then predictive map generator 312 generates a functional predictive speed map that maps predictive speed characteristic values at different locations at the worksite based on or more of the mapped values at those locations and the predictive speed model.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 363. In some examples, the type of data in the functional predictive map 363 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As shown in FIG. 10, predictive map 264 predicts the value of a sensed characteristic (sensed by in-situ sensors 308), or a characteristic related to the sensed characteristic, at various locations across the worksite based upon one or more information values in one or more information maps 358 at those locations and using a predictive model 311. For example, if predictive model generator 310 has generated a predictive model indicative of a relationship between soil property values and values of a characteristic sensed by in-situ sensors 308 then, given the soil property value at different locations across the worksite, predictive map generator 312 generates a predictive map 264 that predicts values of the sensed characteristic at different locations across the worksite. The soil property value, obtained from the soil property map, at those locations and the relationship between soil property values and the values of the sensed characteristic, obtained from a predictive model 311, are used to generate the predictive map 264. This is merely one example.

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308, yet the data type in the predictive map 264 is the same as the data type sensed by the in-situ sensors 308. For instance, the information map 358 may be a seeding map, and the variable sensed by the in-situ sensors 308 may be a nutrient value. The predictive map 264 may then be a predictive nutrient map that maps predictive nutrient values to different geographic locations in the in the worksite. In another example, the information map 358 may be a vegetative index map, and the variable sensed by the in-situ sensors 308 may be a weed value. The predictive map 264 may then be a predictive weed map that maps predictive weed values to different geographic locations in the in the worksite. In another example, the information map 358 may be a contamination map, and the variable sensed by the in-situ sensors 308 may be a material consumption value. The predictive map 264 may then be a predictive material consumption map that maps predictive material consumption values to different geographic locations in the in the worksite. In another example, the information map 358 may be a soil property map, and the variable sensed by the in-situ sensors 308 may be a speed characteristic value. The predictive map 264 may then be a predictive speed map that maps predictive speed characteristic values to different geographic locations in the in the worksite.

Also, in some examples, the data type in the information map 358 is different from the data type sensed by in-situ sensors 308, and the data type in the predictive map 264 is different from both the data type in the information map 358 and the data type sensed by the in-situ sensors 308. For example, the information map may be a residue map, and the variable sensed by the in-situ sensors 308 may be a color of the plants. The predictive map may then be a predictive nutrient map that maps predictive nutrient values to the different geographic locations in the worksite.

In some examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 358 may be a seeding map generated during a previous planting operation on the field, and the variable sensed by the in-situ sensors 308 may be a nutrient value. The predictive map 264 may then be a predictive nutrient map that maps predictive nutrient values to different geographic locations in the field. In another example, the information map 358 may be a vegetative index map generated during a previous operation on the field, and the variable sensed by the in-situ sensors 308 may be a weed value. The predictive map 264 may then be a predictive weed map that maps predictive weed values to different geographic locations in the field. In another example, the information map 358 may be a topographic map generated during a previous operation on the field, and the variable sensed by the in-situ sensors 308 may be a material consumption value. The predictive map 264 may then be a predictive material consumption map that maps predictive material consumption values to different geographic locations in the field. In another example, the information map 358 may be a soil property map generated during a previous operation on the field, and the variable sensed by the in-situ sensors 308 may be a speed characteristic value. The predictive map 264 may then be a predictive speed map that maps predictive speed characteristic values to different geographic locations in the field.

In some examples, the information map 358 is from a prior pass through the field during a prior operation and the data type is the same as the data type sensed by in-situ sensors 308, and the data type in the predictive map 264 is also the same as the data type sensed by the in-situ sensors 308. For instance, the information map 358 may be a weed map generated during a previous year or earlier in the same season, and the variable sensed by the in-situ sensors 308 may be a weed value. The predictive map 264 may then be a predictive weed map that maps predictive weed values to different geographic locations in the field. In such an example, the relative weed value differences in the georeferenced information map 358 from the prior year or earlier in the same season can be used by predictive model generator 310 to generate a predictive model that models a relationship between the relative weed value differences on the information map 358 and the weed values sensed by in-situ sensors 308 during the current operation. The predictive model is then used by predictive map generator 310 to generate a predictive weed map. In another example, the information map 358 may be a nutrient map generated during a previous year or earlier in the same season, and the variable sensed by the in-situ sensors 308 may be a nutrient value. The predictive map 264 may then be a predictive nutrient map that maps predictive nutrient values to different geographic locations in the field. In such an example, the relative nutrient value differences in the georeferenced information map 358 from the prior year or earlier in the same season can be used by predictive model generator 310 to generate a predictive model that models a relationship between the relative nutrient value differences on the information map 358 and the nutrient values sensed by in-situ sensors 308 during the current operation. The predictive model is then used by predictive map generator 310 to generate a predictive nutrient map. In another example, the information map 358 may be a material consumption map generated during a previous year or earlier in the same season, and the variable sensed by the in-situ sensors 308 may be a material consumption value. The predictive map 264 may then be a predictive material consumption map that maps predictive material consumption values to different geographic locations in the field. In such an example, the relative material consumption value differences in the georeferenced information map 358 from the prior year or earlier in the same season can be used by predictive model generator 310 to generate a predictive model that models a relationship between the relative material consumption value differences on the information map 358 and the material consumption values sensed by in-situ sensors 308 during the current operation. The predictive model is then used by predictive map generator 310 to generate a predictive material consumption map. In another example, the information map 358 may be a speed map generated during a previous year or earlier in the same season, and the variable sensed by the in-situ sensors 308 may be a speed characteristic value. The predictive map 264 may then be a predictive speed map that maps predictive speed characteristic values to different geographic locations in the field. In such an example, the relative speed characteristic value differences in the georeferenced information map 358 from the prior year or earlier in the same season can be used by predictive model generator 310 to generate a predictive model that models a relationship between the relative speed characteristic value differences on the information map 358 and the speed characteristic values sensed by in-situ sensors 308 during the current operation. The predictive model is then used by predictive map generator 310 to generate a predictive speed map.

In another example, the information map 358 may be a topographic map generated during a prior operation in the same year and may map topographic characteristic values to different geographic locations in the field. The variable sensed by the in-situ sensors 308 during the current operation may be a nutrient value, a weed value, a material consumption value, or a speed characteristic value. The predictive map 264 may then map predictive characteristic values (e.g., nutrient values, weed values, material consumption values, or speed characteristic values) to different geographic locations in the field. In such an example, the topographic characteristic values at time of the prior operation are geo-referenced, recorded, and provided to mobile machine 100 as an information map 358 of topographic characteristic values. In-situ sensors 308 during a current operation can detect characteristic values (e.g., nutrient values, weed values, material consumption values, or speed characteristic values) at geographic locations in the field and predictive model generator 310 may then build a predictive model that models a relationship between characteristic values (e.g., nutrient values, weed values, material consumption values, or speed characteristic values) at the time of the current operation and topographic characteristic values at the time of the prior operation. This is because the topographic characteristic values at the time of the prior operation are likely to be the same as at the time of the current operation or may be more accurate or otherwise may be more reliable (or fresher) than topographic characteristic values obtained in other ways. For instance, a machine that operated on the field previously may provide topographic characteristic values that are fresher (closer in time) or more accurate than topographic characteristic values detected in other ways, such as satellite or other aerial-based sensing. For instance, vegetation on the field, meteorological conditions, as well as other obscurants, may obstruct or otherwise create noise that makes topographic characteristic values unavailable or unreliable. Thus, the topographic map generated during the prior operation may be more preferable. This is merely one example.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265.

It will also be appreciated that control zone generator 313 can cluster values to generate control zones and the control zones can be added to predictive control zone map 265, or a separate map, showing only the control zones that are generated. In some examples, the control zones may be used for controlling or calibrating mobile machine 100 or both. In other examples, the control zones may be presented to the operator 360 and used to control or calibrate mobile machine 100, and, in other examples, the control zones may be presented to the operator 360 or another user, such as a remote user 366, or stored for later use.

Predictive map 264 or predictive control zone map 265 or both are provided to control system 314, which generates control signals based upon the predictive map 264 or predictive control zone map 265 or both. In some examples, communication system controller 329 controls communication system 306 to communicate the predictive map 264 or predictive control zone map 265 or control signals based on the predictive map 264 or predictive control zone map 265 to other mobile machines (e.g., delivery vehicles 379, other mobile material application machines) that are operating at the same worksite or in the same operation. In some examples, communication system controller 329 controls the communication system 306 to send the predictive map 264, predictive control zone map 265, or both to other remote systems, such as remote computing systems 368 or delivery service systems 377, or both.

Control system 314 includes communication system controller 329, interface controller 330, one or more material application controllers 331, a propulsion controller 334, a path planning controller 335, one or more zone controllers 336, logistics module 315, and control system 314 can include other items 339. Controllable subsystems 316 include material application actuators 340, propulsion subsystem 350, steering subsystem 352, and can include a wide variety of other controllable subsystems 356.

Control system 314 can control various items of agricultural system 300 based on sensor data detected by sensors 308, models 311, predictive map 264 or predictive map with control zones 265, operator or user inputs, as well as various other bases.

Interface controllers 330 are operable to generate control signals to control interface mechanisms, such as operator interface mechanisms 318 or user interface mechanisms 364, or both. While operator interface mechanisms 318 are shown as separate from controllable subsystems 316, it will be understood that operator interface mechanisms 318 are controllable subsystems. The interface controllers 330 are also operable to present the predictive map 264 or predictive control zone map 265 or other information derived from or based on the predictive map 264, predictive control zone map 265, or both, to operator 360 or a remote user 366, or both. Operator 360 may be a local operator or a remote operator. As an example, interface controller 330 generates control signals to control a display mechanism to display one or both of predictive map 264 and predictive control zone map 265 for the operator 360 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation.

Propulsion controller 334 illustratively generates control signals to control propulsion subsystem 350 to control a speed setting, such as one or more of a travel speed, acceleration, deceleration, and direction (e.g., forward and reverse), such as based on one or more of the predictive map 264 and the predictive control zone map 265 as well as based on outputs from logistics module 315. Propulsion subsystem 350 includes one or more powertrain components, such as a powerplant (e.g., internal combustion engine, electric motors and batteries, etc.), a transmission or gear box, as well as various other items.

Path planning controller 335 illustratively generates control signals to control steering subsystem 352 to steer mobile machine 100 according to a desired path or according to desired parameters, such as desired steering angles, based on one or more of the predictive map 264 and the predictive control zone map 265 or logistics outputs from logistics module 315. Path planning controller 333 can control a path planning system to generate a route for mobile machine 100 and can control propulsion subsystem 350 and steering subsystem 352 to steer agricultural mobile machine 100 along that route. Steering subsystem 352 can include various items, such as one or more actuators to control an angle (steering angle) of one or more ground engaging elements (e.g., wheels or tracks) of mobile machine 100.

Material application controllers 331 illustratively generate control signals, to control one or material application actuators 340 of mobile material application machine 100 to control the application of material to the field, that is the amount of material applied, the rate at which material is applied, whether or not material is applied, etc. Material application controllers 331 can generate control signals based on a predictive map 264 or predictive control zone map 265, or both. Material application controllers 331 can generate control signals based on logistics outputs from logistics module 315.

Material application actuators 340 can include a variety of different types of actuators such as hydraulic, pneumatic, electromechanical actuators, motors, pumps, valves, as well as various other types of actuators. Some examples of actuators 340 are discussed above in FIGS. 1-8. For example, actuators 340 can include actuators that drive the speed of rotation of a seed meter, such as seed meter 124 or the speed of rotation of an assistive seed delivery, such as assistive seed delivery system 166, or both. Actuators 340 can include actuators that control a flow of material from one or more material containers through a delivery line and to an outlet. For example, when material application machine 100 is in the form of a planting machine, such as planting machine 100-1, actuators 340 can include one or more actuators, such as pumps or valves, or both, (e.g., 109 or 115) that control the flow of material from a material container (e.g., 107, 110, or 112) through a delivery line (e.g., 111) and out of an outlet (e.g., 119). In another example, when material application machine 100 is a spraying machine, such as spraying machine 100-2 or 100-3, actuators can include one or more pumps or one or more valves, or both, that control the flow of material from a material container (e.g., 234 or 255) through a conduit and out of an outlet (e.g., 230 or 258). In some examples, actuators 340 may be controlled to activate or deactivate one or more components of material application machine 100. For example, actuators 340 may be controlled to activate or deactivate one or more nozzles or one or more sections of a spraying machine.

In some examples, the mobile agricultural material application machine 100 may have multiple material containers.

Each container may contain a different variety of the material to be applied, for example, a different seed variety (e.g., genotype), a different fertilizer material variety, a different herbicide variety, a different pesticide variety, etc. In some examples, material application controllers 331 may control material application actuators 340 to control which variety is applied to the field, based on a predictive map 264 or a predictive control zone map 265, or both, as well as other inputs. For instance, it may be desirable to plant weed resistant seed varieties in areas of the field where the map (264 or 265, or both) indicate high levels of weeds. In another example, it may be desirable to plant low nutrient requirement seed varieties in areas of the field where the map (264 or 265, or both) indicate low levels of nutrient(s). These are merely some examples. In another example, it may be desirable to apply a different variety of herbicide in areas of the field where the map (264 or 265, or both) indicate weed of a given type, which may be resistant to the currently activated herbicide. This is merely one example.

Zone controller 336 illustratively generates control signals to control one or more controllable subsystems 316 to control operation of the one or more controllable subsystems 316 based on the predictive control zone map 265.

Logistics module 315 illustratively generates logistics control outputs. Logistics module 315 will be discussed in more detail in FIG. 16.

Other controllers 339 included on the mobile machine 100, or at other locations in agricultural system 300, can control other subsystems 356.

While the illustrated example of FIG. 10 shows that various components of agricultural system architecture 300 are located on mobile material application machine 100, it will be understood that in other examples one or more of the components illustrated on mobile material application machine 100 in FIG. 10 can be located at other locations, such as one or more remote computing systems 368. For instance, one or more of data stores 302, map selector 309, predictive model generator 310, predictive model 311, predictive map generator 312, functional predictive maps 263 (e.g., 264 and 265), control zone generator 313, and control system 314 (or components thereof) can be located remotely from mobile machine 100 but can communicate with (or be communicated to) mobile machine 100 via communication system 306 and network 359. Thus, predictive models 311 and functional predictive maps 263 may be generated and/or located at remote locations away from mobile machine 100 and can be communicated to mobile machine 100 over network 359, for instance, communication system 306 can download the predictive models 311 and functional predictive maps 263 from the remote locations and store them in data store 302. In other examples, mobile machine 100 may access the predictive models 311 and functional predictive maps 263 at the remote locations without downloading the predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generated by in-situ sensors 308 can be provided over network 359 to the remote locations. Similarly, information maps 358 can be provided to the remote locations.

In some examples, control system 314 may remain local to mobile machine 100, and a remote system (e.g., 368 or 364) may be provided with functionality (e.g., such as a control signal generator) that communicates control commands to mobile machine 100 that are used by control system 314 for the control of mobile machine 100.

Similarly, where various components are located remotely from mobile machine 100, those components can receive data from components of mobile machine 100 over network 359. For example, where predictive model generator 310 and predictive map generator 312 are located remotely from mobile machine 100, such as at remote computing systems 368, data generated by in-situ sensors 308 and geographic position sensors 304, for instance, can be communicated to the remote computing systems 368 over network 359. Additionally, information maps 358 can be obtained by remote computing systems 368 over network 359 or over another network.

Figure 11:
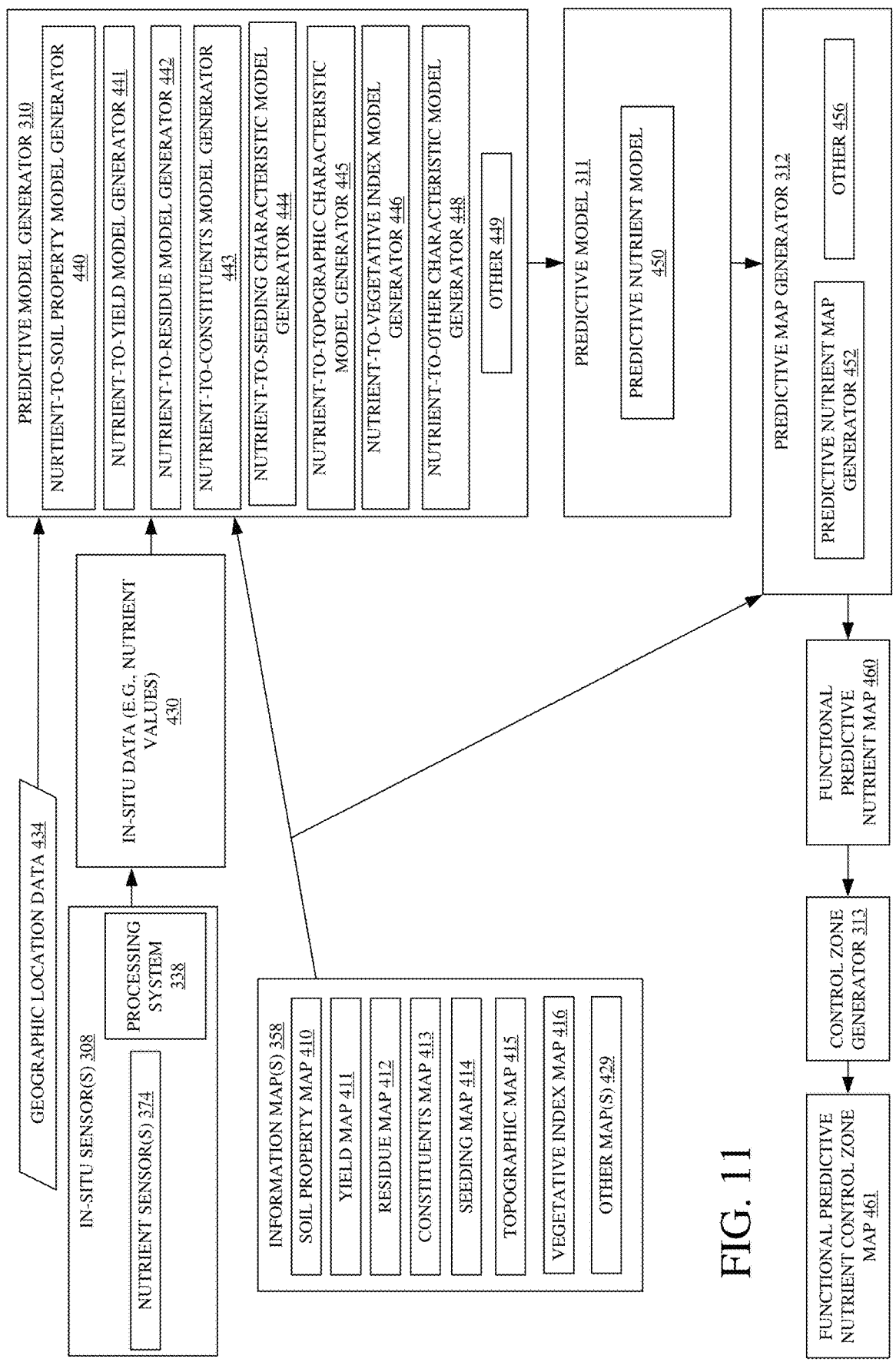
FIG. 11 is a block diagram showing one example of a predictive model generator and predictive map generator.

FIG. 11 is a block diagram of a portion of the agricultural material application system architecture 300 shown in FIG. 10. Particularly, FIG. 11 shows, among other things, examples of the predictive model generator 310 and the predictive map generator 312 in more detail. FIG. 11 also illustrates information flow among the various components shown. The predictive model generator 310 receives one or more information map(s) 358. In the example illustrated in FIG. 11, information maps 358 include one or more of a soil property map 410, a yield map 411, a residue map 412, a constituents map 413, a seeding map 414, a topographic map 415, a vegetative index map 416, or any of a wide variety of other information maps 429. Predictive model generator 310 also receives geographic location data 434, such as an indication of a geographic location, from geographic position sensor 304. Geographic location data 434 illustratively represents the geographic locations to which values detected by in-situ sensors 308 correspond. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, machine processing delays, sensor position (e.g., relative to geographic position sensor), sensor parameters (e.g., sensor field of view), as well as various other data, can be used to derive a geographic location at the field to which a value a detected by an in-situ sensor 308 corresponds.

In-situ sensors 308 illustratively include nutrient sensors 374, as well as processing system 338. In some examples, processing system 338 is separate from in-situ sensors 308 (such as the example shown in FIG. 10). In some instances, nutrient sensors 374 may be located on-board mobile material application machine 100. The processing system 338 processes sensor data generated from nutrient sensors 374 to generate processed sensor data 430 indicative of nutrient values (e.g., soil nutrient values or plant nutrient values, or both).

As shown in FIG. 11, the example predictive model generator 310 includes a nutrient-to-soil property model generator 440, a nutrient-to-yield model generator 441, a nutrient-to-residue model generator 442, a nutrient-to-constituents model generator 443, a nutrient-to-seeding characteristic model generator 444, a nutrient-to-topographic characteristic model generator 445, a nutrient-to-vegetative index model generator 446, and a nutrient-to-other characteristic model generator 448. In other examples, the predictive model generator 310 may include additional, fewer, or different components than those shown in the example of FIG. 11. Consequently, in some examples, the predictive model generator 310 may include other items 449 as well, which may include other types of predictive model generators to generate other types of nutrient models.

Nutrient-to-soil property model generator 440 identifies a relationship between nutrient value(s) detected in in-situ sensor data 430, at geographic location(s) to which the nutrient value(s), detected in the in-situ sensor data 430, correspond, and soil property value(s) from the soil property map 410 corresponding to the same geographic location(s) to which the detected nutrient value(s) correspond. Based on this relationship established by nutrient-to-soil property model generator 440, nutrient-to-soil property model generator 440 generates a predictive nutrient model. The predictive nutrient model is used by predictive nutrient map generator 452 to predict a nutrient value at different locations in the field based upon the georeferenced soil property values contained in the soil property map 410 corresponding to the same locations in the field. Thus, for a given location in the field, a nutrient value can be predicted at the given location based on the predictive nutrient model and the soil property value, from the soil property map 415, corresponding to that given location.

Nutrient-to-yield model generator 441 identifies a relationship between nutrient value(s) detected in in-situ sensor data 430, at geographic location(s) to which the nutrient value(s), detected in the in-situ sensor data 430, correspond, and yield value(s) from the yield map 411 corresponding to the same geographic location(s) to which the detected nutrient value(s) correspond. Based on this relationship established by nutrient-to-yield model generator 441, nutrient-to-yield model generator 441 generates a predictive nutrient model. The predictive nutrient model is used by predictive nutrient map generator 452 to predict a nutrient value at different locations in the field based upon the georeferenced yield values contained in the yield map 411 corresponding to the same locations in the field. Thus, for a given location in the field, a nutrient value can be predicted at the given location based on the predictive nutrient model and the yield value, from the yield map 411, corresponding to that given location.

Nutrient-to-residue model generator 442 identifies a relationship between nutrient value(s) detected in in-situ sensor data 430, at geographic location(s) to which the nutrient value(s), detected in the in-situ sensor data 430, correspond, and residue value(s) from the residue map 412 corresponding to the same geographic location(s) to which the detected nutrient value(s) correspond. Based on this relationship established by nutrient-to-residue model generator 442, nutrient-to-residue model generator 442 generates a predictive nutrient model. The predictive nutrient model is used by predictive nutrient map generator 452 to predict a nutrient value at different locations in the field based upon the georeferenced residue values contained in the residue map 412 corresponding to the same locations in the field. Thus, for a given location in the field, a nutrient value can be predicted at the given location based on the predictive nutrient model and the residue value, from the residue map 412, corresponding to that given location.

Nutrient-to-constituents model generator 443 identifies a relationship between nutrient value(s) detected in in-situ sensor data 430, at geographic location(s) to which the nutrient value(s), detected in the in-situ sensor data 430, correspond, and constituent value(s) from the constituents map 413 corresponding to the same geographic location(s) to which the detected nutrient value(s) correspond. Based on this relationship established by nutrient-to-constituents model generator 443, nutrient-to-constituents model generator 443 generates a predictive nutrient model. The predictive nutrient model is used by predictive nutrient map generator 452 to predict a nutrient value at different locations in the field based upon the georeferenced constituent values contained in the constituents map 413 corresponding to the same locations in the field. Thus, for a given location in the field, a nutrient value can be predicted at the given location based on the predictive nutrient model and the constituent value, from the constituents map 413, corresponding to that given location.

Nutrient-to-seeding characteristic model generator 444 identifies a relationship between nutrient value(s) detected in in-situ sensor data 430, at geographic location(s) to which the nutrient value(s), detected in the in-situ sensor data 430, correspond, and seeding characteristic value(s) from the seeding map 414 corresponding to the same geographic location(s) to which the detected nutrient value(s) correspond. Based on this relationship established by nutrient-to-seeding characteristic model generator 444, nutrient-to-seeding characteristic model generator 444 generates a predictive nutrient model. The predictive nutrient model is used by predictive nutrient map generator 452 to predict a nutrient value at different locations in the field based upon the georeferenced seeding characteristic values contained in the seeding map 414 corresponding to the same locations in the field. Thus, for a given location in the field, a nutrient value can be predicted at the given location based on the predictive nutrient model and the seeding characteristic value, from the seeding map 414, corresponding to that given location.

Nutrient-to-topographic characteristic model generator 445 identifies a relationship between nutrient value(s) detected in in-situ sensor data 430, at geographic location(s) to which the nutrient value(s), detected in the in-situ sensor data 430, correspond, and topographic characteristic value(s) from the topographic map 415 corresponding to the same geographic location(s) to which the detected nutrient value(s) correspond. Based on this relationship established by nutrient-to-topographic characteristic model generator 445, nutrient-to-topographic characteristic model generator 445 generates a predictive nutrient model. The predictive nutrient model is used by predictive nutrient map generator 452 to predict a nutrient value at different locations in the field based upon the georeferenced topographic characteristic values contained in the topographic map 415 corresponding to the same locations in the field. Thus, for a given location in the field, a nutrient value can be predicted at the given location based on the predictive nutrient model and the topographic characteristic value, from the topographic map 415, corresponding to that given location.

Nutrient-to-vegetative index model generator 446 identifies a relationship between nutrient value(s) detected in in-situ sensor data 430, at geographic location(s) to which the nutrient value(s), detected in the in-situ sensor data 430, correspond, and vegetative index value(s) from the vegetative index map 416 corresponding to the same geographic location(s) to which the detected nutrient value(s) correspond. Based on this relationship established by nutrient-to-vegetative index model generator 446, nutrient-to-vegetative index model generator 446 generates a predictive nutrient model. The predictive nutrient model is used by predictive nutrient map generator 452 to predict a nutrient value at different locations in the field based upon the georeferenced vegetative index values contained in the vegetative index map 416 corresponding to the same locations in the field. Thus, for a given location in the field, a nutrient value can be predicted at the given location based on the predictive nutrient model and the vegetative index value, from the vegetative index map 416, corresponding to that given location.

Nutrient-to-other characteristic model generator 448 identifies a relationship between nutrient value(s) detected in in-situ sensor data 430, at geographic location(s) to which the nutrient value(s), detected in the in-situ sensor data 430, correspond, and other characteristic value(s) from an other map 429 corresponding to the same geographic location(s) to which the detected nutrient value(s) correspond. Based on this relationship established by nutrient-to-other characteristic model generator 448, nutrient-to-other characteristic model generator 448 generates a predictive nutrient model. The predictive nutrient model is used by predictive nutrient map generator 452 to predict a nutrient value at different locations in the field based upon the georeferenced other characteristic values contained in the other map 429 corresponding to the same locations in the field. Thus, for a given location in the field, a nutrient value can be predicted at the given location based on the predictive nutrient model and the other characteristic value, from the other map 415, corresponding to that given location.

In light of the above, the predictive model generator 310 is operable to produce a plurality of predictive nutrient models, such as one or more of the predictive nutrient models generated by model generators 440, 441, 442, 443, 444, 445, 446, 448, and 449. In another example, two or more of the predictive models described above may be combined into a single predictive nutrient model, such as a predictive nutrient model that predicts a nutrient value based upon two or more of the soil property values, the yield values, the residue values, the constituent values, the seeding characteristic values, the topographic characteristic values, the vegetative index values, and the other characteristic values at different locations in the field. Any of these nutrient models, or combinations thereof, are represented collectively by predictive nutrient model 450 in FIG. 11.

The predictive nutrient model 450 is provided to predictive map generator 312. In the example of FIG. 11, predictive map generator 312 includes a predictive nutrient map generator 452. In other examples, predictive map generator 312 may include additional or different map generators. Thus, in some examples, predictive map generator 312 may include other items 456 which may include other types of map generators to generate other types of maps.

Predictive nutrient map generator 452 receives one or more of the soil property map 410, the yield map 411, the residue map 412, the constituents map 413, the seeding map 414, the topographic map 415, and an other map 429, along with the predictive nutrient model 450 which predicts a nutrient value based upon one or more of a soil property value, a yield value, a residue value, a constituent value, a seeding characteristic value, a topographic characteristic value, a vegetative index value, and an other characteristic value, and generates a predictive map that predicts a nutrient value at different locations in the field, such as functional predictive nutrient map 460.

Predictive map generator 312 thus outputs a functional predictive nutrient map 460 that is predictive of a nutrient value. The functional predictive nutrient map 460 is a predictive map 264. The functional predictive nutrient map 460 predicts a nutrient value at different locations in a field. The functional predictive nutrient map 460 may be provided to control zone generator 313, control system 314, or both. Control zone generator 313 generates control zones and incorporates those control zones into the functional predictive nutrient map 460 to produce a predictive control zone map 265, that is a functional predictive nutrient control zone map 461. One or both of functional predictive nutrient map 460 and functional predictive nutrient control zone map 461 may be provided to control system 314, which generates control signals to control one or more of the controllable subsystems 316 based upon the functional predictive nutrient map 460, the functional predictive nutrient control zone map 461, or both.

Figure 12:
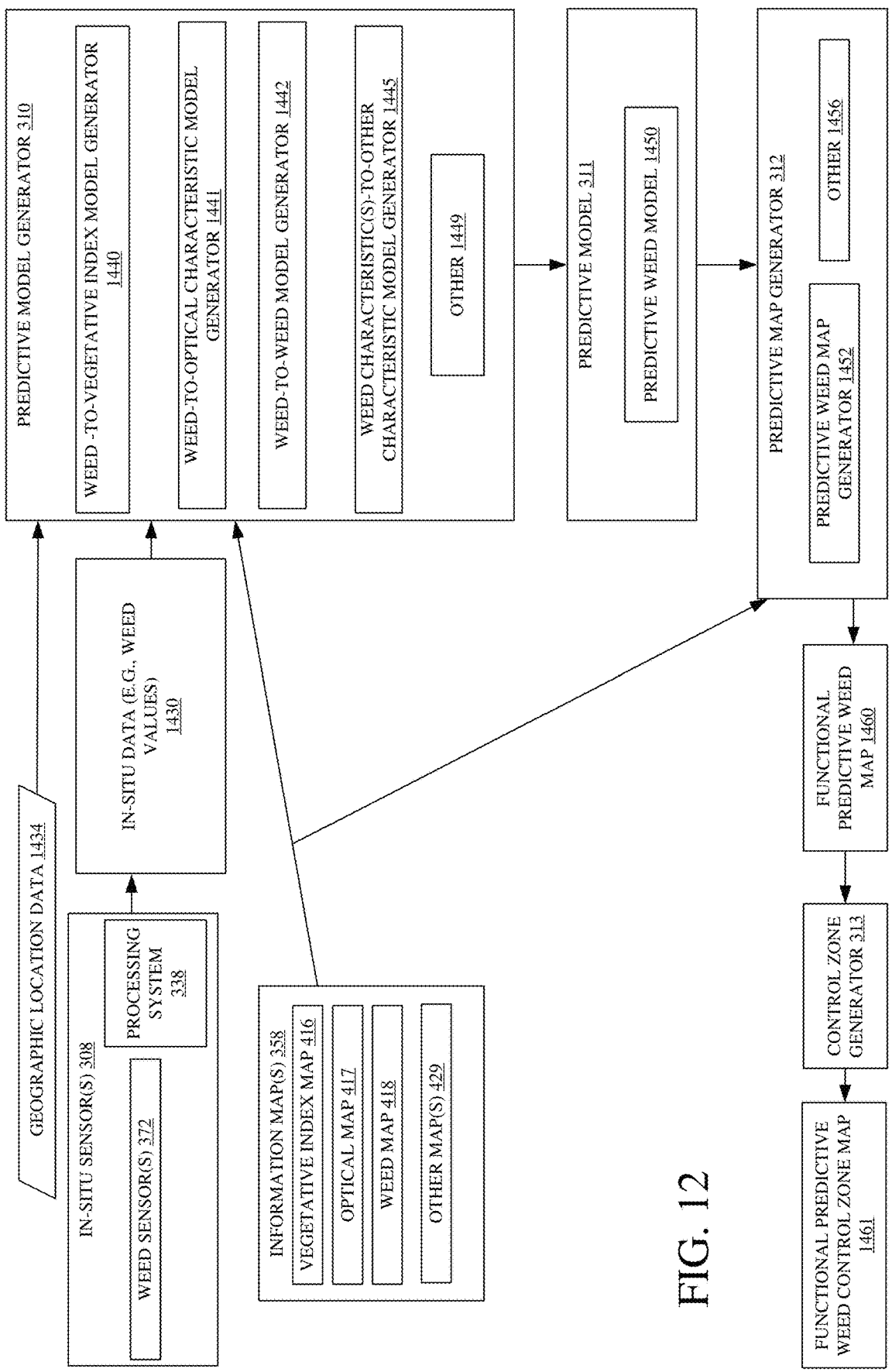
FIG. 12 is a block diagram showing one example of a predictive model generator and predictive map generator.

FIG. 12 is a block diagram of a portion of the agricultural material application system architecture 300 shown in FIG. 10. Particularly, FIG. 12 shows, among other things, examples of the predictive model generator 310 and the predictive map generator 312 in more detail. FIG. 12 also illustrates information flow among the various components shown. The predictive model generator 310 receives one or more information map(s) 358. In the example illustrated in FIG. 12, information maps 358 include one or more of a vegetative index map 416, an optical map 417, a weed map 418, or any of a wide variety of other information maps 429. Predictive model generator 310 also receives geographic location data 1434, such as an indication of a geographic location, from geographic position sensor 304. Geographic location data 1434 illustratively represents the geographic locations to which values detected by in-situ sensors 308 correspond. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, machine processing delays, sensor position (e.g., relative to geographic position sensor), sensor parameters (e.g., sensor field of view), as well as various other data, can be used to derive a geographic location at the field to which a value a detected by an in-situ sensor 308 corresponds.

In-situ sensors 308 illustratively include weed sensors 372, as well as processing system 338. In some examples, processing system 338 is separate from in-situ sensors 308 (such as the example shown in FIG. 10). In some instances, weed sensors 372 may be located on-board mobile material application machine 100. The processing system 338 processes sensor data generated from weed sensors 372 to generate processed sensor data 1430 indicative of weed values. Weed sensors 372 and processing system 338 may sense one or more visual properties of weeds including color, size, and shape. Weed sensors 372 and processing system 338 may sense plant locations relative to known crop seed or plant locations or to known weed seed or plant locations.

As shown in FIG. 12, the example predictive model generator 310 includes a weed-to-vegetative index model generator 1440, a weed-to-optical characteristic model generator 1441, a weed-to-weed model generator 1442, and a weed-to-other characteristic model generator 1445. In other examples, the predictive model generator 310 may include additional, fewer, or different components than those shown in the example of FIG. 12. Consequently, in some examples, the predictive model generator 310 may include other items 1449 as well, which may include other types of predictive model generators to generate other types of weed models.

Weed-to-vegetative index model generator 1440 identifies a relationship between weed value(s) detected in in-situ sensor data 1430, at geographic location(s) to which the weed value(s), detected in the in-situ sensor data 1430, correspond, and vegetative index value(s) from the vegetative index map 416 corresponding to the same geographic location(s) to which the detected weed value(s) correspond. Based on this relationship established by weed-to-vegetative index model generator 1440, weed-to-vegetative index model generator 1440 generates a predictive weed model. The predictive weed model is used by predictive weed map generator 1452 to predict a weed value at different locations in the field based upon the georeferenced vegetative index values contained in the vegetative index map 416 corresponding to the same locations in the field. Thus, for a given location in the field, a weed value can be predicted at the given location based on the predictive weed model and the vegetative index value, from the vegetative index map 416, corresponding to that given location.

Weed-to-optical characteristic model generator 1441 identifies a relationship between weed value(s) detected in in-situ sensor data 1430, at geographic location(s) to which the weed value(s), detected in the in-situ sensor data 1430, correspond, and optical characteristic value(s) from the optical map 417 corresponding to the same geographic location(s) to which the detected weed value(s) correspond. Based on this relationship established by weed-to-optical characteristic model generator 1441, weed-to-optical characteristic model generator 1441 generates a predictive weed model. The predictive weed model is used by predictive weed map generator 1452 to predict a weed value at different locations in the field based upon the georeferenced optical characteristic values contained in the optical map 417 corresponding to the same locations in the field. Thus, for a given location in the field, a weed value can be predicted at the given location based on the predictive weed model and the optical characteristic value, from the optical map 417, corresponding to that given location.

Weed-to-weed model generator 1442 identifies a relationship between weed value(s) detected in in-situ sensor data 1430, at geographic location(s) to which the weed value(s), detected in the in-situ sensor data 1430, correspond, and weed value(s) from the weed map 418 corresponding to the same geographic location(s) to which the detected weed value(s) correspond. Based on this relationship established by weed-to-weed model generator 1442, weed-to-weed model generator 1442 generates a predictive weed model. The predictive weed model is used by predictive weed map generator 1452 to predict a weed value at different locations in the field based upon the georeferenced weed values contained in the weed map 418 corresponding to the same locations in the field. Thus, for a given location in the field, a weed value can be predicted at the given location based on the predictive weed model and the weed value, from the weed map 418, corresponding to that given location.

Weed-to-other characteristic model generator 1445 identifies a relationship between weed value(s) detected in in-situ sensor data 1430, at geographic location(s) to which the weed value(s), detected in the in-situ sensor data 1430, correspond, and other characteristic value(s) from an other map 429 corresponding to the same geographic location(s) to which the detected weed value(s) correspond. Based on this relationship established by weed-to-other characteristic model generator 1445, weed-to-other characteristic model generator 1445 generates a predictive weed model. The predictive weed model is used by predictive weed map generator 1452 to predict a weed value at different locations in the field based upon the georeferenced other characteristic values contained in the other map 429 corresponding to the same locations in the field. Thus, for a given location in the field, a weed value can be predicted at the given location based on the predictive weed model and the other characteristic value, from the other map 429, corresponding to that given location.

In light of the above, the predictive model generator 310 is operable to produce a plurality of predictive weed models, such as one or more of the predictive weed models generated by model generators 1440, 1441, 1442, 1445, and 1449. In another example, two or more of the predictive models described above may be combined into a single predictive weed model, such as a predictive weed model that predicts a weed value based upon two or more of the vegetative index values, the optical characteristic values, the weed values, and the other characteristic values at different locations in the field. Any of these weed models, or combinations thereof, are represented collectively by predictive weed model 1450 in FIG. 12.

The predictive weed model 1450 is provided to predictive map generator 312. In the example of FIG. 12, predictive map generator 312 includes a predictive weed map generator 1452. In other examples, predictive map generator 312 may include additional or different map generators. Thus, in some examples, predictive map generator 312 may include other items 1456 which may include other types of map generators to generate other types of maps.

Predictive weed map generator 1452 receives one or more of the vegetative index map 416, the optical map 417, the weed map 418, and an other map 429, along with the predictive weed model 1450 which predicts a weed value based upon one or more of a vegetative index value, an optical characteristic value, a weed value, and an other characteristic value, and generates a predictive map that predicts a weed value at different locations in the field, such as functional predictive weed map 1460.

Predictive map generator 312 thus outputs a functional predictive weed map 1460 that is predictive of a weed value. The functional predictive weed map 1460 is a predictive map 264. The functional predictive weed map 1460 predicts a weed value at different locations in a field. The functional predictive weed map 1460 may be provided to control zone generator 313, control system 314, or both. Control zone generator 313 generates control zones and incorporates those control zones into the functional predictive weed map 1460 to produce a predictive control zone map 265, that is a functional predictive weed control zone map 1461. One or both of functional predictive weed map 1460 and functional predictive weed control zone map 1461 may be provided to control system 314, which generates control signals to control one or more of the controllable subsystems 316 based upon the functional predictive weed map 1460, the functional predictive weed control zone map 1461, or both.

Figure 13:
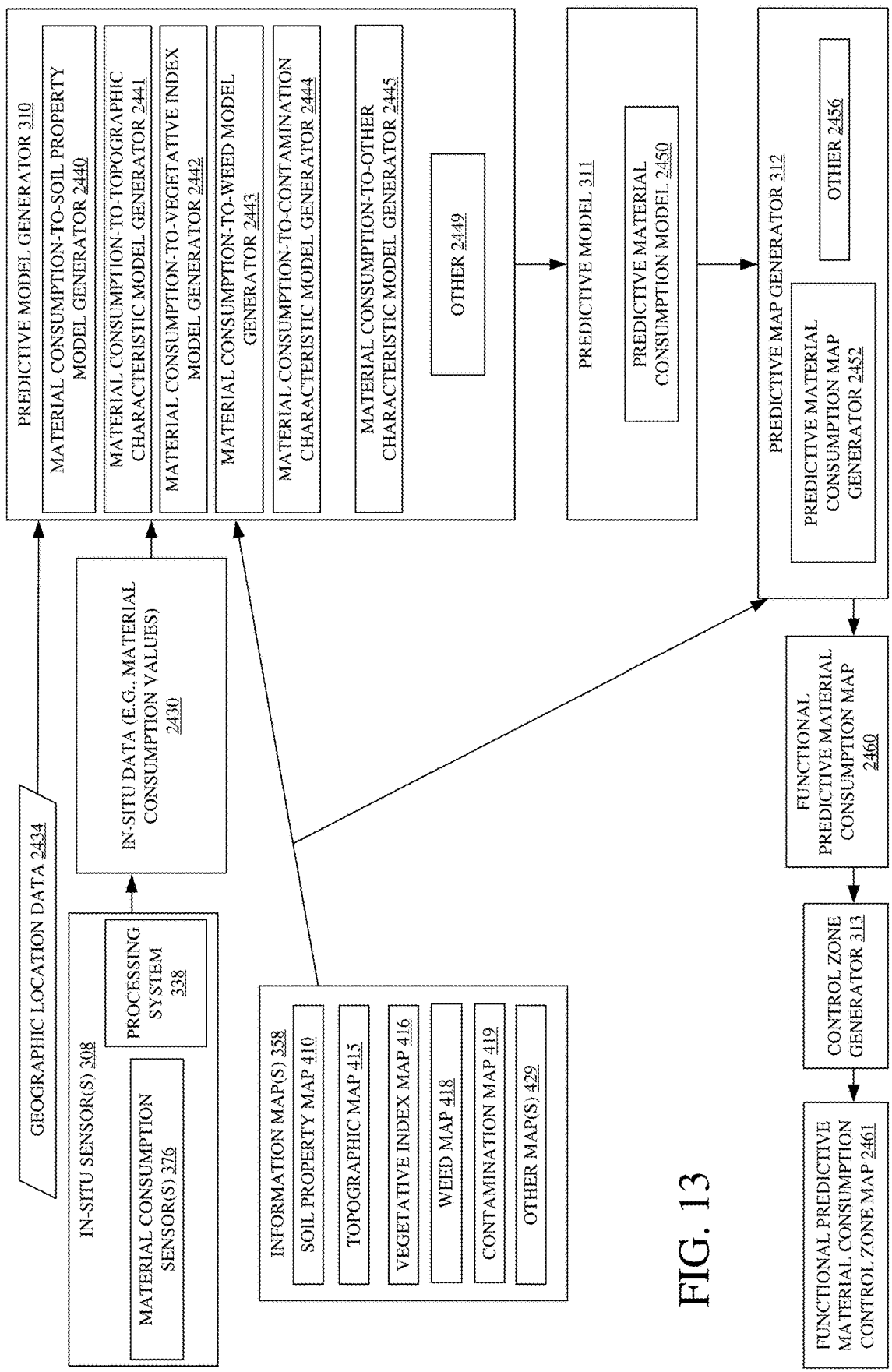
FIG. 13 is a block diagram showing one example of a predictive model generator and a predictive map generator.

FIG. 13 is a block diagram of a portion of the agricultural material application system architecture 300 shown in FIG. 10. Particularly, FIG. 13 shows, among other things, examples of the predictive model generator 310 and the predictive map generator 312 in more detail. FIG. 13 also illustrates information flow among the various components shown. The predictive model generator 310 receives one or more information map(s) 358. In the example illustrated in FIG. 13, information maps 358 include one or more of a soil property map 410, a topographic map 415, vegetative index map 416, a weed map 418, a contamination map 419, or any of a wide variety of other information maps 429. Predictive model generator 310 also receives geographic location data 2434, such as an indication of a geographic location, from geographic position sensor 304. Geographic location data 2434 illustratively represents the geographic locations to which values detected by in-situ sensors 308 correspond. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, machine processing delays, sensor position (e.g., relative to geographic position sensor), sensor parameters (e.g., sensor field of view), as well as various other data, can be used to derive a geographic location at the field to which a value a detected by an in-situ sensor 308 corresponds.

In-situ sensors 308 illustratively include material consumption sensors 376, as well as processing system 338. In some examples, processing system 338 is separate from in-situ sensors 308 (such as the example shown in FIG. 10). In some instances, material consumption sensors 376 may be located on-board mobile material application machine 100. The processing system 338 processes sensor data generated from material consumption sensors 376 to generate processed sensor data 2430 indicative of material consumption values.

As shown in FIG. 13, the example predictive model generator 310 includes a material consumption-to-soil property model generator 2440, a material consumption-to-topographic characteristic model generator 2441, a material consumption-to-vegetative index model generator 2442, a material consumption-to-weed model generator 2443, a material consumption-to-contamination model generator 2444, and a material consumption-to-other characteristic model generator 2445. In other examples, the predictive model generator 310 may include additional, fewer, or different components than those shown in the example of FIG. 13. Consequently, in some examples, the predictive model generator 310 may include other items 2449 as well, which may include other types of predictive model generators to generate other types of material consumption models.

Material consumption-to-soil property model generator 2440 identifies a relationship between material consumption value(s) detected in in-situ sensor data 2430, at geographic location(s) to which the material consumption value(s), detected in the in-situ sensor data 2430, correspond, and soil property value(s) from the soil property map 410 corresponding to the same geographic location(s) to which the detected material consumption value(s) correspond. Based on this relationship established by material consumption-to-soil property model generator 2440, material consumption-to-soil property model generator 2440 generates a predictive material consumption model. The predictive material consumption model is used by predictive material consumption map generator 2452 to predict a material consumption value at different locations in the field based upon the georeferenced soil property values contained in the soil property map 410 corresponding to the same locations in the field. Thus, for a given location in the field, a material consumption value can be predicted at the given location based on the predictive material consumption model and the soil property value, from the soil property map 410, corresponding to that given location.

Material consumption-to-topographic characteristic model generator 2441 identifies a relationship between material consumption value(s) detected in in-situ sensor data 2430, at geographic location(s) to which the material consumption value(s), detected in the in-situ sensor data 2430, correspond, and topographic characteristic value(s) from the topographic map 415 corresponding to the same geographic location(s) to which the detected material consumption value(s) correspond. Based on this relationship established by material consumption-to-topographic characteristic model generator 2441, material consumption-to-topographic characteristic model generator 2441 generates a predictive material consumption model. The predictive material consumption model is used by predictive material consumption map generator 2452 to predict a material consumption value at different locations in the field based upon the georeferenced topographic characteristic values contained in the topographic map 415 corresponding to the same locations in the field. Thus, for a given location in the field, a material consumption value can be predicted at the given location based on the predictive material consumption model and the topographic characteristic value, from the topographic map 415, corresponding to that given location.

Material consumption-to-vegetative index model generator 2442 identifies a relationship between material consumption value(s) detected in in-situ sensor data 2430, at geographic location(s) to which the material consumption value(s), detected in the in-situ sensor data 2430, correspond, and vegetative index value(s) from the vegetative index map 416 corresponding to the same geographic location(s) to which the detected material consumption value(s) correspond. Based on this relationship established by material consumption-to-vegetative index model generator 2442, material consumption-to-vegetative index model generator 2442 generates a predictive material consumption model. The predictive material consumption model is used by predictive material consumption map generator 2452 to predict a material consumption value at different locations in the field based upon the georeferenced vegetative index values contained in the vegetative index map 416 corresponding to the same locations in the field. Thus, for a given location in the field, a material consumption value can be predicted at the given location based on the predictive material consumption model and the vegetative index value, from the vegetative index map 416, corresponding to that given location.

Material consumption-to-weed model generator 2443 identifies a relationship between material consumption value(s) detected in in-situ sensor data 2430, at geographic location(s) to which the material consumption value(s), detected in the in-situ sensor data 2430, correspond, and weed value(s) from the weed map 418 corresponding to the same geographic location(s) to which the detected material consumption value(s) correspond. Based on this relationship established by material consumption-to-weed model generator 2443, material consumption-to-weed model generator 2442 generates a predictive material consumption model. The predictive material consumption model is used by predictive material consumption map generator 2452 to predict a material consumption value at different locations in the field based upon the georeferenced weed values contained in the weed map 418 corresponding to the same locations in the field. Thus, for a given location in the field, a material consumption value can be predicted at the given location based on the predictive material consumption model and the weed value, from the weed map 418, corresponding to that given location.

Material consumption-to-contamination model generator 2444 identifies a relationship between material consumption value(s) detected in in-situ sensor data 2430, at geographic location(s) to which the material consumption value(s), detected in the in-situ sensor data 2430, correspond, and contamination value(s) from the contamination map 419 corresponding to the same geographic location(s) to which the detected material consumption value(s) correspond. Based on this relationship established by material consumption-to-contamination model generator 2444, material consumption-to-contamination model generator 2444 generates a predictive material consumption model. The predictive material consumption model is used by predictive material consumption map generator 2452 to predict a material consumption value at different locations in the field based upon the georeferenced contamination values contained in the contamination map 419 corresponding to the same locations in the field. Thus, for a given location in the field, a material consumption value can be predicted at the given location based on the predictive material consumption model and the contamination value, from the contamination map 419, corresponding to that given location.

Material consumption-to-other characteristic model generator 2445 identifies a relationship between material consumption value(s) detected in in-situ sensor data 2430, at geographic location(s) to which the material consumption value(s), detected in the in-situ sensor data 2430, correspond, and other characteristic value(s) from an other map 429 corresponding to the same geographic location(s) to which the detected material consumption value(s) correspond. Based on this relationship established by material consumption-to-other characteristic model generator 2445, material consumption-to-other characteristic model generator 2445 generates a predictive material consumption model. The predictive material consumption model is used by predictive material consumption map generator 2452 to predict a material consumption value at different locations in the field based upon the georeferenced other characteristic values contained in the other map 429 corresponding to the same locations in the field. Thus, for a given location in the field, a material consumption value can be predicted at the given location based on the predictive material consumption model and the other characteristic value, from the other map 429, corresponding to that given location.

In light of the above, the predictive model generator 310 is operable to produce a plurality of predictive material consumption models, such as one or more of the predictive material consumption models generated by model generators 2440, 2441, 2442, 2443, 2444, 2445, and 2449. In another example, two or more of the predictive models described above may be combined into a single predictive material consumption model, such as a predictive material consumption model that predicts a material consumption value based upon two or more of the soil property values, the topographic characteristic values, the vegetative index values, the weed values, the contamination values, and the other characteristic values at different locations in the field. Any of these material consumption models, or combinations thereof, are represented collectively by predictive material consumption model 2450 in FIG. 13.

The predictive material consumption model 2450 is provided to predictive map generator 312. In the example of FIG. 13, predictive map generator 312 includes a predictive material consumption map generator 2452. In other examples, predictive map generator 312 may include additional or different map generators. Thus, in some examples, predictive map generator 312 may include other items 2456 which may include other types of map generators to generate other types of maps.

Predictive material consumption map generator 2452 receives one or more of the soil property map 410, the topographic map 415, the vegetative index map 416, the weed map 418, the contamination map 419, and an other map 429, along with the predictive material consumption model 2450 which predicts a material consumption value based upon one or more of a soil property value, a topographic characteristic value, a vegetative index value, a weed value, a contamination value, and an other characteristic value, and generates a predictive map that predicts a material consumption value at different locations in the field, such as functional predictive material consumption map 2460.

Predictive map generator 312 thus outputs a functional predictive material consumption map 2460 that is predictive of a material consumption value. The functional predictive material consumption map 2460 is a predictive map 264. The functional predictive material consumption map 2460 predicts a material consumption value at different locations in a field. The functional predictive material consumption map 2460 may be provided to control zone generator 313, control system 314, or both. Control zone generator 313 generates control zones and incorporates those control zones into the functional predictive material consumption map 2460 to produce a predictive control zone map 265, that is a functional predictive material consumption control zone map 2461. One or both of functional predictive material consumption map 2460 and functional predictive material consumption control zone map 2461 may be provided to control system 314, which generates control signals to control one or more of the controllable subsystems 316 based upon the functional predictive material consumption map 2460, the functional predictive material consumption control zone map 2461, or both.

Figure 14:
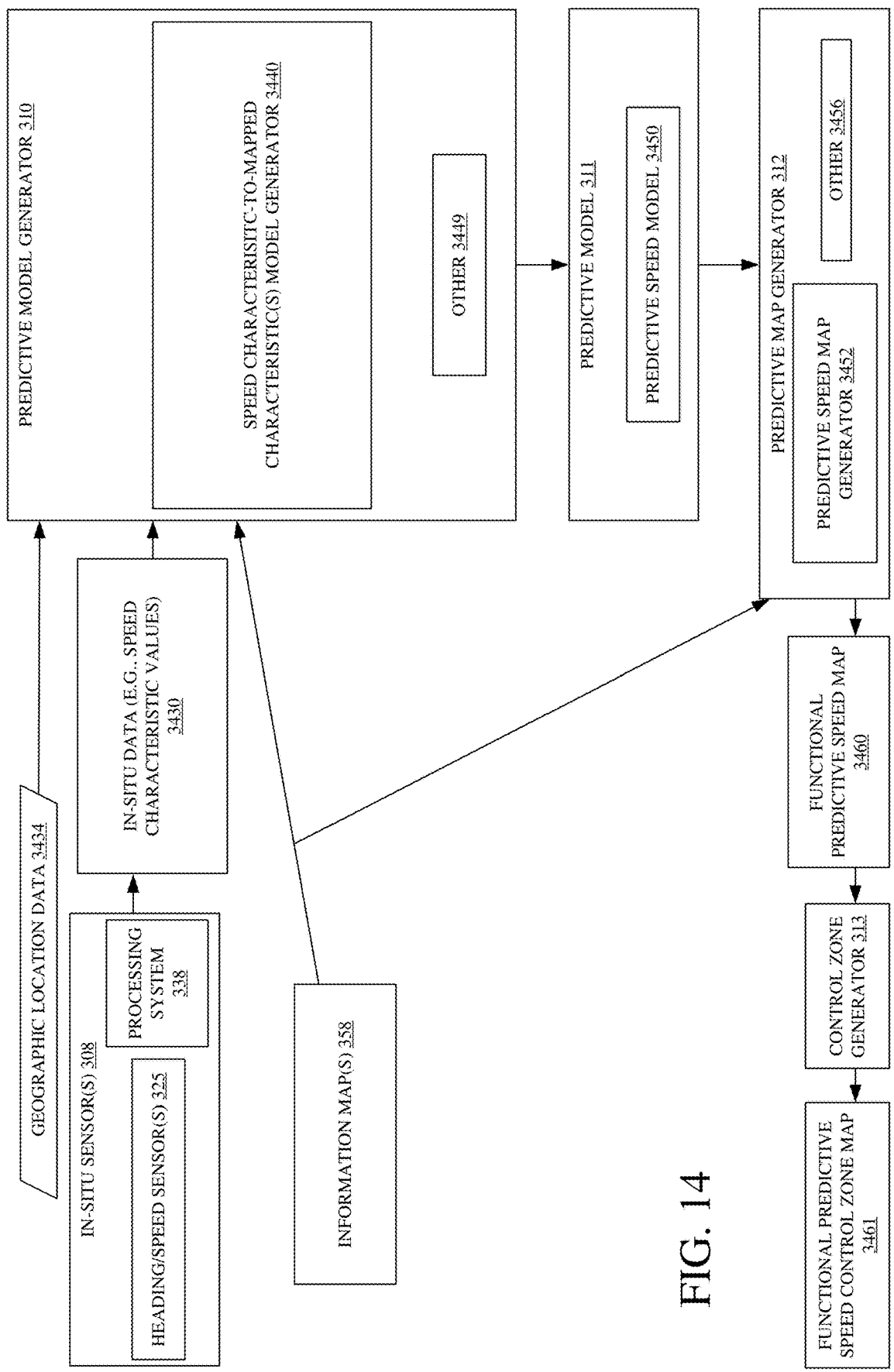
FIG. 14 is a block diagram showing one example of a predictive model generator and a predictive map generator.

FIG. 14 is a block diagram of a portion of the agricultural material application system architecture 300 shown in FIG. 10. Particularly, FIG. 14 shows, among other things, examples of the predictive model generator 310 and the predictive map generator 312 in more detail. FIG. 14 also illustrates information flow among the various components shown. The predictive model generator 310 receives one or more information map(s) 358. In the example illustrated in FIG. 14, information maps 358 can include one or more of the information maps 358 discussed herein, as well as various other types of information maps. Predictive model generator 310 also receives geographic location data 3434, such as an indication of a geographic location, from geographic position sensor 304. Geographic location data 3434 illustratively represents the geographic locations to which values detected by in-situ sensors 308 correspond. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, machine processing delays, sensor position (e.g., relative to geographic position sensor), sensor parameters (e.g., sensor field of view), as well as various other data, can be used to derive a geographic location at the field to which a value a detected by an in-situ sensor 308 corresponds.

In-situ sensors 308 illustratively include heading/speed sensors 325, as well as processing system 338. In some examples, processing system 338 is separate from in-situ sensors 308 (such as the example shown in FIG. 10). In some instances, heading/speed sensors 325 may be located on-board mobile material application machine 100. The processing system 338 processes sensor data generated from heading/speed sensors 325 to generate processed sensor data 3430 indicative of speed characteristic values.

As shown in FIG. 14, the example predictive model generator 310 includes a speed characteristic-to-mapped characteristic(s) model generator 2440. In other examples, the predictive model generator 310 may include additional, fewer, or different components than those shown in the example of FIG. 14. Consequently, in some examples, the predictive model generator 310 may include other items 3449 as well, which may include other types of predictive model generators to generate other types of speed models.

Speed characteristic-to-mapped characteristic(s) model generator 3440 identifies a relationship between speed characteristic value(s) detected in in-situ sensor data 3430, at geographic location(s) to which the speed characteristic value(s), detected in the in-situ sensor data 3430, correspond, and value(s) of one or more characteristics from the one or more information maps 358 corresponding to the same geographic location(s) to which the detected speed characteristic value(s) correspond. Based on this relationship established by speed characteristic-to-mapped characteristic(s) model generator 3440, speed characteristic-to-mapped characteristic(s) model generator 3440 generates a predictive speed model. The predictive speed model is used by predictive speed map generator 3452 to predict a speed characteristic value at different locations in the field based upon the georeferenced values of the one or more characteristics contained in the one or more information maps 358 corresponding to the same locations in the field. Thus, for a given location in the field, a speed characteristic value can be predicted at the given location based on the predictive speed model and the value of one or more characteristics, from the one or more information maps 358, corresponding to that given location.

In light of the above, the predictive model generator 310 is operable to produce a plurality of predictive speed models, such as one or more of the predictive speed models generated by model generators 3440 and 3449. In another example, two or more of the predictive models described above may be combined into a single predictive speed model, such as a predictive speed model that predicts a speed characteristic value based upon values of two or more characteristics at different locations in the field. Any of these speed models, or combinations thereof, are represented collectively by predictive speed model 3450 in FIG. 14.

The predictive speed model 3450 is provided to predictive map generator 312. In the example of FIG. 14, predictive map generator 312 includes a predictive speed map generator 3452. In other examples, predictive map generator 312 may include additional or different map generators. Thus, in some examples, predictive map generator 312 may include other items 3456 which may include other types of map generators to generate other types of maps.

Predictive speed map generator 3452 receives one or more of the information maps 358, along with the predictive speed model 3450 which predicts a speed characteristic value based upon a value of one or more characteristics, and generates a predictive map that predicts a speed characteristic value at different locations in the field, such as functional predictive speed map 3460.

Predictive map generator 312 thus outputs a functional predictive speed map 3460 that is predictive of a speed characteristic value. The functional predictive speed map 3460 is a predictive map 264. The functional predictive speed map 3460 predicts a speed characteristic value at different locations in a field. The functional predictive speed map 3460 may be provided to control zone generator 313, control system 314, or both. Control zone generator 313 generates control zones and incorporates those control zones into the functional predictive speed map 3460 to produce a predictive control zone map 265, that is a functional predictive speed control zone map 3461. One or both of functional predictive speed map 3460 and functional predictive speed control zone map 3461 may be provided to control system 314, which generates control signals to control one or more of the controllable subsystems 316 based upon the functional predictive speed map 3460, the functional predictive speed control zone map 3461, or both.

In some cases, where the mobile machine 100 is to be controlled based on a functional predictive map or a functional predictive control zone map, or both, multiple target settings for the same actuator may be possible at a given location. In that case, the target settings may have different values and may be competing. Thus, the target settings need to be resolved so that only a single target setting is used to control the actuators. For example, where the actuator is an actuator in propulsion subsystem 350 that is being controlled in order to control the speed of mobile machine 100, there may be multiple target speed settings. In such a case, control zone generator 313 may select one of the competing target settings to control the mobile machine. Thus, in generating the functional predictive control zone map that is eventually provided to the control system, operator, or user, for control of the mobile machine, control zone generator 313 may first resolve competing target settings of competing control zones. Control zone generator 313 may select the competing settings based on a number of criteria, for example, various performance metrics such as time to complete, job quality, fuel cost, labor cost, etc. may be used. There may be a hierarchy of these criteria which can be selectively adjusted, such as based on operator or user input, or based on default rankings. As an example, time to complete may be input as the highest priority in the hierarchy, and thus the target setting corresponding to time to complete will be selected. This is merely one example. In other examples, characteristics of the information maps 358 used in the generation of the functional predictive map and functional predictive control zone map may have a priority or hierarchy. For example, target settings based on yield values from a yield map may have a higher priority than target settings based on topographic values from a topographic map, and thus, the value corresponding to the yield value will be selected over the values corresponding to the topographic value. This is merely one example. In either case, it will be understood that control zone generator 313 can resolve competing target settings such that the control zone map that is generated and provided for control does not contain competing target settings.

Figure 15A:
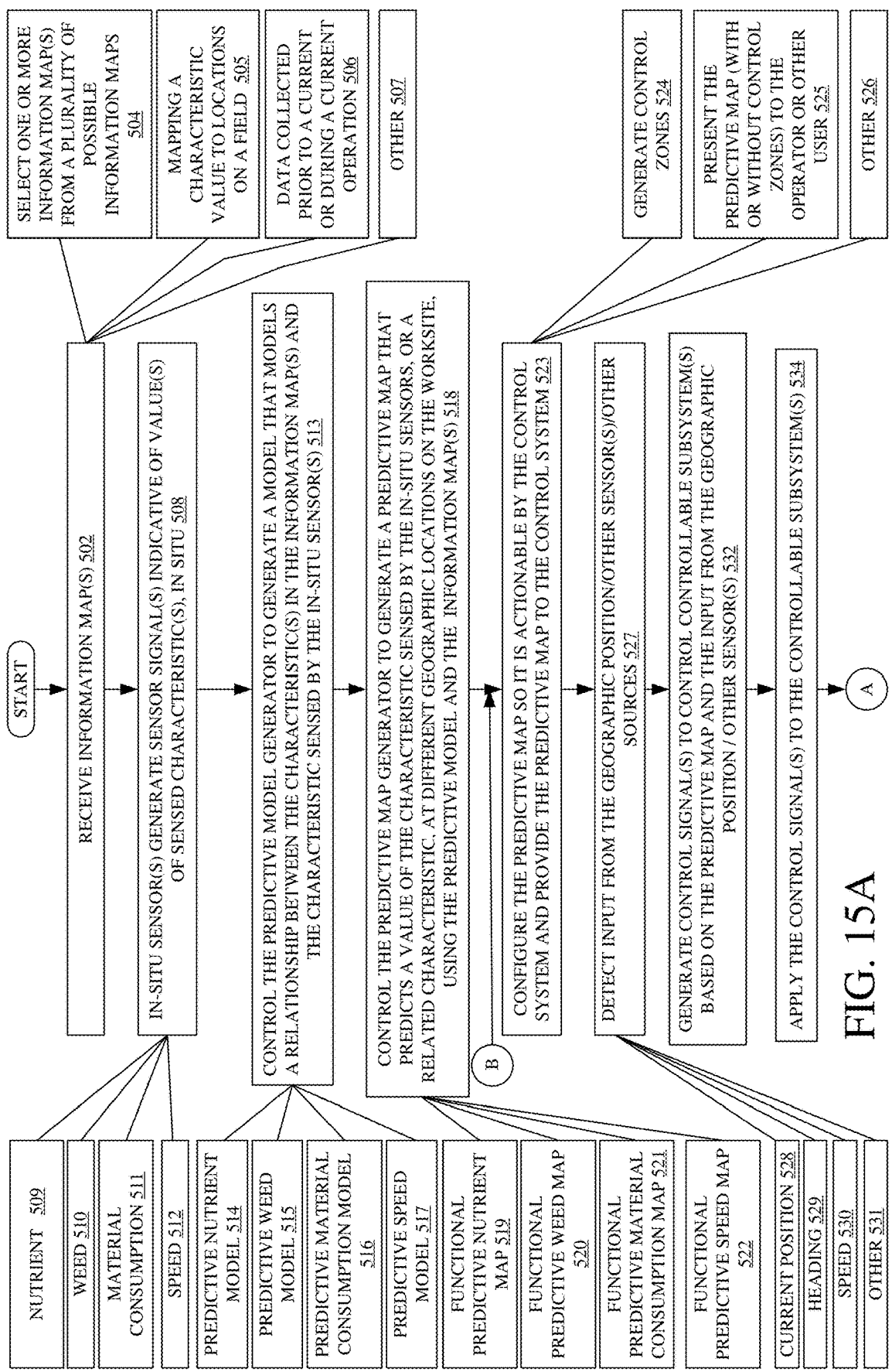
FIGS. 15A-15B (collectively referred to herein as FIG. 15) show a flow diagram illustrating one example of operation of an agricultural material application system in generating a map.
Figure 15B:
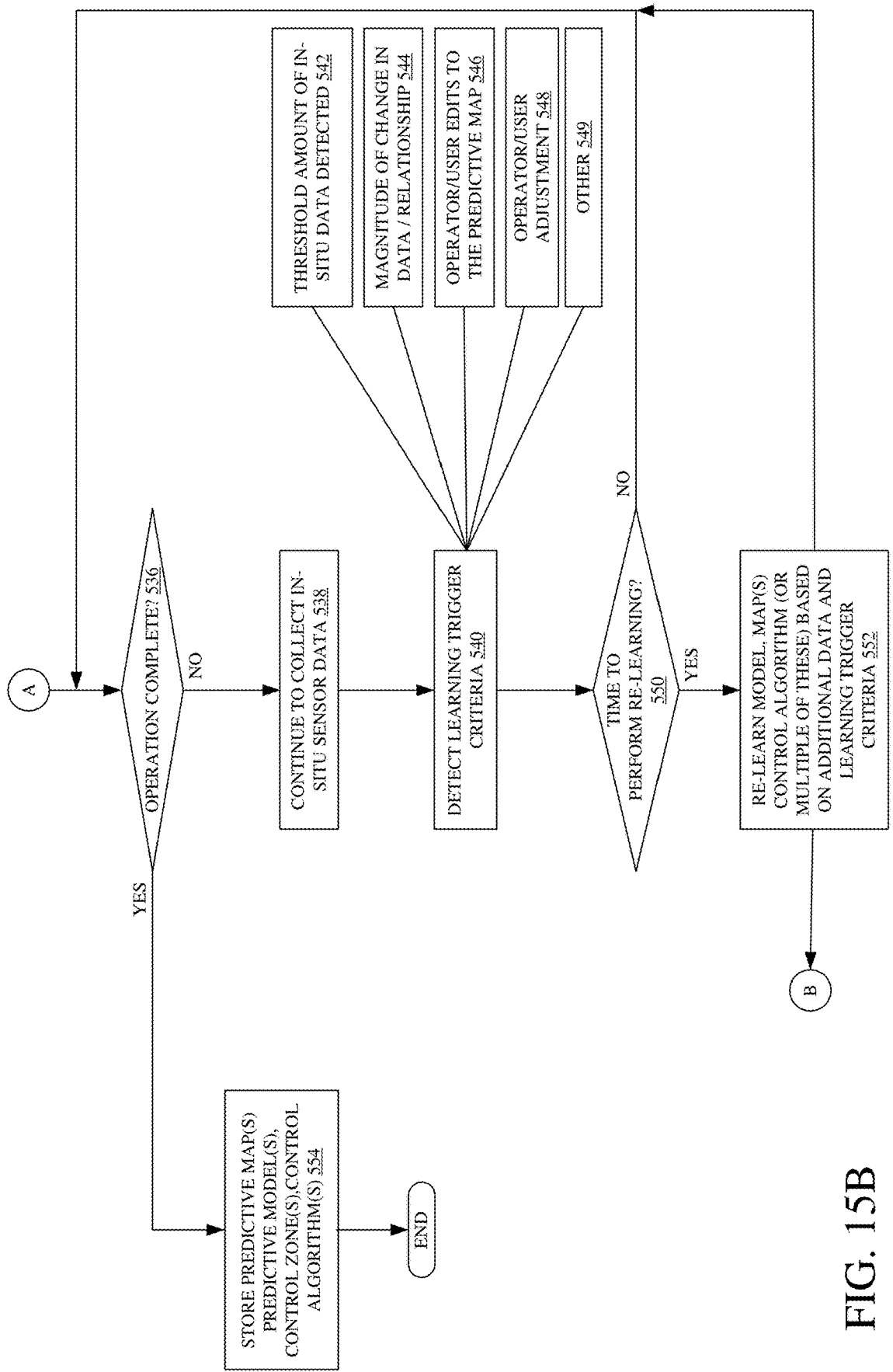

FIGS. 15A-15B (collectively referred to herein as FIG. 15) show a flow diagram illustrating one example of the operation of agricultural material application architecture 300 in generating a predictive model and a predictive map.

At block 502, agricultural material application system 300 receives one or more information maps 358. Examples of information maps 358 or receiving information maps 358 are discussed with respect to blocks 504, 505, 507, and 508. As discussed above, information maps 358 map values of a variable, corresponding to a characteristic, to different locations in the worksite, as indicated at block 505. As indicated at block 504, receiving the information maps 358 may involve selecting one or more of a plurality of possible information maps 358 that are available. For instance, one information map 358 may be a soil property map, such as soil property map 410. Another information map 358 may be a yield map, such as yield map 411. Another information map 358 may be a residue map, such as residue map 412. Another information map 358 may be a constituents map, such as constituents map 413. Another information map 358 may be a seeding map, such as seeding map 414. Another information map 358 may be a topographic map, such as topographic map 415. Another information map 358 may be a vegetative index map, such as vegetative index map 416. Another information map 358 may be an optical map, such as optical map 417. Another information map 358 may be a weed map, such as weed map 418. Another information map 358 may be a contamination map, such as contamination map 419. Information maps 358 may include various other types of information maps that map various other characteristics, such as other maps 429.

The process by which one or more information maps 358 are selected can be manual, semi-automated, or automated. The information maps 358 can be based on data collected prior to a current operation, as indicated by block 506. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. In other examples, and as described above, the information maps 358 may be predictive maps having predictive values. The predictive information map 358 can be generated during a current operation by predictive map generator 312 based on a model generated by predictive model generator 310, as indicated by block 506. The predictive information map 358 can be predicted in other ways (before or during the current operation), such as based on other measured values. The data for the information maps 358 can be obtained by predictive model generator 310 and predictive map generator 312 using communication system 306 and stored in data store 302. The data for the information maps 358 can be obtained by material application system 300 using a communication system in other ways as well, and this is indicated by block 507 in the flow diagram of FIG. 15.

As material application machine 100 is operating, in-situ sensors 308 generate sensor data indicative of one or more in-situ data values indicative of one or more characteristics, as indicated by block 508. For example, nutrient sensors 374 generate sensor data indicative of one or more in-situ nutrient values as indicated by block 509. Weed sensors 372 generate sensor data indicative of one or more in-situ weed values as indicated by block 510. Material consumption sensors 376 generate sensor data indicative of one or more in-situ material consumption values as indicated by block 511. Heading/speed sensors 325 generate sensor data indicative of one or more in-situ speed characteristic values as indicated by block 512. In some examples, data from in-situ sensors 308 is georeferenced using position data from geographic position sensor 304 as well as, in some examples, one or more of heading data, travel speed data, machine latency data, sensor position and parameter data, as well as various other data.

At block 513, predictive model generator 310 controls one or more model generators to generate one or more models that model the relationship between mapped values and values sensed by in-situ sensors 308.

For instance, in one example, predictive model generator 310 controls one or more of the model generators 441, 442, 443, 444, 445, 446, 448, and 449 to generate a predictive nutrient model that models the relationship between the mapped values, such as one or more of the soil property values, the yield values, the residue values, the constituent values, the seeding characteristic values, the topographic characteristic values, the vegetative index values, and the other characteristic values contained in the respective information map and the in-situ nutrient values sensed by in-situ sensors 308. Predictive model generator 310 thus generates a predictive nutrient model, such as predictive nutrient model 450, as indicated by block 514.

In another example, predictive model generator controls one or more of the model generators 1440, 1441, 1442, 1445, and 1449 to generate a predictive weed model that models the relationship between the mapped values, such as one or more of the vegetative index values, the optical characteristic values, the weed values, and the other characteristic values contained in the respective information map and the in-situ weed values sensed by in-situ sensors 308. Predictive model generator 310 thus generates a predictive weed model, such as predictive weed model 1450, as indicated by block 515.

In another example, predictive model generator controls one or more of the model generators 2440, 2441, 2442, 2443, 2444, 2445, and 2449 to generate a predictive material consumption model that models the relationship between the mapped values, such as one or more of the soil property values, the topographic characteristic values, the vegetative index values, the weed values, the contamination values, and the other characteristic values contained in the respective information map and the in-situ material consumption values sensed by the in-situ sensors 308. Predictive model generator 310 thus generates a predictive material consumption model, such as predictive material consumption model 2450, as indicated by block 516.

In another example, predictive model generator controls one or more of the model generators 3440 and 3449 to generate a predictive speed model that models the relationship between mapped values, such as values of one or more characteristics in one or more information maps 358, and the in-situ speed characteristic values sensed by in-situ sensors 308. Predictive model generator 310 thus generates a predictive speed model, such as predictive speed model 3450, as indicated by block 517.

The relationship(s) or model(s) generated by predictive model generator 310 are provided to predictive map generator 312.

Predictive map generator 312, at block 518, controls one or more predictive map generators to generate one or more functional predictive maps based on the relationship(s) or model(s) generated by predictive model generator 310 and one or more of the information maps 358.

For instance, in one example, predictive map generator 312 controls predictive nutrient map generator 452 to generate a predictive nutrient map, such as functional predictive nutrient map 460, that predicts nutrient values (or sensor value(s) indictive of nutrient values) at different geographic locations in a worksite at which material application machine 100 is operating using the predictive nutrient model 450 and one or more of the information maps 358, such as one or more of soil property map 410, yield map 411, residue map 412, constituents map 413, seeding map 414, topographic map 415, vegetative index map 416, and an other map 429. Generating a predictive nutrient map, such as functional predictive nutrient map 460 is indicated by block 519.

It should be noted that, in some examples, the functional predictive nutrient map 460 may include two or more different map layers. Each map layer may represent a different data type, for instance, a functional predictive nutrient map 460 that provides two or more of a map layer that provides predictive nutrient values based on soil property values from soil property map 410, a map layer that provides predictive nutrient values based on yield values from yield map 411, a map layer that provides predictive nutrient values based on residue values from residue map 412, a map layer that provides predictive nutrient values based on constituent values from constituents map 413, a map layer that provides predictive nutrient values based on seeding characteristic value from seeding map 414, a map layer that provides predictive nutrient values based on topographic characteristic values from topographic map 415, a map layer that provides predictive nutrient values based on vegetative index values from vegetative index map, and a map layer that provides predictive nutrient values based on other characteristic values from an other map 429. In some examples, the functional predictive nutrient map 460 may include a map layer that provides predictive nutrient values based on two or more of soil property values from soil property map 410, yield values from yield map 411, residue values from residue map 412, constituent values from constituents map 413, seeding characteristic values from seeding map 414, topographic characteristic values from topographic map 415, vegetative index values from vegetative index map 416, and other characteristic values from an other map 429.

In one example, predictive map generator 312 controls predictive weed map generator 1452 to generate a predictive weed map, such as functional predictive weed map 1460, that predicts weed values (or sensor value(s) indictive of weed values) at different geographic locations in a worksite at which material application machine 100 is operating using the predictive weed model 1450 and one or more of the information maps 358, such as one or more of vegetative index map 416, optical map 417, weed map 418, and an other map 429. Generating a predictive weed map, such as functional predictive weed map 1460 is indicated by block 520.

It should be noted that, in some examples, the functional predictive weed map 1460 may include two or more different map layers. Each map layer may represent a different data type, for instance, a functional predictive weed map 1460 that provides two or more of a map layer that provides predictive weed values based on vegetative index values from vegetative index map 416, a map layer that provides predictive weed values based on optical characteristic values from optical map 417, a map layer that provides predictive weed values based on weed values from weed map 418, and a map layer that provides predictive weed values based on other characteristic values from an other map 429. In some examples, the functional predictive weed map 1460 may include a map layer that provides predictive weed values based on two or more of vegetative index values from vegetative index map 416, optical characteristic values from optical map 417, weed values from weed map 418, and other characteristic values from an other map 429.

In one example, predictive map generator 312 controls predictive material consumption map generator 2452 to generate a predictive material consumption map, such as functional predictive material consumption map 2460, that predicts material consumption values (or sensor value(s) indictive of material consumption values) at different geographic locations in a worksite at which material application machine 100 is operating using the predictive material consumption model 2450 and one or more of the information maps 358, such as one or more of soil property map 410, topographic map 415, vegetative index map 416, weed map 418, contamination map 419, and an other map 429. Generating a predictive material consumption map, such as functional predictive material consumption map 2460 is indicated by block 521.

It should be noted that, in some examples, the functional predictive material consumption map 2460 may include two or more different map layers. Each map layer may represent a different data type, for instance, a functional predictive material consumption map 2460 that provides two or more of a map layer that provides predictive material consumption values based on soil property values from soil property map 410, a map layer that provides predictive material consumption values based on topographic characteristic values from topographic map 415, a map layer that provides predictive material consumption values based on vegetative index values from vegetative index map 416, a map layer that provides predictive material consumption values based on weed values from weed map 418, a map layer that provides predictive material consumption values based on contamination values from contamination map 419, and a map layer that provides predictive material consumption values based on other characteristic values from an other map 429. In some examples, the functional predictive material consumption map 2460 may include a map layer that provides predictive material consumption values based on two or more of soil property values from soil property map 410, topographic characteristic values from a topographic map 415, vegetative index values from vegetative index map 416, weed values from weed map 418, contamination values from contamination map 419, and other characteristic values from an other map 429.

In one example, predictive map generator 312 controls predictive speed map generator 3452 to generate a predictive speed map, such as functional predictive speed map 3460, that predicts speed characteristic values (or sensor value(s) indictive of speed characteristic values) at different geographic locations in a worksite at which material application machine 100 is operating using the predictive speed model 3450 and one or more of the information maps 358. Generating a predictive speed map, such as functional predictive speed map 3460 is indicated by block 522.

It should be noted that, in some examples, the functional predictive speed map 2460 may include two or more different map layers. Each map layer may represent a different data type, for instance, a functional predictive material consumption map 2460 that provides two or more map layers, each map layer providing predictive speed characteristic values based on a respective characteristic, for instance a map layer that provides predictive speed characteristic values based on values of a first characteristic from a first information map 358 and a map layer that provides predictive speed characteristic values based on values of a second characteristic from a second information map 358. In some examples, the functional predictive speed map 3460 may include a map layer that provides predictive speed characteristic values based on values of two or more characteristics, such as a map layer that provides predictive speed characteristic values based on values of a first characteristic from a first information map 358 and values of a second characteristic from a second information map 358.

At block 523, predictive map generator 312 configures the functional predictive map(s) (e.g., one or more of 460, 1460, 2460, and 3460) so that the functional predictive map(s) are actionable (or consumable) by control system 314. Predictive map generator 312 can provide the functional predictive map(s) to the control system 314 or to control zone generator 313, or both. Some examples of the different ways in which the functional predictive map(s) (e.g., one or more of 460, 1460, 2460, and 3460) can be configured or output are described with respect to blocks 523, 524, 525, and 526. For instance, predictive map generator 312 configures one or more of the functional predictive maps so that the one or more functional predictive maps include values that can be read by control system 314, and used as the basis for generating control signals for one or more of the different controllable subsystems 316, as indicated by block 523.

At block 524, control zone generator 313 can divide the functional predictive maps into control zones based on the values on the functional predictive maps to generated functional predictive maps with control zones. In one example, control zone generator 313 can divide the functional predictive nutrient map 460 into control zones based on the values on the functional predictive nutrient map 460 to generate functional predictive nutrient control zone map 461. In another example, control zone generator 313 can divide the functional predictive weed map 1460 into control zones based on the values on the functional predictive weed map 1460 to generate functional predictive weed control zone map 1461. In another example, control zone generator 313 can divide the functional predictive material consumption map 2460 into control zones based on the values on the functional predictive material consumption map 2460 to generate functional predictive material consumption control zone map 2461. In another example, control zone generator 313 can divide the functional predictive speed map 3460 into control zones based on the values on the functional predictive seed map 3460 to generate functional predictive speed control zone map 3461.

Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system, the controllable subsystems, based on wear considerations, or on other criteria.

At block 525, predictive map generator 312 configures one or more of the functional predictive maps (e.g., one or more of 460, 1460, 2460, and 3460) or one or more of the functional predictive control zone maps (e.g., one or more of 461, 1461, 2461, and 3461), or both, for presentation to an operator or other user. When presented to an operator or other user, the presentation of the one or more functional predictive maps or of the one or more functional predictive control zone maps, or both, may contain one or more of the predictive values on the one or more functional predictive maps correlated to geographic location, the control zones of the one or more functional predictive control zone maps correlated to geographic location, and settings values or control parameters that are used based on the predicted values on the one or more functional predictive maps or control zones on the one or more functional predictive control zone maps. The presentation can, in another example, include more abstracted information or more detailed information. The presentation can also include a confidence level that indicates an accuracy with which the predictive values on the one or more functional predictive maps or the control zones on the one or more predictive control zone maps, or both, conform to measured values that may be measured by sensors on material application machine 100 as material application machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of material application machine 100 may be unable to see the information corresponding to the one or more functional predictive maps or the one or more functional predictive control zone maps, or both, or make any changes to machine operation. A supervisor, such as a supervisor at a remote location, however, may be able to see the one or more functional predictive maps or the one or more functional predictive control zone maps, or both, on the display but be prevented from making any changes. A manager, who may be at a separate remote location, may be able to see all of the elements on the one or more functional predictive maps or the one or more functional predictive control zone maps, or both, and also be able to change the one or more functional predictive maps or the one or more functional predictive control zone maps, or both. In some instances, the one or more functional predictive maps or the one or more functional predictive control zone maps, or both, accessible and changeable by a manager located remotely may be used in machine control. This is one example of an authorization hierarchy that may be implemented. The one or more functional predictive maps or the one or more functional predictive control zone maps, or both, can be configured in other ways as well, as indicated by block 526.

At block 527, input from geographic position sensor 304 and other in-situ sensors 308 are received by the control system 314. Particularly, at block 528, control system 314 detects an input from the geographic position sensor 304 identifying a geographic location of material application machine 100. Block 529 represents receipt by the control system 314 of sensor inputs indicative of trajectory or heading of material application machine 100, and block 530 represents receipt by the control system 314 of a speed of material application machine 100. Block 531 represents receipt by the control system 314 of other information from various in-situ sensors 308.

At block 532, control system 314 generates control signals to control the controllable subsystems 316 (or to other items) based on the one or more functional predictive maps (e.g., one or more of 460, 1460, 2460, and 3460) or the one or more functional predictive control zone maps (e.g., one or more of 461, 1461, 2461, and 3461), or both, and the input from the geographic position sensor 304 and any other in-situ sensors 308. At block 534, control system 314 applies the control signals to the controllable subsystems 316 (or to other items). It will be appreciated that the particular control signals that are generated, and the particular controllable subsystems 316 (or other items) that are controlled, may vary based upon one or more different things. For example, the control signals that are generated and the controllable subsystems 316 (or other items) that are controlled may be based on the type(s) of the functional predictive map(s) or the functional predictive control zone map(s), or both, that is being used. Similarly, the control signals that are generated and the controllable subsystems 316 (or other items) that are controlled and the timing of the control signals can be based on various latencies of material application machine 100 and the responsiveness of the controllable subsystems 316 (or other items).

As an example, communication system controller 329 can provide control signals to control communication system 306 based on the functional predictive map(s) or the functional predictive control zone map(s), or both. For instance, communication system controller can provide control signals to control communication system 306 to communicate the functional predictive map(s) or functional predictive control zone map(s), or both, or data based thereon to other items of material application system 300.

As another example, interface controller 330 can generate control signals to control an interface mechanism, such as an operator interface mechanism 318 or a user interface mechanisms 364, or both, based on or indicative of the functional predictive map(s) or functional predictive control zone map(s), such as to display the functional predictive map(s) or the functional predictive control zone map(s), or both.

As another example, material application controller 331 can generate control signals to control one or more material application actuators 340 to control application of material (e.g., the amount of material that is applied, whether or not material is applied, etc.) based on the functional predictive map(s) or the functional predictive control zone map(s), or both.

As another example, propulsion controller 334 can generate control signals to control propulsion subsystem 350 to control a speed characteristic (e.g., a travel speed, an acceleration, a deceleration, etc.) of material application machine 100 based on the functional predictive map(s) or the functional predictive control zone map(s), or both.

As another example, path planning controller 335 can generate control signals to control steering subsystem 352 to control a heading of material application machine 100 based on the functional predictive map(s) or the functional predictive control zone map(s), or both.

As another example, logistics module 315 can generate logistics control signals to control one or more controllable subsystems 316 or various other items of material application system 300 based on the functional predictive map(s) or the functional predictive control zone map(s), or both. Logistics module 315 will be discussed in more detail in FIGS. 16-17.

These are merely some examples. Control system 314 can generate any of a number of control signals to control any of a number of items of material application system 300.

At block 536, a determination is made as to whether the operation has been completed. If the operation is not completed, the processing advances to block 538 where in-situ sensor data from geographic position sensor 304 and in-situ sensors 308 (and perhaps other sensors) continue to be read and further generation and application of control signals can be performed based on the inputs at block 538 and functional predictive map(s) or the functional predictive control zone map(s), or both.

In some examples, at block 540, material application system 300 can also detect learning trigger criteria to perform machine learning on one or more of the one or more functional predictive maps (e.g., one or more of 460, 1460, 2460, and 3460), the one or more functional predictive control zone maps (e.g., one or more of 461, 1461, 2461, and 3461), the one or more predictive models (e.g., one or more of 450, 1450, 2450, and 3450), the one or more zones generated by control zone generator 313, the one or more control algorithms implemented by the controllers in the control system 314, and other triggered learning.

The learning trigger criteria can include any of a wide variety of different criteria. Some examples of detecting trigger criteria are discussed with respect to blocks 542, 544, 546, 548, and 549. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold trigger or causes the predictive model generator 310 to generate a new predictive model that is used by predictive map generator 312. Thus, as material application machine 100 continues an operation, receipt of the threshold amount of in-situ sensor data from the in-situ sensors 308 triggers the creation of a new relationship represented by one or more new predictive models generated by predictive model generator 310. Further, one or more new functional predictive maps, one or more new functional predictive control zone maps, or both, can be generated using the respective one or more new predictive models. Block 542 represents detecting a threshold amount of in-situ sensor data used to trigger creation of one or more new predictive models.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then one or more new predictive models are not generated by the predictive model generator 310. As a result, the predictive map generator 312 does not generate one or more new functional predictive maps, one or more new functional predictive control zone maps, or both. However, if variations within the in-situ sensor data are outside of the selected range, are greater than the defined amount, or are above the threshold value, for example, then the predictive model generator 310 generates one or more new predictive models using all or a portion of the newly received in-situ sensor data that the predictive map generator 312 uses to generate one or more new functional predictive maps which can be provided to control zone generator 313 for the creation of one or more new functional predictive control zone maps. At block 544, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of one or more new predictive models, one or more new functional predictive maps, and one or more new functional predictive control zone maps. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of material application machine 100 to a different topography, a different control zone, a different region of the worksite, a different area with different grouped characteristics (such as a different crop genotype area) may be used as learning trigger criteria as well.

In some instances, an operator 360 or user 366 can also edit the functional predictive map(s) or functional predictive control zone map(s), or both. The edits can change a value on the functional predictive map(s), change a size, shape, position, or existence of a control zone on functional predictive control zone map(s), or both. Block 546 shows that edited information can be used as learning trigger criteria.

In some instances, it may also be that an operator 360 or user 366 observes that automated control of a controllable subsystem, is not what the operator or user desires. In such instances, the operator 360 or user 366 may provide a manual adjustment to the controllable subsystem reflecting that the operator 360 or user 366 desires the controllable subsystem to operate in a different way than is being commanded by control system 314. Thus, manual alteration of a setting by the operator or user can cause one or more of predictive model generator 310 to relearn one or more predictive models, predictive map generator 312 to generate one or more new functional predictive maps, control zone generator 313 to generate one or more new control zones on one or more functional predictive maps, and a control system to relearn a control algorithm or to perform machine learning on one or more of the controllers in the control system based upon the adjustment by the operator or user, as shown in block 548. Block 549 represents the use of other triggered learning criteria.

In other examples, relearning may be performed periodically or intermittently based, for example, upon a selected time interval such as a discrete time interval or a variable time interval, as indicated by block 550.

If relearning is triggered, whether based upon learning trigger criteria or based upon passage of a time interval, as indicated by block 550, then one or more of the predictive model generator 310, predictive map generator 312, control zone generator 313, control system 314 performs machine learning to generate new predictive model(s), new functional predictive map(s), new control zone(s), and new control algorithm(s), respectively, based upon the learning trigger criteria. The new predictive model(s), the new functional predictive map(s), the new control zone(s), and the new control algorithm(s) are generated using any additional data that has been collected since the last learning operation was performed. Performing relearning is indicated by block 552.

If the operation has been completed, operation moves from block 552 to block 554 where one or more of the functional predictive map(s), the functional predictive control zone map(s), the predictive model(s), the control zone(s), and the control algorithm(s) are stored. The functional predictive map(s), the functional predictive control zone map(s), the predictive model(s), the control zone(s), and the control algorithm(s) may be stored locally on a data store of a machine or stored remotely for later use.

If the operation has not been completed, operation returns to block 523 such that the new functional predictive map(s), the new functional predictive control zone map(s), the new control zone(s), and/or the new control algorithm(s) can be used to control the material application machine 100 or other items of material application system 300, or both.

Figure 16:
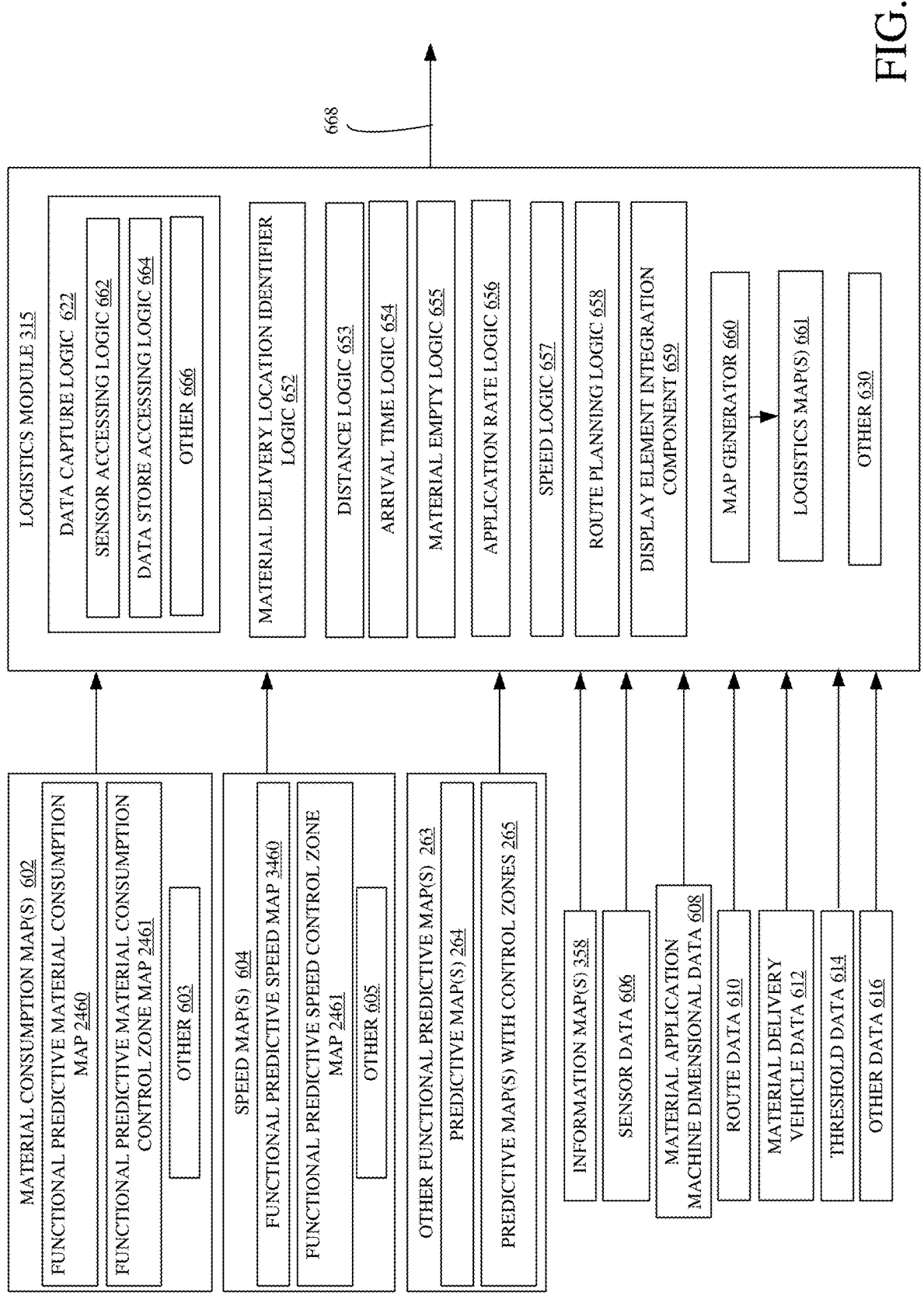
FIG. 16 is a block diagram showing one example of a logistics system in more detail.

FIG. 16 is a block diagram of a portion of agricultural material application system 300 shown in FIG. 10, in more detail. Particularly, FIG. 16 shows examples of the logistics module 315 in more detail. FIG. 16 also illustrates information flow among the various components shown.

As illustrated in FIG. 16, logistics module 315 receives one or more material consumption maps 602, one or more speed maps 604, one or more functional predictive maps 263, one or more information maps 358, sensor data 606, material application machine dimensional data 608, route data 610, material delivery vehicle data 612, threshold data 614, and various other data 616, such as, but not limited to, other operator or user inputs.

Material consumption maps 602 can include functional predictive material consumption map 2460, functional predictive material consumption control zone map 2461, as well as other material consumption maps 603, such as other types of predictive material consumption maps or prescriptive material consumption maps.

Speed maps 604 can include functional predictive speed map 3460, functional predictive speed control zone map 3461, as well as other speed maps 605, such as other types of predictive speed maps or prescriptive speed maps.

Functional predictive maps 263, in the example illustrated in FIG. 16, can include predictive maps 264, such as functional predictive nutrient map 460 or functional predictive weed map 1460, and predictive maps with control zones 265, such as functional predictive nutrient control zone map 461 or functional predictive weed control zone map 1461.

Information maps 358 can include any of the information maps 358 discussed herein as well as various other information maps that map values of various other characteristics. For example, information maps 358 can also include prescriptive material application maps. A prescriptive material application map can be used in the control of machine 100 at the field. A prescriptive material application map various machine settings values, such as material application settings (e.g., material application rate settings) across different geographic locations in a field of interest.

Sensor data 606 includes data generated by or derived from in-situ sensors 308.

Material application machine dimensional data 608 can include data indicative of the volumetric capacity or weight capacity of the material containers of material application machine 100 (e.g., tanks 107, tanks 110, tanks 112, tanks 234, tanks 255, etc.). Material application machine dimensional data 608 may also include the width of a towed implement, a spray boom, a spray nozzle coverage pattern, a spreader throw zone, or any other width associated with material application perpendicular to the direction of travel of the material application machine 100.

Route data 610 can include data indicative of a planned or prescribed route of material application machine 100 at the field, including data indicative of the route already travelled. Route data 610 can also include data indicative of a route from a location at which a material delivery vehicle 379 is located to the field or to a particular location on the field. In some examples, the route data 610 may be input or provided by an operator or user. In some examples, route data 610 may be output by control system 314, such as by path planning controller 335. In some examples, the route data 610 may be in the form of an information map 358, such as a route map that maps a planned or prescribed route of material application machine 100 at the field.

Material delivery vehicle data 612 can include data indicative of a location of a material delivery vehicle 379, a heading or speed, or both of material delivery vehicle 363, as well as various other data. Material delivery vehicle 379 may have on-board sensors that provide such data which can be provided to logistics module 315 over network 359.

Threshold data 614 includes data indicative of various thresholds, such as threshold material empty levels, as well as various other thresholds. Such threshold data can be provided by an operator or user or otherwise generated by control system 314.

Preferred material delivery location data 615 includes data indicative of preferred or commanded material delivery location(s). That is, location(s) at the worksite where the material delivery vehicle 363 and the material application machine 100 are to be located to perform a material delivery operation. Such locations could include, for example, headlands, ends of rows, outside of the area of the field where material is to be applied, near a field entrance, as well as various other locations.

Other data 616 can include any of a wide variety of other data, including, but not limited to, various other data provided by operator or user input.

It will be noted that the various data can be stored in a data store, such as data store 302, or a data store at a different location.

As illustrated in FIG. 16, logistics module 315 includes data capture logic 622, material delivery location identifier logic 652, distance logic 653, arrival time logic 654, material empty logic 655, application rate logic 656, speed logic 657, route planning logic 658, display element integration component 659, map generator 660, and can include other items 630 as well. Data capture logic 622, itself, includes sensor accessing logic 662, data store accessing logic 664, and can include other items 666 as well. Data capture logic 622 captures or obtains data that can be used by other items of logistics module 315. Sensor accessing logic 662 can be used by logistics module 315 to obtain or otherwise access sensor data (or values indicative of the sensed variables/characteristics) provided from in-situ sensors 308. Additionally, data store accessing logic 664 can be used by logistics module 315 to obtain or access data stored on data stores, such as data store 302 or other data stores. Upon obtaining the various data, logistics module 315 generates logistics outputs 668 which can be used in the control of material application machine 100 or other items of material application system 300.

Material empty logic 655 illustratively identifies geographic locations at the field, along the route of material application machine 100, at which one or more material containers of material application machine 100 will be empty or will be empty to a threshold level. Material empty logic 655 can determine the location at which one or more material containers will be empty or empty to a threshold level based on a material consumption map 602, as well as various other data, such as route data 610 and sensor data 606. For instance, material empty logic 655 can identify a current fill level of one or more containers based on sensor data from in-situ sensors (e.g., fill level sensors 117, 177, 178, 271, etc.), a current location of material application machine 100 (e.g., as indicated by geographic position sensor 304), a current heading of material application machine 100 (e.g., as indicated by heading/speed sensor 325) and can aggregate the material consumption values (e.g., predictive material consumption values), as indicated by a material consumption map 602, along the route of material application machine 100 (as indicated by route data 610) to identify the location at which one or more material containers of material application machine 100 will be empty or empty to a threshold level. For instance, it may be that it is desirable to only allow the material application machine to become empty to a threshold level, rather than completely empty to reduce the risk of operating over ground without applying material.

In other examples, instead of using a material consumption map 602, material empty logic 655 may utilize other types of maps. For instance, logistics module 315 may receive a functional predictive nutrient control zone map 461 or a functional predictive weed control zone map 1461. Map 461 or map 1461 may include various machine settings values, such as material application settings (e.g., material application rate settings), along the route of the material application machine 100 which can be used (aggregated) by material empty logic 655 to identify a material empty location. In another example, material empty logic 655 may utilize an information map 358 in the form of a prescriptive material application map which may include various machine settings values, such as material application settings (e.g., material application rate settings), along the route of the material application machine 100 which can be used (aggregated) by material empty logic 655 to identify a material empty location.

Material delivery location identifier logic 652 identifies geographic locations at the field at which material is to be delivered to material application machine 100. In some examples, the material delivery locations may be predetermined locations at the field (e.g., as indicated by preferred material delivery location data 615), such as in headlands or at an area of the field that is not used for agricultural, or an area of the field that is near a field entrance. For instance, it may be desirable to limit compaction (or other deterioration) at the field and thus it may be preferable to have the material application machine 100 travel to a location away from the operating portion of the field to receive material. In other examples, a material delivery vehicle 373 may travel onto the operating portion of the field to deliver material and thus the material delivery location may be a geographic location on the field along the route of the material application machine 100. In some examples, the material delivery location is the same as the material empty location identified by material empty logic 655.

Distance logic 653 illustratively determines a distance of machine(s) away from a material delivery location. For instance, distance logic 653 can determine the distance of material application machine 100 away from a material delivery location based on the current position of material application machine 100 (e.g., as indicated by geographic position sensor 304) as well as the route of material application machine 100 (e.g., as indicated by route data 610). Distance logic 653 can determine the distance of a material delivery vehicle 379 away from a material delivery location based on the current position of the material delivery vehicle 379 (e.g., as indicated by material delivery vehicle data 612) as well as the route of the material delivery vehicle 379 (e.g., as indicated by route data 610).

Arrival time logic 654 illustratively identifies a time at which machine(s) will (or can) arrive at a material delivery location. For instance, arrival time logic 654 can determine the time at which the material application machine 100 will (or can) arrive at a material delivery location based on distance between the material application machine 100 and the material delivery location as identified by distance logic 653 as well as speed data of the material application machine 100, for instance speed characteristic values (e.g., predictive speed characteristic values) from a speed map 604, or based on current speed characteristic values of material application machine 100 (e.g., as indicated by heading/speed sensors 325). Arrival time logic 654 can also identify a time at which a material delivery vehicle 379 will (or can) arrive at a material delivery location based on the distance between the material delivery vehicle 379 and the material delivery location as identified by distance logic 653 as well as speed data of the material delivery vehicle 379, such as speed limits along the route of material delivery machine 379 (e.g., as indicated by route data 610), historical speed of material delivery machine 379 (e.g., as indicated by material delivery vehicle data 612), duration of intermediate stops along the route of the material delivery machine 379 (e.g., stops due to on-road traffic control, stops due to replenishing at other locations, etc.), or current speed of material delivery machine 379 (e.g., as indicated by material delivery vehicle data 612).

Based on the arrival times, logistics module 315 may generate a logistics output 668 to control a material delivery machine 379 to begin traveling to the material delivery location to arrive at the same time or within a threshold amount of time as the time that the material application machine 100 will arrive. In other examples, logistics module 315 may communicate with a material delivery service system 380 to schedule a material delivery based on the arrival time.

In some instances, it may be preferable to change the application rate of material application machine 100 such that material application machine will become empty (at least to a threshold level) at the end of a pass, rather than, somewhere else along the route (e.g., in the middle of the field or in the middle of a pass). In this way, material application machine 100 will still apply material over the pass and will not have to travel back over it. For instance, where material empty logic 655 identifies a material empty location that is not at the end of a pass, application rate logic 656 will identify an application rate setting to adjust the application rate of material application machine 100 such that material application machine will become empty at the end of a pass. It will be important to note that it may be that application rate logic 656 adjusts the operation rate in a pass that is prior to the pass that material empty logic 655 identifies as the pass in which the material application machine 100 will become empty.

In some examples, if the material application machine 100 is projected to be within a threshold level of empty at the end of a pass or of the field, such as 5% (which may be indicated by threshold data 614), application rate logic 656 may automatically identify an application rate setting to adjust the application rate of material application machine 100 such that material application machine 100 will become empty at the end of a pass or at the end of the field, regardless of the material empty location identified by material empty logic 655.

Where the material delivery vehicle 379 and material application machine 100 will not (or cannot) arrive at a material delivery location at the same time, or within a threshold amount of time of each other, based on current conditions (e.g., machine settings), speed logic 657 may identify a speed setting to adjust a speed of material application machine 100 or of material delivery vehicle 379, or both, such that the material application machine 100 and material delivery vehicle 379 arrive at the material delivery location at the same time or within a threshold amount of time of each other. Reducing the speed of a machine 100 may reduce wear, save on fuel costs, as well as provide various other benefits.

Where the material delivery vehicle 379 and material application machine 100 will not (or cannot) arrive at a material delivery location at the same time, or within a threshold amount of time of each other, based on current conditions (e.g., machine settings), route planning logic 658 may identify a new route for material application machine 100 or for material delivery vehicle 379, or both, such that the material application machine 100 and material delivery vehicle 379 arrive at the material delivery location at the same time or within a threshold amount of time of each other. In this way, downtime can be reduced.

Map generator 660 illustratively generates one or more logistics maps 661. Logistics maps 661 illustratively map the field in which the material application operation is being performed and perhaps surrounding areas of the field. Logistics maps 661 may include a variety of display elements (discussed below) and can be used in the control of a material application machine 100 or a material delivery vehicle 379, or both. In some examples, a logistics map 661 may be one of the other maps discussed herein, such as one of the functional predictive maps 263 with logistics display elements integrated into the map.

Display element integration component 659 illustratively generates one or more display elements, such as material delivery location display elements, material empty location display elements, route display elements, material application machine display elements, material delivery machine display elements, distance display elements, arrival time display elements, as well as various other display elements. Display element integration component 659 can integrate the one or more display elements into one or more maps, such as one or more of functional predictive maps 263 or a separate logistics map 661 generated by map generator 661.

It will be noted that as the one or more functional predictive maps 263 are updated or otherwise made new (as described above in FIG. 15), the logistics outputs 668 generated by logistics module 315 can also be updated or otherwise made new according to the updated (or new) functional predictive maps 263. For example, logistics module 315 may, based on the updated or new functional predictive maps 263, may generate updated (or new) material empty locations, material delivery locations, distances, arrival times, speed outputs, route outputs, display elements, logistics maps, etc.

The logistic outputs 668 can be used to control material application machine 100 or material delivery vehicle 379, or both. The logistics outputs 668 can be displayed (or provided) on an interface mechanism, such as operator interface mechanism 318 or user interface mechanism 364. The logistics outputs 668 can be provided to other items of material application system 300, such as to remote computing systems 368, delivery vehicles 379, and/or delivery services systems 380.

Figure 17:
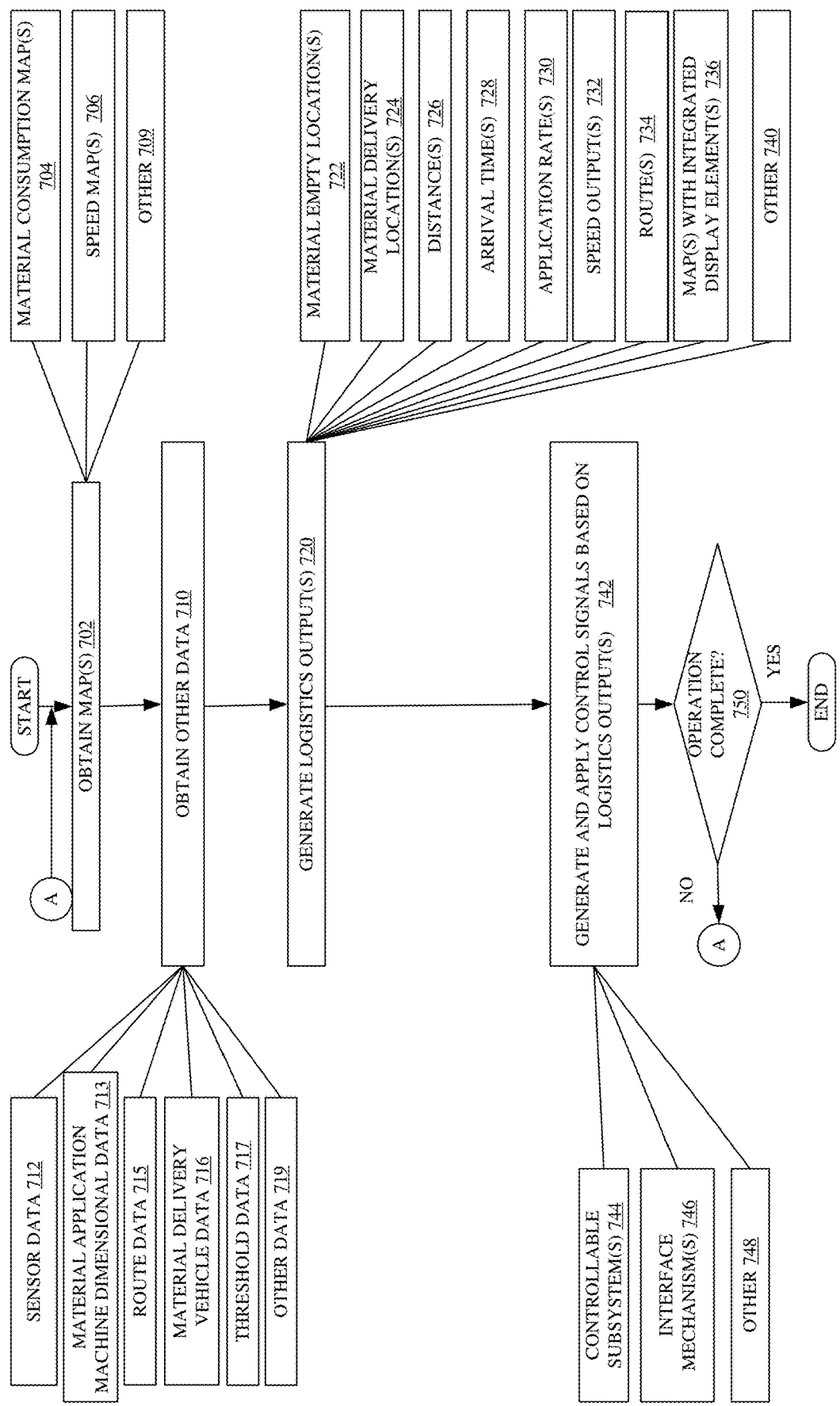
FIG. 17 is a flow diagram illustrating one example of operation of an agricultural material application system in controlling a material application operation.

FIG. 17 is a flow diagram showing one example operation of agricultural material application system 300 in controlling a material application operation, such as by controlling a material application machine 100 or by controlling other items of material application system 300.

At block 702 logistics module 315 obtains one or more maps. Logistics module 315 can obtain one or more material consumption maps 602 as indicated by block 704. Logistics module 315 can obtain one or more speed maps 604, as indicated by block 706. Logistics module 315 can obtain one or more other maps, such as other functional predictive maps 263 or information map(s) 358, or both, as indicated by block 709.

At block 710 various other data are obtained by logistics module 315. For example, logistics module 315 can obtain one or more of the data items illustrated in FIG. 16. As indicated by block 712, logistics module 315 can obtain sensor data 606. As indicated by block 713, logistics module 315 can obtain material application machine dimensional data 608. As indicated by block 715, logistics module 315 can obtain receiving route data 610. As indicated by block 716, logistics module 315 can obtain material delivery vehicle data 612. As indicated by block 717, logistics module 315 can obtain threshold data 614. As indicated by block 718, logistics module 315 can obtain preferred material delivery location data 615. As indicated by block 719, logistics module 315 can obtain various other data 616.

At block 720 logistics module 315 generates one or more logistics outputs 668 based on the data obtained at blocks 702 and block 710. As indicated by block 722, material empty logic 655 can generate, as a logistics output 668, a material empty location. As indicated by block 724, material delivery location identifier logic 652 can generate, as a logistics output 668, a material delivery location. As indicated by block 726, distance logic 653 can generate, as a logistics output 668, one or more distances, such as distance between the material application machine 100 and a material delivery location and a distance between a material delivery vehicle 379 and the material delivery location. As indicated by block 728, arrival time logic 654 can generate, as a logistics output 668, one or more arrival times, such as time at which a material application machine 100 will (or can) arrive at material delivery location and a time at which a material delivery vehicle 379 will (or can) arrive at a material delivery location. As indicated by block 730, application rate logic 656 can generate, as a logistics output 668, one or more application rate settings which can be used to control one or more material application actuators 340 to control an application rate of material. As indicated by block 732, speed logic 657 can generate, as a logistics output 668, one or more speed outputs which can be used to control propulsion subsystem 350 or to control a propulsion subsystem of a material delivery vehicle 379, or both. As indicated by block 734, route planning logic 658 can generate, as a logistics output 668, one or more routes which can be used to control steering subsystem 352 or a steering subsystem of a material delivery vehicle 379, or both. As indicated by block 736, logistics module 315 can generate, as a logistics output 668, one or more maps with integrated display elements, the display elements generated and integrated into the maps by display element integration component 659. For example, at block 738, the one or more maps may include one or more functional predictive maps 263 with display elements integrated or one or more logistics maps 661 with display elements integrated, or both. Logistics module 315 can generate a variety of other logistics outputs, as indicated by block 740.

At block 742, control system 314 generate control signals based on the one or more logistics outputs 668. For example, as indicated by block 744, control system 314 can generate control signals to control one or more controllable subsystems 316 based on the one or more logistics outputs 668. As indicated by block 746, control system 314 can generate control signals to control one or more interface mechanisms (e.g., 318 or 364) to generate displays, alerts, notifications, recommendations, as well as various other indications based on the one or more logistics outputs 668. As indicated by block 748, control system 314 can generate various other control signals based on the logistics outputs 668, such as to communicate information to other items of material application system 300 or to control other items of material application system 300.

At block 750 it is determined if the material application operation is complete. If the material application operation has not been completed, operation returns to block 702. If the material application operation has been completed, then the operation ends.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value varies from a predictive value of the characteristic, such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in areas of the worksite (which have not yet been operated on in the current operation, such as areas where material has not yet been applied in the current operation) in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a soil property map, a yield map, a residue map, a constituents map, a seeding map, a topographic map, a vegetative index map, and another type of map.

In-situ sensors generate sensor data indicative of in-situ characteristic values, such as in-situ nutrient values A predictive model generator generates one or more predictive models based on the one or more obtained maps and the in-situ sensor data, such as a predictive nutrient model.

A predictive map generator generates one or more functional predictive maps based on a model generated by the predictive model generator and the one or more obtained maps. For example, the predictive map generator may generate a functional predictive nutrient map that maps predictive nutrient values to one or more locations on the worksite based on a predictive nutrient model and the one or more obtained maps.

Control zones, which include machine settings values, can be incorporated into the functional predictive nutrient map to generate a functional predictive nutrient map with control zones.

As another example, without limitation, consider an instance of the paradigm described herein which is parameterized as follows.

One or more maps of the field are obtained, such as one or more of a vegetative index map, an optical map, a weed map, and another type of map.

In-situ sensors generate sensor data indicative of in-situ characteristic values, such as in-situ weed values A predictive model generator generates one or more predictive models based on the one or more obtained maps and the in-situ sensor data, such as a predictive weed model.

A predictive map generator generates one or more functional predictive maps based on a model generated by the predictive model generator and the one or more obtained maps. For example, the predictive map generator may generate a functional predictive weed map that maps predictive weed values to one or more locations on the worksite based on a predictive weed model and the one or more obtained maps.

Control zones, which include machine settings values, can be incorporated into the functional predictive weed map to generate a functional predictive weed map with control zones.

As another example, without limitation, consider an instance of the paradigm described herein which is parameterized as follows.

One or more maps of the field are obtained, such as one or more of a soil property map, a topographic map, a vegetative index map, a weed map, a contamination map, and another type of map.

In-situ sensors generate sensor data indicative of in-situ characteristic values, such as in-situ material consumption values A predictive model generator generates one or more predictive models based on the one or more obtained maps and the in-situ sensor data, such as a predictive material consumption model.

A predictive map generator generates one or more functional predictive maps based on a model generated by the predictive model generator and the one or more obtained maps. For example, the predictive map generator may generate a functional predictive material consumption map that maps predictive material consumption values to one or more locations on the worksite based on a predictive material consumption model and the one or more obtained maps.

Control zones, which include machine settings values, can be incorporated into the functional predictive material consumption map to generate a functional predictive material consumption map with control zones.

As another example, without limitation, consider an instance of the paradigm described herein which is parameterized as follows.

One or more maps of the field are obtained.

In-situ sensors generate sensor data indicative of in-situ characteristic values, such as in-situ speed characteristic values A predictive model generator generates one or more predictive models based on the one or more obtained maps and the in-situ sensor data, such as a predictive speed model.

A predictive map generator generates one or more functional predictive maps based on a model generated by the predictive model generator and the one or more obtained maps. For example, the predictive map generator may generate a functional predictive speed map that maps predictive speed characteristic values to one or more locations on the worksite based on a predictive speed model and the one or more obtained maps.

Control zones, which include machine settings values, can be incorporated into the functional predictive speed map to generate a functional predictive speed map with control zones.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, or logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 18:
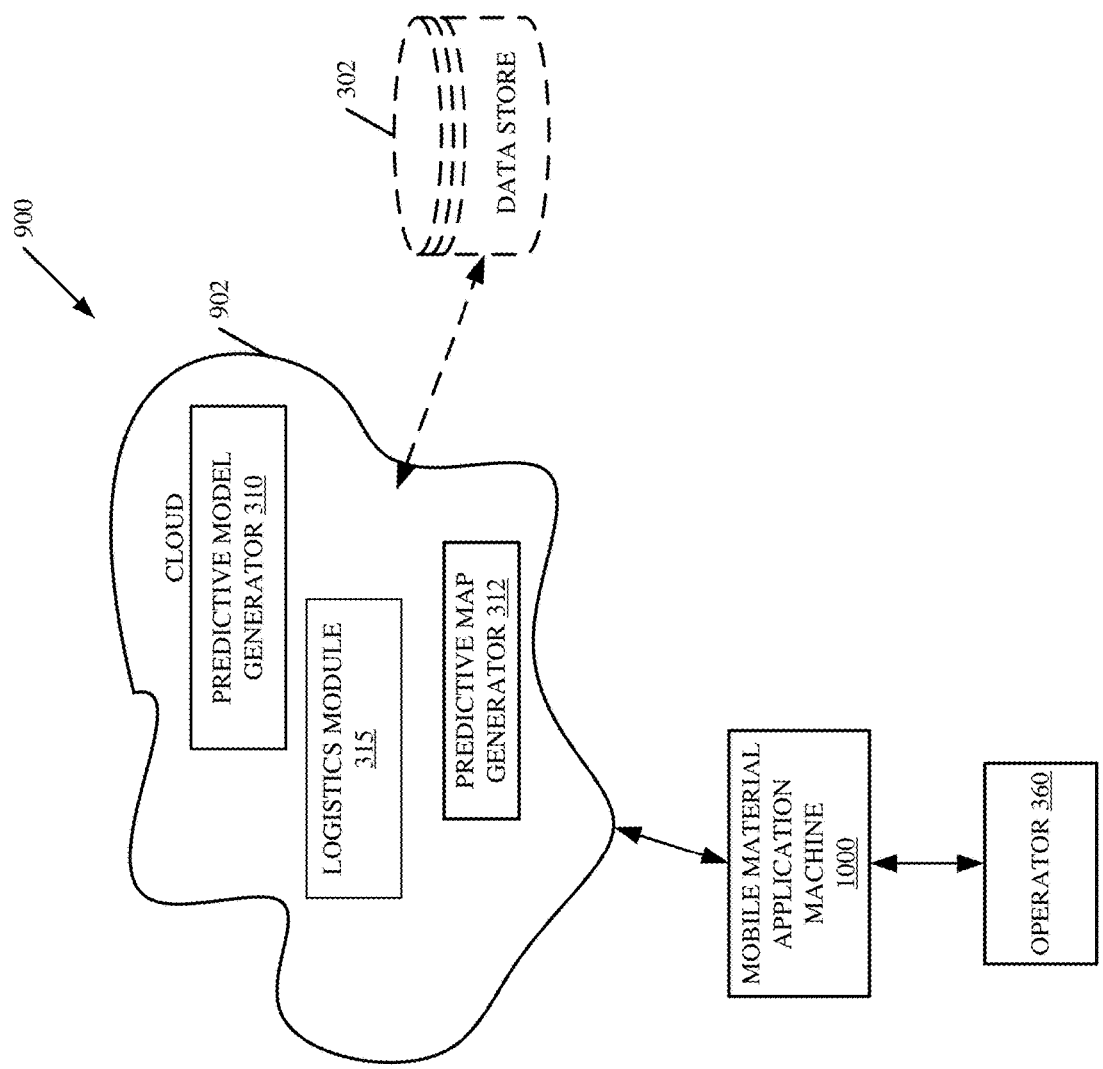
FIG. 18 is a block diagram showing one example of a mobile material application machine in communication with a remote server environment.

FIG. 18 is a block diagram of a mobile agricultural material application machine 1000, which may be similar to mobile material application machine 100 shown in FIG. 10. The mobile material application machine 1000 communicates with elements in a remote server architecture 900. In some examples, remote server architecture 900 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 10 as well as data associated therewith, may be stored on servers at a remote location. The computing resources in a remote server environment may be consolidated at a remote data center location, or the computing resources can be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 18, some items are similar to those shown in FIG. 10 and those items are similarly numbered. FIG. 18 specifically shows that predictive model generator 310, predictive map generator 312, and logistics module 315 may be located at a server location 902 that is remote from the material application machine 1000. Therefore, in the example shown in FIG. 18, material application machine 1000 accesses systems through remote server location 902. In other examples, various other items may also be located at server location 902, such as predictive model 311, functional predictive maps 263 (including predictive maps 264 and predictive control zone maps 265), control zone generator 313, and processing system 338.

FIG. 18 also depicts another example of a remote server architecture. FIG. 18 shows that some elements of FIG. 10 may be disposed at a remote server location 902 while others may be located elsewhere. By way of example, data store 302 may be disposed at a location separate from location 902 and accessed via the remote server at location 902. Regardless of where the elements are located, the elements can be accessed directly by material application machine 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 1000 comes close to the machine containing the information collection system, such as a fuel truck prior to fueling, the information collection system collects the information from the mobile machine 1000 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the material application machine 1000 until the material application machine 1000 enters an area having wireless communication coverage. The material application machine 1000, itself, may send the information to another network.

It will also be noted that the elements of FIG. 10, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 902 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 19:
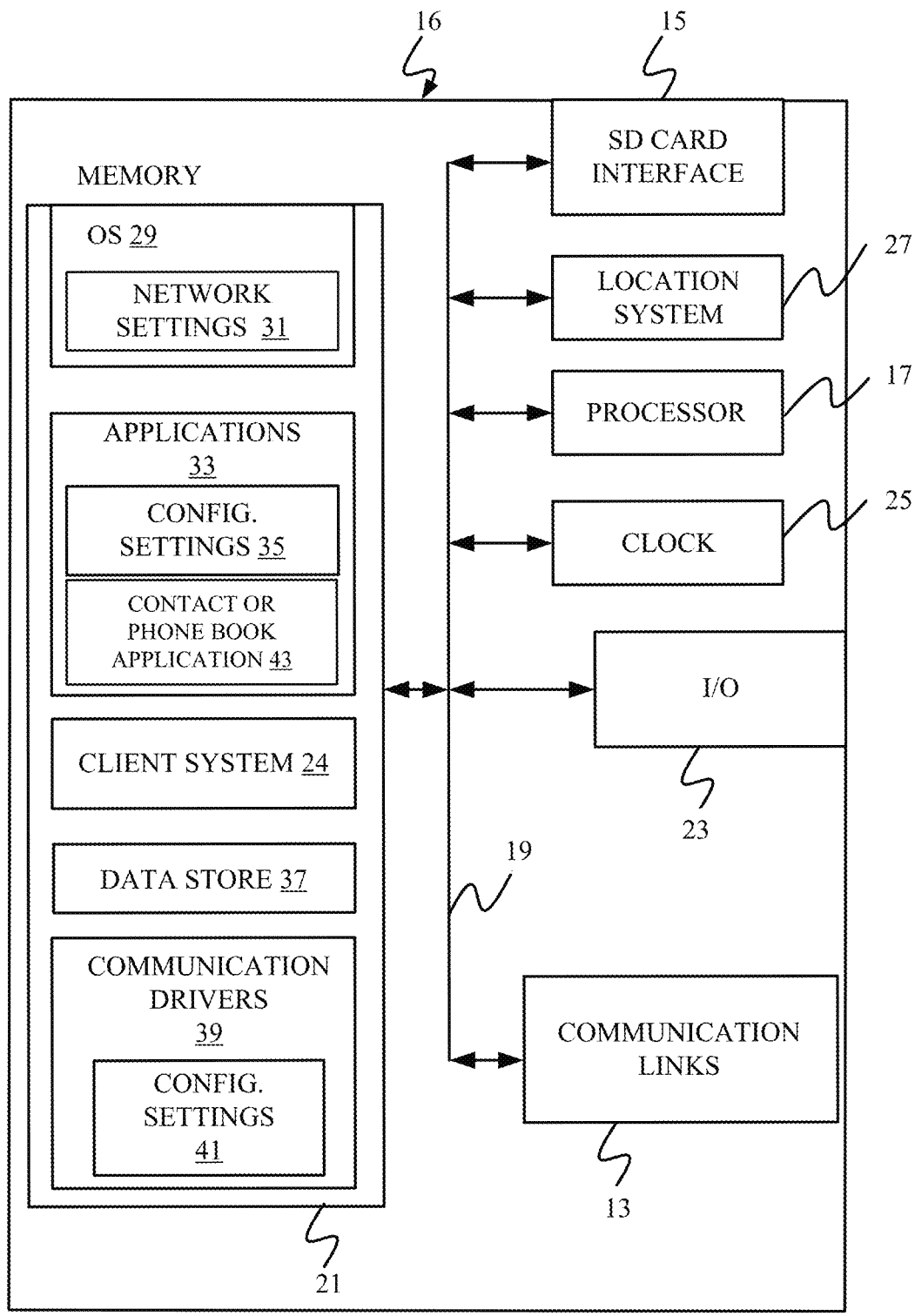
FIGS. 19-21 show examples of mobile devices that can be used in an agricultural material application system.
Figure 20:
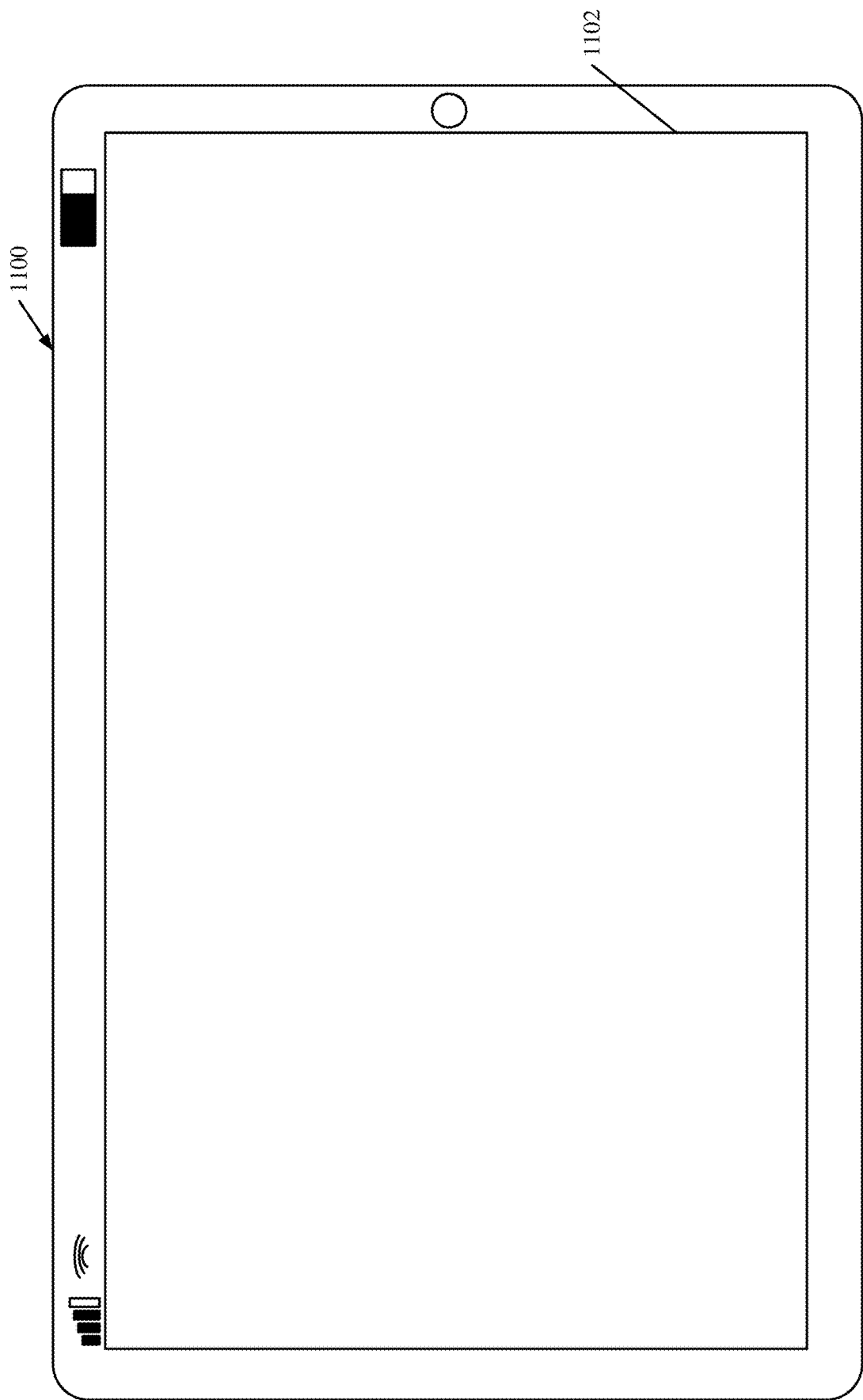
Figure 21:
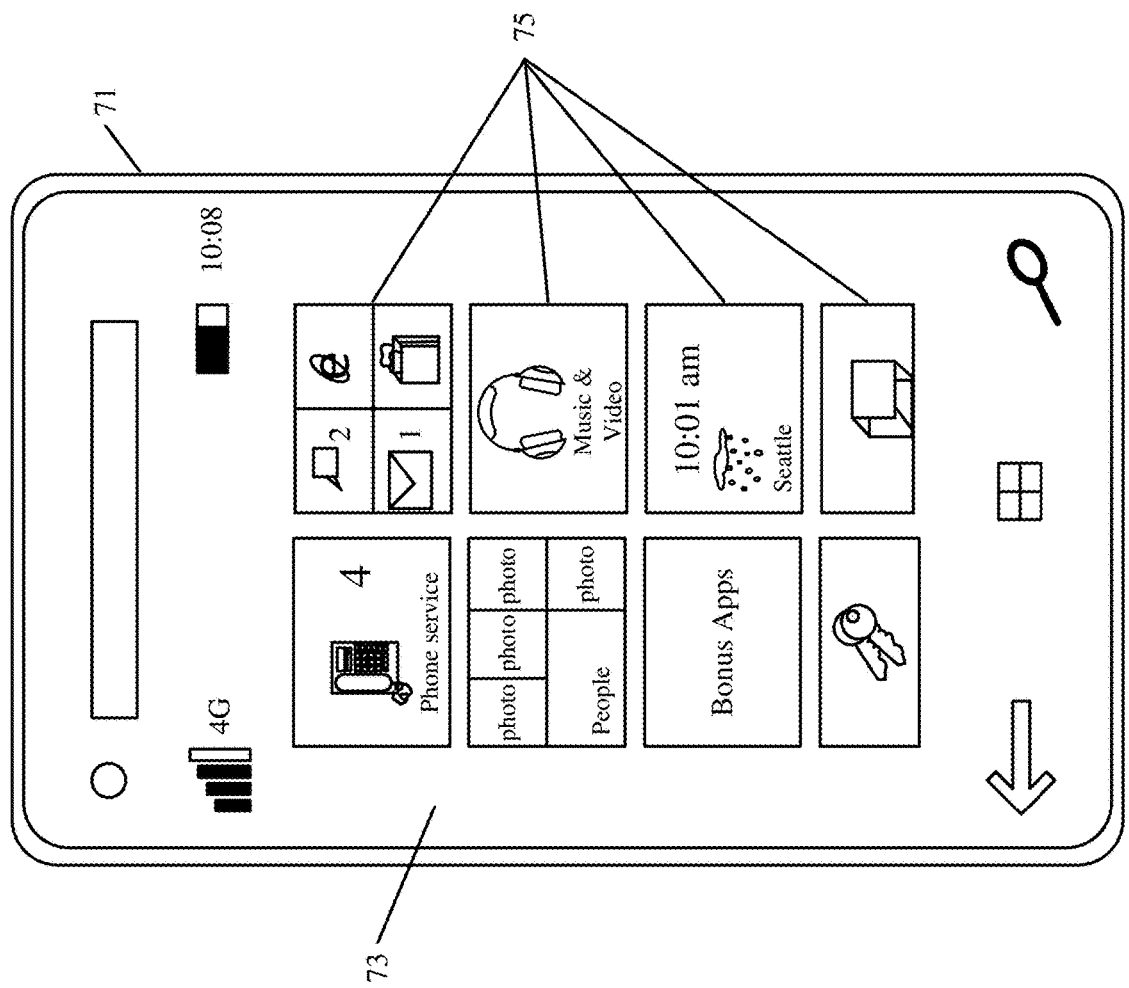

FIG. 19 is a simplified block diagram of one illustrative example of a handheld or mobile computing device that can be used as a user's or client's handheld device 16, in which the present system (or parts of it) can be deployed. For instance, a mobile device can be deployed in the operator compartment of material application machine 100, for use in generating, processing, or displaying the maps discussed above. FIGS. 20-21 are examples of handheld or mobile devices.

FIG. 19 provides a general block diagram of the components of a client device 16 that can run some components shown in FIG. 10, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 20 shows one example in which device 16 is a tablet computer 1100. In FIG. 20, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 21 is similar to FIG. 20 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 22:
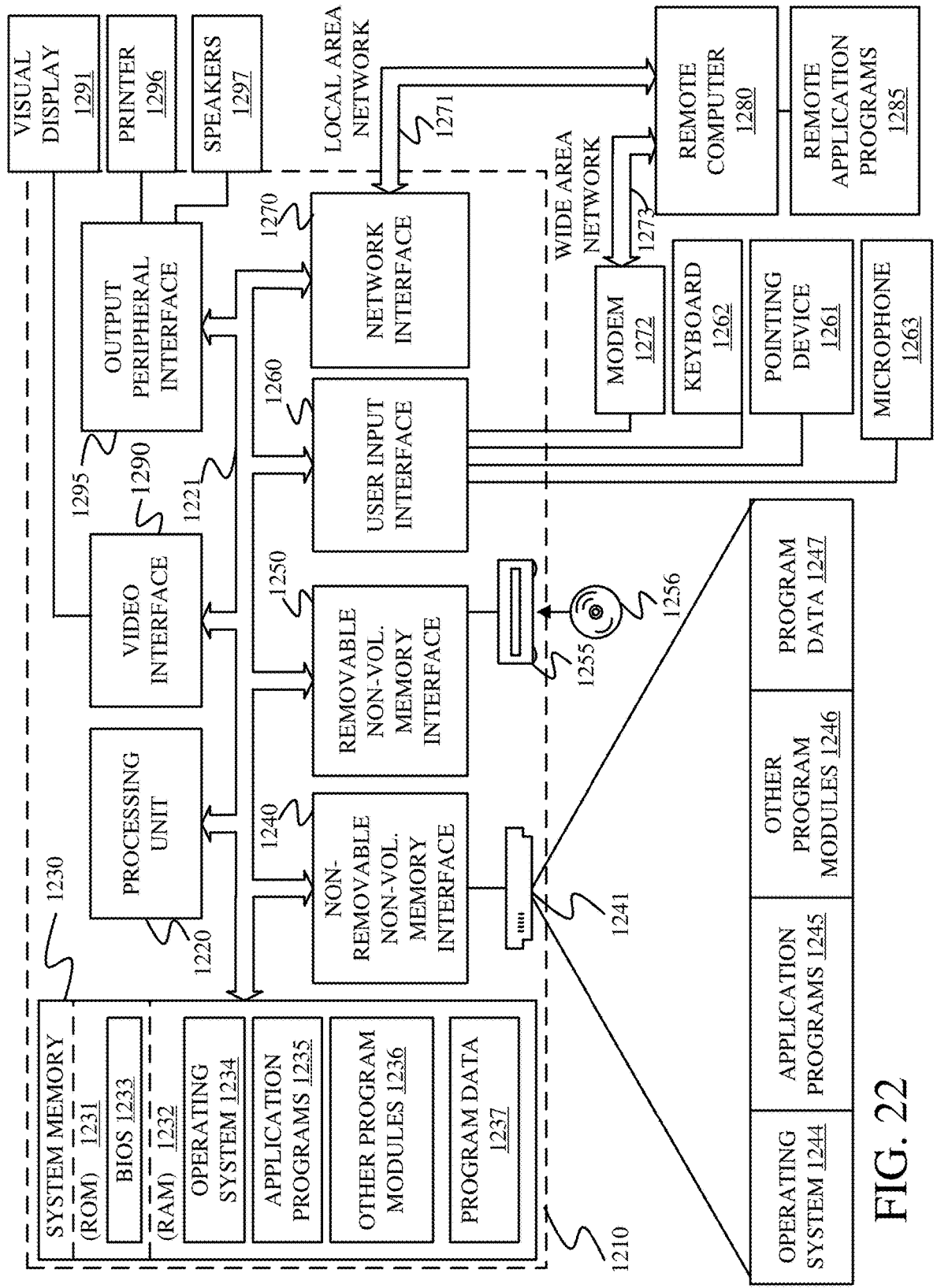
FIG. 22 is a block diagram showing one example of a computing environment that can be used in an agricultural material application system.

FIG. 22 is one example of a computing environment in which elements of FIG. 10 can be deployed. With reference to FIG. 22, an example system for implementing some embodiments includes a computing device in the form of a computer 1210 programmed to operate as discussed above. Components of computer 1210 may include, but are not limited to, a processing unit 1220 (which can comprise processors or servers from previous FIGS.), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to FIG. 10 can be deployed in corresponding portions of FIG. 22.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 22 illustrates operating system 1234, application programs 1235, other program modules 1236, and program data 1237.

The computer 1210 may also include other removable/non-removable volatile/nonvolatile computer storage media. By way of example only, FIG. 22 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 22, provide storage of computer readable instructions, data structures, program modules and other data for the computer 1210. In FIG. 22, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 22 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural material application system comprising:
    a geographic position sensor configured to detect a geographic location of a mobile material application machine at a field and generates a sensor signal indicating the geographic location;

an in-situ sensor configured to detect a weed value corresponding to the geographic location; and
a control system configured to:
receive a vegetative index map that maps vegetative index values corresponding to different geographic locations in the field;
generate a predictive weed model indicative of a relationship between the vegetative index values and weed values based on the weed value detected by the in-situ sensor corresponding to the geographic location and a vegetative index value in the vegetative index map corresponding to the geographic location, the predictive weed model being configured to receive a vegetative index value as a model input and generate a predictive weed value as a model output;
generate a functional predictive weed map of the field that maps predictive weed values to the different geographic locations in the field based on the vegetative index values in the vegetative index map and based on the predictive weed model; and
control an actuator of the mobile material application machine at the field based on the sensor signal indicating the geographic location and the functional predictive weed map.

2. The agricultural material application system of claim 1, wherein the weed value is indicative of one or more of weed presence, weed type, weed size, and weed intensity.

3. The agricultural material application system of claim 1, wherein the vegetative index map comprises an optical map that maps, as the vegetative index values, optical characteristic values to the different geographic locations in the field;
wherein the predictive weed model models a relationship between the optical characteristic values and the weed values based on the weed value detected by the in-situ sensor corresponding to the geographic location and an optical characteristic value in the optical map at the geographic location to which the weed value corresponds, the predictive weed model being configured to receive an optical characteristic value as a model input and generate a predictive weed value as a model output; and
wherein the functional predictive weed map maps the predictive weed values to the different geographic locations in the field based on the optical characteristic values in the vegetative index map and based on the predictive weed model.

4. The agricultural material application system of claim 1, wherein the control system is configured to:
receive an information map that maps values of a characteristic to the different geographic locations in the field;
wherein the predictive weed model is further indicative of a relationship between the values of the characteristic and weed values based on the weed value detected by the in-situ sensor corresponding to the geographic location and values of the characteristic in the information map corresponding to the geographic location; and
wherein the functional predictive weed map maps the predictive weed values to the different geographic locations in the field based further on the values of the characteristic in the information map and the predictive weed model.

5. The agricultural material application system of claim 4, wherein the actuator comprises a material application actuator, and the control system is configured to control the material application actuator to increase an amount of material applied by the mobile material application machine based on the functional predictive weed map.

6. The agricultural material application system of claim 4, wherein the actuator comprises a material application actuator, and the control system is configured to control the material application actuator to decrease an amount of material applied by the mobile material application machine based on the functional predictive weed map.

7. The agricultural material application system of claim 4, wherein the actuator comprises a material application actuator, and the control system is configured to control the material application actuator to deactivate or activate a component of the mobile material application machine based on the functional predictive weed map.

8. A method of controlling a mobile agricultural material application machine, the method comprising:
detecting a geographic location of the mobile agricultural material application machine at a field;
obtaining in-situ sensor data indicative of a weed value corresponding to the geographic location;
receiving a vegetative index map that maps vegetative index values corresponding to different geographic locations in the field;
generating a predictive weed model indicative of a relationship between the vegetative index values and weed values based on the weed value corresponding to the geographic location and a vegetative index value in the vegetative index map corresponding to the geographic location;
generating a functional predictive weed map of the field that maps predictive weed values to the different geographic locations in the field based on the vegetative index values in the vegetative index map and based on the predictive weed model; and
controlling an actuator of the mobile agricultural material application machine at the field based on the geographic location of the mobile agricultural material application machine and the functional predictive weed map.

9. The method of claim 8, wherein the actuator comprises a material application actuator.

10. The method of claim 9, wherein controlling the material application actuator comprises controlling the material application actuator of the mobile agricultural material application machine to adjust a rate at which material is applied to the field based on the geographic location of the mobile agricultural material application machine and the functional predictive weed map.

11. The method of claim 9, wherein controlling the material application actuator comprises controlling the material application actuator of the mobile agricultural material application machine to activate or deactivate a component of the mobile agricultural material application machine based on the geographic location of the mobile agricultural material application machine and the functional predictive weed map.

12. A mobile agricultural material application machine, comprising:
a geographic position sensor configured to detect a geographic location of the mobile agricultural material application machine at a field;
an in-situ sensor configured to detect a weed value corresponding to the geographic location; and
a control system configured to:
receive two or more information maps, each information map, of the two or more information maps, mapping values of a respective characteristic to different geographic locations in the field;

generate a predictive weed model indicative of a relationship between the values of the respective characteristics in the two or more information maps and weed values based on the weed value detected by the in-situ sensor corresponding to the geographic location and the values of the respective characteristics in the two or more information maps corresponding to the geographic location, the predictive weed model being configured to receive a value of each respective characteristic as a model input and generate a predictive weed value as a model output;

generate a functional predictive weed map of the field that maps predictive weed values to the different geographic locations in the field based on the values of the respective characteristics in the two or more information maps and based on the predictive weed model; and control an actuator of the mobile agricultural material application machine at the field based on the geographic location of the mobile agricultural material application machine at the field and the functional predictive weed map.

13. The mobile agricultural material application machine of claim 12 and further comprising:

a communication system that receives the two or more information maps.

14. The mobile agricultural material application machine of claim 13, wherein the actuator comprises a material application actuator.

15. The mobile agricultural material application machine of claim 13, wherein the control system controls the actuator that is controllably actuatable to adjust a rate at which material is applied to the field.

16. The mobile agricultural material application machine of claim 13, wherein the control system controls the actuator to activate or deactivate a component of the mobile agricultural material application machine.

* * * * *